United States Patent
Ogawa et al.

(10) Patent No.: US 9,521,211 B2
(45) Date of Patent: Dec. 13, 2016

(54) CONTENT PROCESSING DEVICE, CONTENT PROCESSING METHOD, COMPUTER-READABLE RECORDING MEDIUM, AND INTEGRATED CIRCUIT

(75) Inventors: Kento Ogawa, Osaka (JP); Yasuhiro Yuki, Osaka (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 626 days.

(21) Appl. No.: 14/123,612

(22) PCT Filed: May 1, 2012

(86) PCT No.: PCT/JP2012/002957
§ 371 (c)(1),
(2), (4) Date: Dec. 3, 2013

(87) PCT Pub. No.: WO2012/169112
PCT Pub. Date: Dec. 13, 2012

(65) Prior Publication Data
US 2014/0129640 A1  May 8, 2014

(30) Foreign Application Priority Data
Jun. 10, 2011 (JP) .................... 2011-129886

(51) Int. Cl.
G06F 15/16 (2006.01)
H04L 29/08 (2006.01)
(Continued)

(52) U.S. Cl.
CPC ............ *H04L 67/306* (2013.01); *G06Q 10/10* (2013.01); *G06Q 50/01* (2013.01)

(58) Field of Classification Search
CPC ... G06Q 50/01; G06Q 30/0255; H04L 67/306; H04L 51/32; H04L 12/588
(Continued)

(56) References Cited

U.S. PATENT DOCUMENTS 5,819,247 A   10/1998  Freund et al.
2008/0040370 A1  2/2008  Bosworth et al.
(Continued)

FOREIGN PATENT DOCUMENTS

JP   8-329031    12/1996
JP   2002-259435  9/2002
(Continued)

OTHER PUBLICATIONS

International Search Report issued May 29, 2012 in International (PCT) Application No. PCT/JP2012/002957.

*Primary Examiner* — Phuoc Nguyen
(74) *Attorney, Agent, or Firm* — Wenderoth, Lind & Ponack, L.L.P.

(57) ABSTRACT

A content processing device accumulates, at every predetermined time period, social information that defines the relationship and the degree of intimacy between users calculated based on lifelog information between the users; determines a time period when a content was generated, out of the predetermined time periods, from meta-information of the content; determines an evaluation time period from the determined time period; calculates a degree of intimacy between shared users during the evaluation time period; determines the priority of the evaluation time period according to the magnitude of the degree of intimacy; and controls output of the content generated during the evaluation time period according to the determined priority.

14 Claims, 40 Drawing Sheets

(51) Int. Cl.
*G06Q 10/10* (2012.01)
*G06Q 50/00* (2012.01)

(58) Field of Classification Search
USPC .................................................. 709/207, 226
See application file for complete search history.

(56) References Cited

U.S. PATENT DOCUMENTS

| | | |
|---|---|---|
| 2009/0133071 A1 | 5/2009 | Sakai et al. |
| 2009/0216859 A1 | 8/2009 | Dolling |
| 2009/0284531 A1 | 11/2009 | Ishioka |
| 2011/0029612 A1 | 2/2011 | Bosworth et al. |
| 2011/0125906 A1* | 5/2011 | Chunilal ............ G06F 17/30867 709/226 |
| 2013/0133005 A1 | 5/2013 | Sakai et al. |
| 2016/0140447 A1* | 5/2016 | Cohen ................... G06N 5/048 706/52 |
| 2016/0255535 A1* | 9/2016 | De Foy ............... H04L 67/2804 |

FOREIGN PATENT DOCUMENTS

| | | |
|---|---|---|
| JP | 2006-81021 | 3/2006 |
| JP | 2008-129682 | 6/2008 |
| JP | 2009-141952 | 6/2009 |
| JP | 2009-169921 | 7/2009 |
| JP | 2009-282574 | 12/2009 |
| JP | 2010-500649 | 1/2010 |
| JP | 4490214 | 6/2010 |
| JP | 2010-263265 | 11/2010 |
| JP | 2011-82913 | 4/2011 |
| JP | 2011-82915 | 4/2011 |

* cited by examiner

FIG. 2

LIFELOG INFORMATION TABLE

| | | LOG INFORMATION TYPE | NUMBER OF TIMES | ACCUMULATED TIME | LAPSE OF TIME FROM PREVIOUS TIME | QUANTITY OF INFORMATION | NUMBER OF AFFIRMATIVE EXPRESSIONS | NUMBER OF NEGATIVE EXPRESSIONS |
|---|---|---|---|---|---|---|---|---|
| I | YOU | PAGE BROWSING | 38 | 3 HOURS & 41 MINUTES | 23 HOURS & 12 MINUTES | — | — | — |
| | | COMMENT INPUT ON PAGE | 152 | — | 4 MINUTES | 12,621 CHARACTERS/ 58 TIMES | 724 PIECES | 0 PIECE |
| A | B | MESSAGE TRANSMISSION | 14 | — | 145 HOURS & 29 MINUTES | 2,250 CHARACTERS/ 3 PIECES | 56 PIECES | 1 PIECE |
| | | NUMBER OF SIMILAR REGISTERED COMMUNITIES /APPLICATIONS | — | — | 726 HOURS & 31 MINUTES | 10 PIECES/ 3 HOURS AND 58 MINUTES | — | — |
| | | NUMBER OF SIMILAR REGISTERED SCHEDULES | — | — | 180 HOURS & 04 MINUTES | 13 PIECES/ 45 HOURS AND 30 MINUTES | 7 PIECES | 0 PIECE |
| | | NUMBER OF PUBLIC CONTENTS | — | — | 5 HOURS & 46 MINUTES | 1,427 PIECES | — | — |

FIG. 5

SOCIAL INFORMATION
ACCUMULATED INFORMATION TABLE

| SOCIAL INFORMATION NAME | ACCUMULATION DATE AND TIME |
|---|---|
| S1 | 2011/4/1 0:00 |
| S2 | 2011/5/1 0:00 |
| S3 | 2011/6/1 0:00 |
| S4 | 2011/7/1 0:00 |
| S5 | 2011/8/1 0:00 |
| S6 | 2011/9/1 0:00 |
| S7 | 2011/10/1 0:00 |
| S8 | 2011/11/1 0:00 |
| S9 | 2011/12/1 0:00 |
| S10 | 2012/1/1 0:00 |
| S11 | 2012/2/1 0:00 |
| S12 | 2012/3/1 0:00 |

FIG. 6

SHARED USER INFORMATION TABLE

| USER ID | SHARED USER NAME |
|---------|------------------|
| U1 | A |
| U2 | B |
| U3 | C |

FIG. 7

FRIEND LIST INFORMATION TABLE

| FRIEND LIST NAME | USER NAME BELONGING TO LIST |
|------------------|------------------------------|
| LOVER | D |
| FAMILY MEMBER | F |
| BEST FRIEND | - |
| CLOSE FRIEND | B、C |
| FRIEND | E |

| I \ YOU | A | B | C | D | E | F | G | H |
|---|---|---|---|---|---|---|---|---|
| A | – | 0.6 | 0.5 | 0.4 | 0.8 | 0.3 | – | – |
| B | 0.9 | – | 1.4 | 0.7 | – | – | 0.8 | – |
| C | 0.8 | 0.2 | – | 0.6 | – | – | 0.3 | 0.1 |

| I \ YOU | A | B | C | D | E | F | G | H |
|---|---|---|---|---|---|---|---|---|
| A | – | 0.9 | 0.6 | 1.0 | 1.1 | 0.2 | – | – |
| B | 1.0 | – | 2.2 | 1.5 | 0.5 | – | 0.3 | – |
| C | 1.3 | 0.2 | – | 0.7 | – | – | 0.5 | – |

FIG. 12

| I \ YOU | A | B | C |
|---|---|---|---|
| A | – | 0.6 | 0.5 |
| B | 0.9 | – | 1.4 |
| C | 0.8 | 0.2 | – |

S1

| I \ YOU | A | B | C |
|---|---|---|---|
| A | – | 0.9 | 0.6 |
| B | 1.0 | – | 2.2 |
| C | 1.3 | 0.2 | – |

S2

| I \ YOU | A | B | C |
|---|---|---|---|
| A | – | 1.4 | 0.7 |
| B | 1.2 | – | 2.9 |
| C | 1.9 | 0.3 | – |

S3

| I \ YOU | A | B | C |
|---|---|---|---|
| A | – | 2.3 | 1.2 |
| B | 1.8 | – | 3.0 |
| C | 2.3 | 0.7 | – |

S4

| I \ YOU | A | B | C |
|---|---|---|---|
| A | – | 2.5 | 0.6 |
| B | 1.9 | – | 2.5 |
| C | 1.8 | 0.6 | – |

S5

| I \ YOU | A | B | C |
|---|---|---|---|
| A | – | 2.6 | 0.2 |
| B | 2.1 | – | 1.8 |
| C | 0.9 | 0.5 | – |

S6

| I \ YOU | A | B | C |
|---|---|---|---|
| A | – | 2.5 | 0.3 |
| B | 2.1 | – | 1.4 |
| C | 1.3 | 0.6 | – |

S7

| I \ YOU | A | B | C |
|---|---|---|---|
| A | – | 1.9 | 0.6 |
| B | 2.5 | – | 1.4 |
| C | 1.6 | 1.3 | – |

S8

| I \ YOU | A | B | C |
|---|---|---|---|
| A | – | 1.5 | 1.0 |
| B | 2.4 | – | 1.5 |
| C | 2.0 | 1.8 | – |

S9

| I \ YOU | A | B | C |
|---|---|---|---|
| A | – | 1.0 | 1.5 |
| B | 1.8 | – | 1.7 |
| C | 1.4 | 2.4 | – |

S10

| I \ YOU | A | B | C |
|---|---|---|---|
| A | – | 0.8 | 1.4 |
| B | 1.7 | – | 2.3 |
| C | 1.2 | 2.0 | – |

S11

| I \ YOU | A | B | C |
|---|---|---|---|
| A | – | 1.3 | 1.3 |
| B | 1.9 | – | 2.1 |
| C | 0.8 | 1.4 | – |

CONTENT INFORMATION TABLE

| CONTENT NAME | GENERATION DATE AND TIME |
|---|---|
| P-001 | 2011/4/2 14:33 |
| P-002 | 2011/4/2 19:12 |
| P-003 | 2011/4/10 11:47 |
| P-004 | 2011/4/10 13:08 |
| P-005 | 2011/4/10 18:56 |
| P-006 | 2011/4/16 20:29 |
| P-007 | 2011/4/24 12:21 |
| P-008 | 2011/4/30 21:35 |

FIG. 14

EVALUATION TIME PERIOD INFORMATION TABLE

| CONTENT GENERATION TIME PERIOD | EVALUATION TIME PERIOD |
|---|---|
| 2011/4/1 ~ 2011/4/30 | V1 |
| 2011/5/1 ~ 2011/5/31 | V2 |
| 2011/6/1 ~ 2011/6/30 | V3 |
| 2011/7/1 ~ 2011/7/31 | V4 |
| 2011/8/1 ~ 2011/8/31 | V5 |
| 2011/9/1 ~ 2011/9/30 | V6 |
| 2011/10/1 ~ 2011/10/31 | V7 |
| 2011/11/1 ~ 2011/11/30 | V8 |
| 2011/12/1 ~ 2011/12/31 | V9 |
| 2012/1/1 ~ 2012/1/31 | V10 |
| 2012/2/1 ~ 2012/2/29 | V11 |
| 2012/3/1 ~ 2012/3/31 | V12 |

FIG. 16

| ONE-SIDED PAIR | MUTUAL PAIR |
|---|---|
| A→B | A⇔B |
| B→A | |
| B→C | B⇔C |
| C→B | |
| C→A | C⇔A |
| A→C | |

FIG. 24

CONTENT INFORMATION TABLE

| CONTENT NAME | GENERATION DATE AND TIME | SUBJECT PERSON NAME |
|---|---|---|
| P-001 | 2011/4/2  14:33 | B, G |
| P-002 | 2011/4/2  19:12 | A, B, E |
| P-003 | 2011/4/10  11:47 | A, C, H |
| P-004 | 2011/4/10  13:08 | A, D, G |
| P-005 | 2011/4/10  18:56 | B, D, E |
| P-006 | 2011/4/16  20:29 | F |
| P-007 | 2011/4/24  12:21 | A, B, C |
| P-008 | 2011/4/30  21:35 | D, F |

FIG. 30

NON-SHARED USER INFORMATION TABLE
FOR INDIVIDUAL SHARED USERS

| SOCIAL INFORMATION NAME | SHARED USER NAME | NON-SHARED USER NAME | INTIMACY DEGREE BETWEEN SHARED USER AND NON-SHARED USER |
|---|---|---|---|
| S1 | A | D | 0.9 |
|  |  | E | 2.0 |
|  |  | F | 0.5 |
|  | B | D | 1.8 |
|  |  | G | 1.5 |
|  | C | D | 1.2 |
|  |  | G | 0.6 |
|  |  | H | 0.2 |
| S2 | A | D | 1.9 |
|  |  | E | 2.4 |
|  |  | F | 0.3 |
|  | B | D | 3.2 |
|  |  | E | 0.8 |
|  |  | G | 0.5 |
|  | C | D | 1.4 |
|  |  | G | 1.0 |

FIG. 31

NON-SHARED USER INFORMATION TABLE
FOR INDIVIDUAL SHARED USERS DURING V1

| EVALUATION TIME PERIOD | SHARED USER NAME | NON-SHARED USER NAME | INTIMACY DEGREE BETWEEN SHARED USER AND NON-SHARED USER |
|---|---|---|---|
| V1 | A | D | 1.4 |
| | | E | 2.2 |
| | | F | 0.4 |
| | B | D | 2.5 |
| | | E | 0.4 |
| | | G | 1.0 |
| | C | D | 1.3 |
| | | G | 0.8 |
| | | H | 0.1 |

FIG. 32

NON-SHARED USER INFORMATION TABLE
FOR ALL SHARED USERS DURING V1

| EVALUATION TIME PERIOD | NON-SHARED USER NAME | NUMBER OF SHARED USERS IN WHICH INTIMACY DEGREE IS SET | INTIMACY DEGREE BETWEEN SHARED USER AND NON-SHARED USER |
|---|---|---|---|
| V1 | D | 3 | 5.2 |
| | E | 2 | 2.6 |
| | F | 1 | 0.4 |
| | G | 2 | 1.8 |
| | H | 1 | 0.1 |

FIG. 33

NON-SHARED SUBJECT PERSON TABLE DURING V1

| CONTENT NAME | SUBJECT PERSON NAME | NON-SHARED SUBJECT PERSON NAME | NUMBER OF SHARED USERS IN WHICH INTIMACY DEGREE IS SET | INTIMACY DEGREE BETWEEN SHARED USER AND NON-SHARED SUBJECT PERSON |
|---|---|---|---|---|
| P-001 | B, G | G | 2 | 1.8 |
| P-002 | A, B, E | E | 2 | 2.6 |
| P-003 | A, C, H | H | 1 | 0.1 |
| P-004 | A, D, G | D, G | 5 | 7.0 |
| P-005 | B, D, E | D, E | 5 | 7.8 |
| P-006 | F | F | 1 | 0.4 |
| P-007 | A, B, C | - | 0 | 0 |
| P-008 | D, F | D, F | 4 | 5.6 |

CONTENT PROCESSING DEVICE, CONTENT PROCESSING METHOD, COMPUTER-READABLE RECORDING MEDIUM, AND INTEGRATED CIRCUIT

TECHNICAL FIELD

The present invention relates to a technology of processing contents such as still images or moving images, and more particularly to a technology of controlling the priority in outputting the contents.

BACKGROUND ART

In recent years, as an imaging apparatus such as a digital still camera, a digital video camera, and a camera built in a mobile phone is spread, contents such as still images or moving images that have been photographed at various events such as trips or wedding ceremonies are increasing.

In addition, people have an increasing opportunity to present photographed contents on screens of TVs or mobile terminals, and enjoy the contents sharing with other people such as friends, acquaintances, family members, and lovers.

As such occasions increase, there are proposed many methods for automatically selecting and presenting appropriate contents according to the users who browse the shared contents. For instance, there is proposed a technology of prioritizing presentation of a content including face information analogous to user face information, based on the user face information designated by the browser user (see e.g. patent literature 1).

Further, there is proposed a technology of calculating a degree of intimacy indicating the degree of closeness between subject persons, based on subject person information (such as the distance between persons, the frequency of appearance, and the number of persons) of the contents, and of prioritizing presentation of a content including the browser user, or including a user having a high degree of intimacy with a user designated by the browser user (see e.g. patent literature 2).

However, in both of patent literatures 1 and 2, the degree of intimacy for use in determining the priority of a content is calculated solely based on the content. As a result, as the number of group photographs increases, for instance, a person who actually does not have a high degree of intimacy may be misjudged to have a high degree of intimacy. In this way, in the conventional art, the actual human relationship in the real world has not been sufficiently reflected. Thus, the output result on contents has not always been an optimum output result for browser users (hereinafter, called as shared users) who browse the contents while sharing the contents.

Further, in both of patent literatures 1 and 2, only the degree of intimacy between a shared user and a subject person has been regarded as a factor that determines the priority of a content photographed in the past, and the degree intimacy between shared users has not been taken into consideration. Accordingly, in the case where a content is shared between two or more shared users, output of a content including the shared users that has been photographed during a time period when the shared users were remote from each other may be prioritized.

CITATION LIST

Patent Literature

Patent literature 1: Japanese Patent No. 4490214
Patent literature 2: Japanese Unexamined Patent Publication No. 2008-129682

SUMMARY OF INVENTION

An object of the invention is to provide a technology of determining the priority in outputting contents, taking into consideration of the degree of intimacy between shared users, which may change as time goes by.

A content processing device according to an aspect of the invention is a content processing device for processing at least one or more contents. The content processing device is provided with an input unit which receives input of the content; a shared user information managing unit which manages shared user information relating to shared users, the shared users being at least one or more users who share the content received by the input unit; a content information managing unit which manages meta-information corresponding to the content; a social information managing unit which calculates, at every predetermined time period, social information that defines a relationship between the users and a degree of intimacy indicating a degree of closeness between the users in terms of a numerical value; a social information history accumulation unit which accumulates the social information as a history; and a priority determination unit which determines an evaluation time period out of the predetermined time periods based on the meta-information, calculates a degree of intimacy between the shared users during the evaluation time period based on the social information, and determines a priority of the evaluation time period according to the calculated degree of intimacy, the evaluation time period being a time period when a content was generated.

BRIEF DESCRIPTION OF DRAWINGS

FIG. 2 is a diagram showing an example of a lifelog information table between users to be used in calculating a degree of intimacy in the first embodiment of the invention;

FIG. 5 is a diagram showing an example of a social information accumulated information table in the first embodiment of the invention;

FIG. 6 is a diagram showing an example of a shared user information table in the first embodiment of the invention;

FIG. 7 is a diagram showing an example of a friend list information table of the user "A" in the first embodiment of the invention;

FIG. 10 is a diagram showing an example of a table describing the degrees of intimacy between each of the shared users and users having a relationship with each shared user in the social information "S1" shown in FIG. 5;

FIG. 11 is a diagram showing an example of a table describing the degrees of intimacy between each of the shared users and users having a relationship with each shared user in the social information "S2" shown in FIG. 5;

FIG. 12 is a diagram showing an example of all the social information tables between shared users in the first embodiment of the invention;

FIG. 13 is a diagram showing an example of a content information table in the first embodiment of the invention;

FIG. 14 is a diagram showing an example of an evaluation time period information table in the first embodiment of the invention;

FIG. 16 is a diagram showing an example of a definition on a one-sided pair and a mutual pair as shared users in the first embodiment of the invention;

FIG. 24 is a diagram showing an example of a content information table in the second embodiment of the invention;

FIG. 30 is a diagram showing an example of a non-shared user information table for individual shared users in social information "S1" and in social information "S2" in the second embodiment of the invention;

FIG. 31 is a diagram showing an example of a non-shared user information table for individual shared users during an evaluation time period "V1" in the second embodiment of the invention;

FIG. 32 is a diagram showing an example of a non-shared user information table for all the shared users during the evaluation time period "V1" in the second embodiment of the invention;

FIG. 33 is a diagram showing an example of a non-shared subject information table during the evaluation time period "V1" in the second embodiment of the invention;

DESCRIPTION OF EMBODIMENTS

Figure 1:
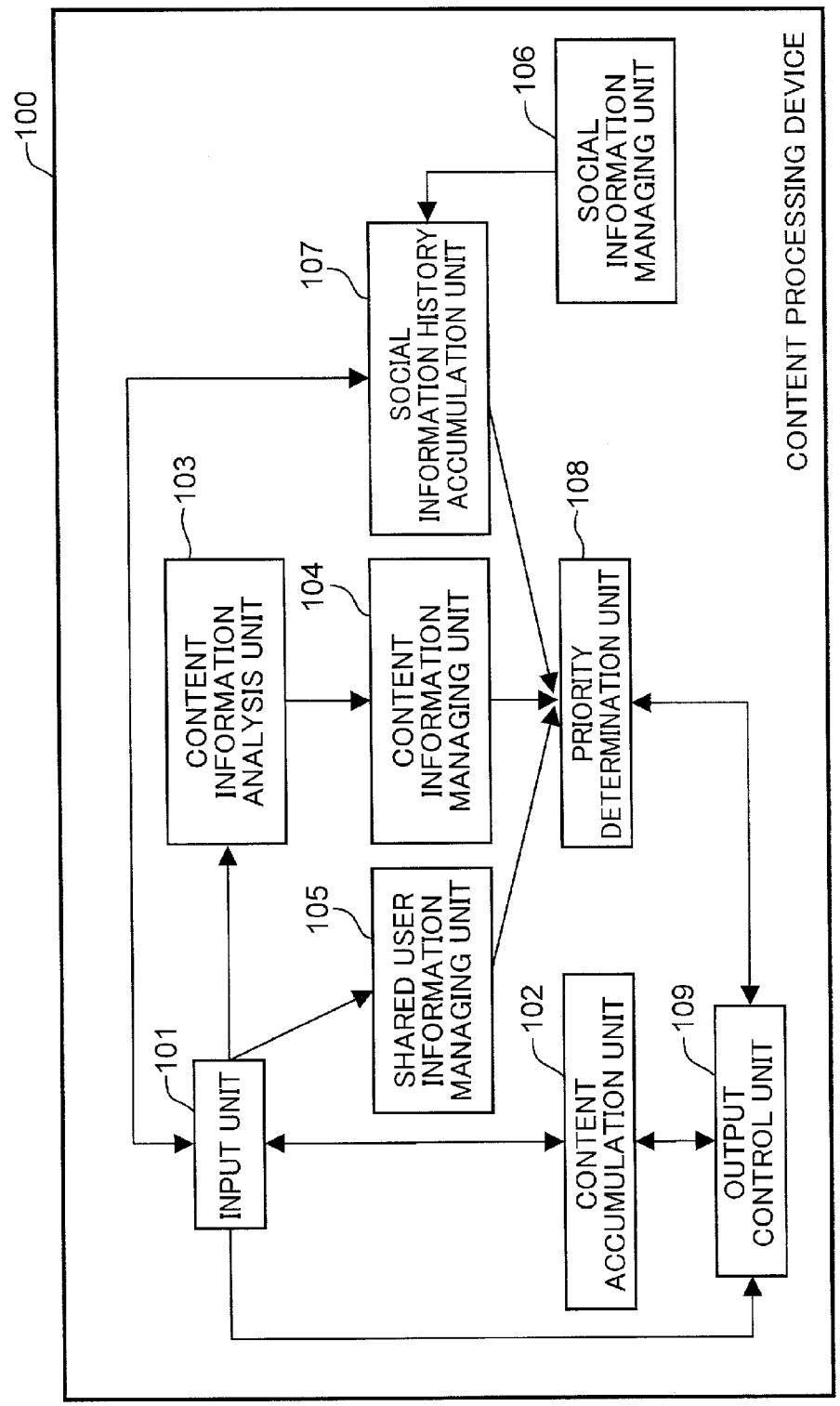
FIG. 1 is a block diagram showing a configuration of a content processing device according to a first embodiment of the invention.

In the following, embodiments of the invention are described referring to the accompanying drawings. In the embodiments, like constituent elements are indicated by like reference numerals, and repeated description thereof is omitted herein.

First Embodiment

FIG. 1 is a block diagram showing a configuration of a content processing device 100 according to the first embodiment of the invention. Referring to FIG. 1, the content processing device 100 is provided with an input unit 101, a content accumulation unit 102, a content information analysis unit 103, a content information managing unit 104, a shared user information managing unit 105, a social information managing unit 106, a social information history accumulation unit 107, a priority determination unit 108, and an output control unit 109.

The content processing device 100 according to the first embodiment may be any device, as far as the device is capable of inserting an external storage medium storing contents such as still images or moving images. Examples of the content processing device 100 may include a personal computer, a video recorder, a digital still camera capable of photographing still images or moving images, a digital video camera, and a mobile terminal.

The input unit 101 receives input of a content to be processed, and transfers the received content to the content accumulation unit 102. Further, the input unit 101 receives input of shared user information, which is the information relating to shared users who share the content, and outputs the inputted shared user information to the shared user information managing unit 105. The input unit 101 may be constituted of a recording medium driving device capable of inserting an external storage medium, or may be constituted of a camera module, or may be constituted of an input device such as a keyboard or a touch panel, or may be constituted of a wireless communication module such as an RFID (Radio Frequency IDentification) reader, or may be constituted of a microphone module or a touch pad.

A content may be inputted by connecting an external storage medium storing contents in advance to the content processing device 100 and by causing the input unit 101 to read a content recorded in the external storage medium. Further, a content may be inputted to the input unit 101 by wireless communication with use of a wireless communication module built in the content processing device 100. Alternatively, a content may be inputted by allowing a user to select a content stored in a storage medium such as a PC, a mobile device, or an external hard disk, and by transmitting the selected content to the content processing device 100 via a network on an internet site connectable to the content processing device 100 via the network.

Further, a content may be inputted by photographing the content by a camera module built in the content processing device 100 and by transferring the photographed content to the content processing device 100. Further, a content may be inputted by recording, in an RFID tag, content information such as URL (Uniform Resource Locator) information storing contents in advance, causing an RFID reader built in the content processing device 100 to acquire the URL of the content from the RFID tag, and accessing to the acquired URL via a network.

Shared user information may be inputted by photographing the face of a user by a camera module built in the content processing device 100. In this configuration, the content processing device 100 may acquire user information by executing a processing of recognizing the face of a user from a photographed image of the user. Further, shared user information may be inputted by causing a camera module built in the content processing device 100 to read the barcode information (e.g. QR (Quick Response) code) indicating the user information stored in a mobile terminal of the user, for instance.

Further, shared user information may be inputted by allowing a user to directly input user information to the content processing device 100 through a keyboard or a touch panel. Further, shared user information may be inputted by causing a GUI (Graphical User Interface) presented by the content processing device 100 to display a list of user information, and by allowing a user to select user information for which a content is shared, from among the user information.

Further, shared user information may be inputted by allowing a user to input user information on an internet site connectable to the content processing device 100 via a network, and by transmitting the user information to the content processing device 100 via the network. Further, shared user information may be inputted by causing an RFID reader built in the content processing device 100 to read user information recorded in advance in an RFID tag. Further, shared user information may be inputted by causing a microphone module built in the content processing device 100 to acquire a voice of a user. In the above configuration, the content processing device 100 may specify a shared user by voice-recognizing the acquired voice. Further, user information may be inputted by allowing a user to input characters through a touch pad built in the content processing device 100. In the above configuration, the content processing device 100 may specify a shared user by character-recognizing the inputted characters.

The content accumulation unit 102 accumulates a content transferred from the input unit 101 in the form capable of re-reading into a storage medium constituted of a hard disk or a flash memory.

The content information analysis unit 103 reads a content received by the input unit 101 and analyzes meta-information (e.g. the content name, or the generation date and time) of the content. Then, the content information analysis unit 103 outputs the analyzed meta-information to the content information managing unit 104 as content information.

The content information managing unit 104 stores the content information outputted from the content information analysis unit 103. The details on the content information will be described later.

The shared user information managing unit 105 manages the shared user information (e.g. the user name) received by the input unit 101.

The social information managing unit 106 calculates, at every predetermined time period, social information that defines the relationship between the users and the degree of intimacy indicating the degree of closeness between the users in terms of a numerical value calculated based on lifelog information managing an interaction history between the users, and manages the social information. FIG. 2 is a diagram showing an example of a lifelog information table between the users to be used in calculating a degree of intimacy in the first embodiment of the invention. The lifelog information table is a table to be generated and managed by the social information managing unit 106. An example of the lifelog information in this embodiment is lifelog information managed by the SNS (Social Networking Service). Accordingly, in this embodiment, social information is generated with use of lifelog information acquired from an SNS server.

In the example of FIG. 2, information indicating that the user "A" and the user "B" are friends is registered on the SNS, and lifelog information of the user "A" is presented to the user "B". Accordingly, in FIG. 2, "A" is described in the column "I", and "B" is described in the column "YOU". The details on registration of the friend relationship will be described later.

In the example of FIG. 2, as "LOG INFORMATION TYPE" in the third column, there are registered "PAGE BROWSING", "COMMENT INPUT ON PAGE", "MESSAGE TRANSMISSION", "NUMBER OF SIMILAR REGISTERED COMMUNITIES/APPLICATIONS", "NUMBER OF SIMILAR REGISTERED SCHEDULES", and "NUMBER OF PUBLIC CONTENTS".

"PAGE" means WEB pages, on which information (blogs, photo albums, twitter information, etc.) about a friend managed by the friend on the SNS is described. "COMMENT INPUT ON PAGE" means input of comments or affirmative information (e.g. "Like!") with respect to the friend's information. "MESSAGE TRANSMISSION" means sending, to the friend, a text or a content (e.g. a still image or a moving image) with use of an electronic mail.

"NUMBER OF SIMILAR REGISTERED COMMUNITIES/APPLICATIONS" means the number of similar communities or applications (hereinafter, also called as "apps") out of the communities or applications registered by each of the users on the SNS.

In this example, "SIMILAR" means that the names of the communities or apps are the same as each other, or correlated to each other, or the IDs of the communities or apps are identical to each other, or the genres of the communities or apps are the same as each other. "COMMUNITY" means a place where the users who are interested in the topics of various genres such as movies, musicians, TV programs, or sports gather and exchange information. "APPS" means a game which the users can play with their friends, or a tool for modifying photographs.

These communities or apps are provided on the SNS. The users can freely utilize the communities or apps by registering the communities or apps according to their preference.

"NUMBER OF SIMILAR REGISTERED SCHEDULES" means the number of schedules whose time periods overlap and which are similar to each other, out of the schedules registered on a calendar by each of the users on the SNS. In this example, "SIMILAR" means that the names of the schedules are the same as each other, or are correlated to each other, or the IDs of the schedules are identical to each other, or the genres of the schedules are the same as each other. In this example, the number of schedules whose time periods overlap and which are similar to each other is described as the number of similar registered schedules. Alternatively, the number of similar schedules may be used as the number of similar registered schedules, regardless that the time periods of the schedules do not overlap each other.

"NUMBER OF PUBLIC CONTENTS" means the number of contents which are supposed to be disclosed in disclosure setting as to whether a blog, twitter information, a content (a still image or a moving image) posted by a user on the SNS is disclosed to the communication user.

"NUMBER OF TIMES" in the fourth column means the number of times of execution of the contents described in the column "LOG INFORMATION TYPE". In the example of FIG. 2, the number of times of page browsing is described as 38, the number of times of comment input on page is described as 152, and the number of times of message transmission is described as 14. This means that the user "B" browsed the page of the user "A" thirty-eight times, the user "B" inputted comments to the user "A" one hundred and fifty-two times, and the user "B" sent a message to the user "A" fourteen times. In the example of FIG. 2, the content whose number of times of execution was not acquired as log information is described as "-" (null). The same definition is also applied to the other items such as "ACCUMULATED TIME" and "QUANTITY OF INFORMATION".

"ACCUMULATED TIME" in the fifth column means an accumulated amount of time from browsing start to browsing end in "PAGE BROWSING". In this example, the accumulated amount of time is described as 3 hours and 41 minutes.

"LAPSE OF TIME FROM PREVIOUS TIME" in the sixth column means a lapse of time from the point of time when the operation was performed last time until the current time in "PAGE BROWSING", "COMMENT INPUT ON PAGE", and "MESSAGE TRANSMISSION". For instance, "LAPSE OF TIME FROM PREVIOUS TIME" in "PAGE BROWSING" is described as 23 hours and 12 minutes. This means that 23 hours and 12 minutes has passed from the point of time when the user "B" browsed the page of the user "A" last time. Further, "LAPSE OF TIME FROM PREVIOUS TIME" in "NUMBER OF SIMILAR REGISTERED COMMUNITIES/APPLICATIONS", and in "NUMBER OF SIMILAR REGISTERED SCHEDULES" is a lapse of time from the point of time when a similar registration was performed last time until the current time. For instance, "LAPSE OF TIME FROM PREVIOUS TIME" in "NUMBER OF SIMILAR REGISTERED COMMUNITIES/APPLICATIONS" is described as 726 hours and 31 minutes. This means that 726 hours and 31 minutes has passed from the point of time when the user "B" registered a community or an app similar to the community or app registered by the user "A".

"QUANTITY OF INFORMATION" in the seventh column means an accumulated number of characters of a comment, and an accumulated number of times of input of affirmative information with respect to the friend's information on a webpage in "COMMENT INPUT ON PAGE". In the example of FIG. 2, the accumulated number of characters is described as "12,621 CHARACTERS", and the accumulated number of times of input of affirmative information is described as "58 TIMES". "QUANTITY OF INFORMATION" in "MESSAGE TRANSMISSION" means an accumulated number of characters of a text, and an accumulated number of contents sent to the friend by an electronic mail. In the example of FIG. 2, the accumulated number of characters is described as "2,250 CHARACTERS", and the accumulated number of contents is described as "3 PIECES".

"QUANTITY OF INFORMATION" in "NUMBER OF SIMILAR REGISTERED COMMUNITIES/APPLICATIONS" means an accumulated number of similar registered communities or similar registered apps, and an accumulated amount of time when the user stayed in a similar registered community or the user played with a similar registered app. In this example, the similar registered community means a community similar to the community registered by the user "A" out of the communities registered by the user "B". The similar registered app means an app similar to the app registered by the user "A" out of the apps registered by the user "B". In the example of FIG. 2, as "QUANTITY OF INFORMATION" in "SIMILAR REGISTERED COMMUNITY", the accumulated number of similar registered communities is described as "10 PIECES" and the accumulated amount of time is described as "3 HOURS AND 58 MINUTES".

"QUANTITY OF INFORMATION" in "NUMBER OF SIMILAR REGISTERED SCHEDULES" means an accumulated number of similar registered schedules, which are the schedules whose time periods overlap and which are similar to each other, and means an accumulated amount of time period of similar registered schedules (for instance, if a similar registered schedule is from 14:00 to 16:00, the time period of the similar registered schedule is 2 hours). In the example of FIG. 2, as "QUANTITY OF INFORMATION" in "NUMBER OF SIMILAR REGISTERED SCHEDULES", the accumulated number of similar registered schedules is described as "13 PIECES", and the accumulated amount of time of the similar registered schedules is described as "45 HOURS AND 30 MINUTES".

"QUANTITY OF INFORMATION" in "NUMBER OF PUBLIC CONTENTS" indicates the number of blogs, twitter information, contents (still images and moving images) to be disclosed to the communication user. In the example of FIG. 2, the number of public contents is described as "1,427 PIECES".

"NUMBER OF AFFIRMATIVE EXPRESSIONS" in the eighth column means the number of expressions indicating affirmative implications (such as "like", "beautiful", "good", and "let's play") included in a text that has been inputted, transmitted, or registered. For instance, the number of affirmative expressions in "COMMENT INPUT ON PAGE" is described as 724 pieces.

"NUMBER OF NEGATIVE EXPRESSIONS" in the ninth column means the number of expressions indicating negative implications (such as "dislike", "kind of dislike", "bad", and "no way"). For instance, the number of negative expressions in "MESSAGE TRANSMISSION" is one piece.

In this embodiment, lifelog information managed by the SNS is used as lifelog information. Alternatively, for instance, lifelog information (such as telephone communication history information, mail history information, registered schedule information, companion record information, internet browsing history information, and application registration information) at a mobile terminal of each of the users may be used.

The social information history accumulation unit 107 accumulates, as a history, social information calculated by the social information managing unit 106 at every predetermined time period.

The priority determination unit 108 determines an evaluation time period, which is a time period when a content was generated, out of the predetermined periods, based on meta-information managed by the content information managing unit 104.

The content processing device in this embodiment determines a time period when the degree of intimacy between the shared users is high, and outputs a content generated during the above time period, prior to a content generated during a time period when the degree of intimacy between the shared users is low. Accordingly, the degree of intimacy between the shared users during a time period when a content is not generated is not utilized in content output control. Therefore, the priority determination unit 108 deletes a predetermined period when a content is not present (a content is not generated) from the evaluation time periods. In this example, the predetermined time period may correspond to one week or one month.

Then, the priority determination unit 108 calculates a degree of intimacy between the shared users during an evaluation time period, based on social information, determines the priority of the evaluation time period according to the calculated degree of intimacy, and outputs a determination result to the output control unit 109.

The output control unit 109 controls the output of a content generated during the evaluation time period according to the determination result outputted from the priority determination unit 108.

In the following, an operation to be performed by the content processing device 100 having the above configuration is described referring to FIGS. 3 to 22.

Figure 3:
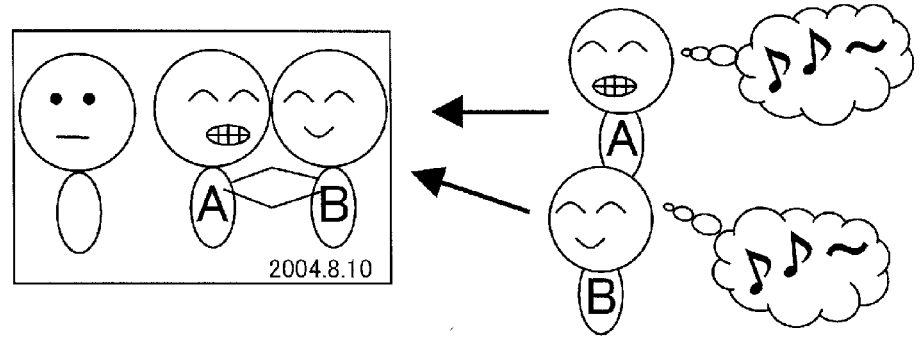
FIG. 3 is a schematic diagram showing an example of a scene, in which shared users browse a content photographed during a time period when the shared users were close to each other, and including the shared users as subjects.

FIG. 3 is a schematic diagram showing an example of a scene, in which shared users browse a content photographed during a time period when the shared users were close to each other, and including the shared users as subjects.

FIG. 3 shows a situation, in which the user "A" and the user "B" browse a content generated at the time 2004.8.10 when they were close to each other, and feel happy. In this embodiment, the output of a content is prioritized, based on the idea that shared users should have a good impression about the content, remembering the time when they were close, in the case where the shared users browse the content generated during a time period when they were close to each other.

Figure 4:
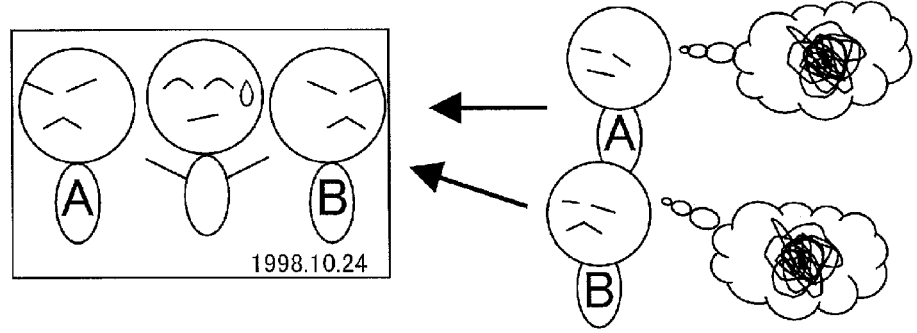
FIG. 4 is a schematic diagram showing an example of a scene, in which shared users browse a content photographed during a time period when the shared users were remote from each other, and including the shared users as subjects.

FIG. 4 is a schematic diagram showing an example of a situation, in which shared users browse a content photographed during a time period when the shared users were remote from each other, and including the shared users as subjects. In this example, a remote relationship includes a state that the degree of intimacy is low, a state that the shared users do not get along well, and a state that the shared users do not know each other.

FIG. 4 shows a situation, in which the user "A" and the user "B" browse a content photographed at the time 1998.10.24 when they were remote from each other, and feel awkward to each other. In this embodiment, the priority of a content to be outputted is lowered, based on the idea that shared users should feel awkward to each other, remembering a time when they were remote from each other, in the case where the shared users browse the content generated during a time period when they were remote from each other.

FIG. 5 is a diagram showing an example of a social information accumulated information table in the first embodiment of the invention. The social information accumulated information table is generated by the social information managing unit 106, and is stored and managed by the social information history accumulation unit 107. The social information history accumulation unit 107 accumulates social information generated by the social information managing unit 106 at every predetermined time period (in this example, every month). Referring to FIG. 5, the social information accumulated at the time 2011/4/1 0:00 by the social information history accumulation unit 107 is "S1", the social information accumulated at the time 2011/5/1 0:00, one month later than the above date by the social information history accumulation unit 107, is "S2", and likewise, the social information accumulated at the time 2012/3/1 0:00 by the social information history accumulation unit 107 is "S12".

FIG. 6 is a diagram showing an example of a shared user information table in the first embodiment of the invention. The shared user information table is a table managed by the shared user information managing unit 105. The shared user information acquired by the input unit 101 is described in the shared user information table. In the example of FIG. 6, "USER ID" and "SHARED USER NAME" of shared users are described in the shared user information table.

FIG. 7 is a diagram showing an example of a friend list information table of the user "A" in the first embodiment of the invention. The friend list information table is a table generated and managed by the social information managing unit 106. The friend list is a list, in which information relating to the persons who are registered to be friends by the user is described on the SNS, for instance. For instance, the user "A" requests to be friends with the user "B". When the request was accepted by the user "B", the user "B" is registered in the friend list information table of the user "A", and the user "A" is registered in the friend list information table of the user "B".

"FRIEND LIST NAME" indicates an attribute of the friend. "USER NAME BELONGING TO LIST" indicates a user name of a person whose attribute is described in "FRIEND LIST NAME".

In the example of FIG. 7, the user "D" is registered in "USER NAME BELONGING TO LIST", whose fried list name is "LOVER". Accordingly, the user "D" is the lover of the user "A". The user "F" is registered in "USER NAME BELONGING TO LIST", whose friend list name is "FAMILY MEMBER". Accordingly, the user "F" is a family member of the user "A". There is no user registered in "USER NAME BELONGING TO LIST", whose user list name is "BEST FRIEND". Accordingly, a best friend of the user "A" is not registered in the friend list information table. The user "B" and the user "C" are registered in "USER NAME BELONGING TO LIST", whose friend list name is "CLOSE FRIEND". Accordingly, the user "B" and the user "C" are close friends of the user "A". The user "E" is registered in "USER NAME BELONGING TO LIST", whose friend list name is "FRIEND". Accordingly, the user "E" is a friend of the user "A".

Figure 8:
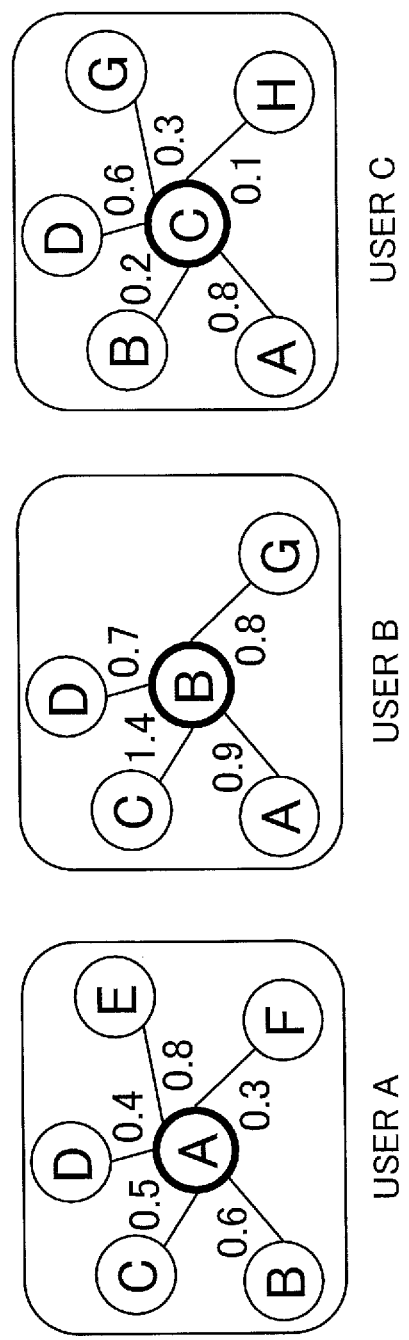
FIG. 8 is a diagram schematically showing users having a relationship with shared users in social information "S1" shown in FIG. 5.

FIG. 8 is a diagram schematically showing users having a relationship with shared users in the social information "S1" shown in FIG. 5. The social information is managed by the social information managing unit 106, and is accumulated in the social information history accumulation unit 107 at every predetermined time period. The social information "S1" is the social information accumulated at the time 2011/4/1 0:00. Referring to FIG. 8, the user names and the degrees of intimacy of the users whose relationships have been defined in the social information "S1" are conceptually illustrated with respect to each of the user "A", the user "B", and the user "C", who are the shared users. For instance, in the social information "S1", the user "A" has a relationship with the user "B", the user "C", the user "D", the user "E", and the user "F"; and the degrees of intimacy between the user "A" and each of the users are set to "0.6", "0.5", "0.4", "0.8", and "0.3" in the appearance order. The degrees of intimacy are such that the higher (closer to 3) the degree of intimacy is, the closer the relationship between the users is; and the lower (closer to 0) the degree of intimacy is, the farther the relationship between the users is. In this example, the degree of intimacy is expressed in terms of a numerical value which is not smaller than 0 but not larger than 3. The method for managing the degree of intimacy is not limited to the above, but may be a point system configured in such a manner that the score increases without an upper limit, or may be a system comprised of several levels such as levels A to E, whose granularity lowers stepwise. Further, in this example, the degree of intimacy with the user himself or herself is not taken into consideration. However, for instance, the degree of intimacy with the user himself or herself may be set to a predetermined value such as "1.0".

Figure 9:
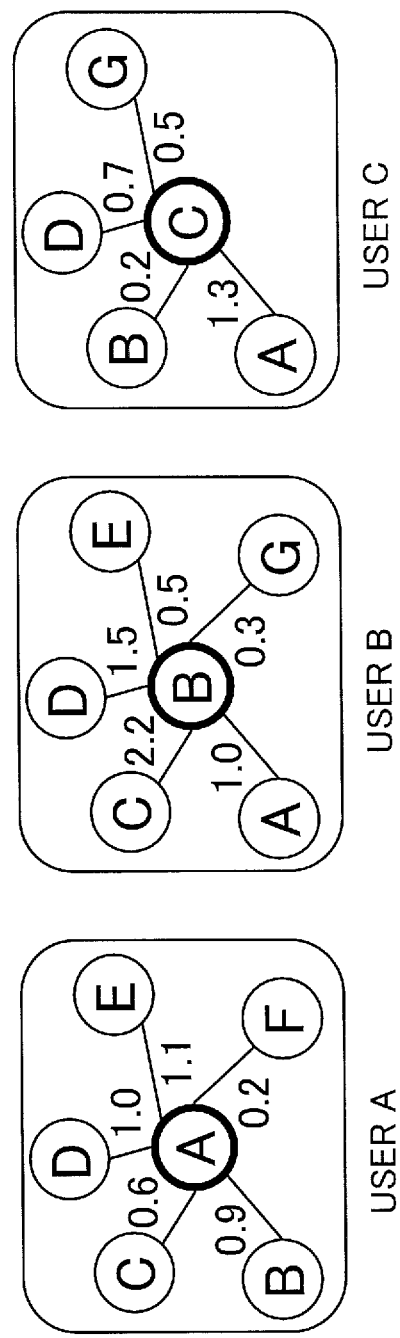
FIG. 9 is a diagram schematically showing users having a relationship with shared users in social information "S2" shown in FIG. 5.

FIG. 9 is a diagram schematically showing how users having a relationship with shared users in the social information "S2" shown in FIG. 5. The social information "S2" is the social information accumulated at the time 2011/5/1 0:00. In the social information "S2", the user "A" has a relationship with the user "B", the user "C", the user "D", the user "E", and the user "F"; and the degrees of intimacy between the user "A" and each of the users are set to "0.9", "0.6", "1.0", "1.1", and "0.2" in the appearance order. As is obvious from the comparison between FIG. 8 and FIG. 9, the degrees of intimacy between the user "A"; and the user "B", the user "C", the user "D", the user "E", and the user "F" vary.

FIG. 10 is a diagram showing an example of a table describing the degrees of intimacy between each of the shared users and users having a relationship with each shared user in the social information "S1" shown in FIG. 5. Referring to FIG. 10, the first column denotes the shared users, and the first row denotes the respective users who have a relationship with each of the shared users. Further, referring to FIG. 10, the degrees of intimacy between the same shared users, and the degrees of intimacy with users having no relationship are described as "-" (null). With use of the table shown in FIG. 10, social information regarding each of the shared users, and users who have a relationship with each shared user, which are schematically shown in FIG. 8, is managed.

FIG. 11 is a diagram showing an example of a table describing the degrees of intimacy between each of the shared users and users having a relationship with each shared user in the social information "S2" shown in FIG. 5. The social information schematically shown in FIG. 9 is managed by the table shown in FIG. 11 substantially in the same manner as FIG. 10.

FIG. 12 is a diagram showing an example of all the social information tables between shared users in the first embodiment of the invention. FIG. 12 shows the degrees of intimacy between shared users in each of the social information from the social information "S1" accumulated at the time 2011/4/1 0:00 to the social information "S12" accumulated at the time 2012/3/1 0:00. In this example, the time periods of the social information "S1" to the social information "S12" respectively correspond to the accumulation date and time of the social information "S1" to "S12" shown in FIG. 5.

FIG. 13 is a diagram showing an example of a content information table in the first embodiment of the invention. The content information table is a table generated by the content information analysis unit 103, and managed by the content information managing unit 104. Meta-information included in a content acquired by the input unit 101 is described in the content information table. In the example of FIG. 13, the content information table is provided with a column "CONTENT NAME" and a column "GENERATION DATE AND TIME". The content name of each content is described in the column "CONTENT NAME". Information indicating a generation timing of each content is described in the column "GENERATION DATE AND TIME". In the example of FIG. 13, it is described that the content "P-001" was generated at the time 2011/4/2 14:33.

FIG. 14 is a diagram showing an example of an evaluation time period information table in the first embodiment of the invention. The evaluation time period information table is a table generated and managed by the priority determination unit 108. The evaluation time period information table is provided with a column "CONTENT GENERATION TIME PERIOD" and a column "EVALUATION TIME PERIOD". The start date and the end date of each of the evaluation time periods are described in the column "CONTENT GENERATION TIME PERIOD". An identifier of each of the evaluation time periods is described in the column "EVALUATION TIME PERIOD".

"CONTENT GENERATION TIME PERIOD" is determined from the social information accumulation date and time described in the column "ACCUMULATION DATE AND TIME" in "ACCUMULATED INFORMATION TABLE" shown in FIG. 5, and from the content generation date and time described in the column "GENERATION DATE AND TIME" shown in FIG. 13.

In this embodiment, as shown in FIG. 5, social information is acquired every month. Accordingly, a time is divided into months, and determination is made as to whether a content was generated during each time period from the content information table shown in FIG. 13. If a content was generated during each time period, the time period is determined to be an evaluation time period.

In the example of FIG. 14, the time period from 2011/4/1 to 2011/4/30 is an evaluation time period "V1", the time period from 2011/5/1 to 2011/5/31 is an evaluation time period "V2", and likewise, the time period from 2012/3/1 to 2012/3/31 is an evaluation time period "V12".

Figure 15:
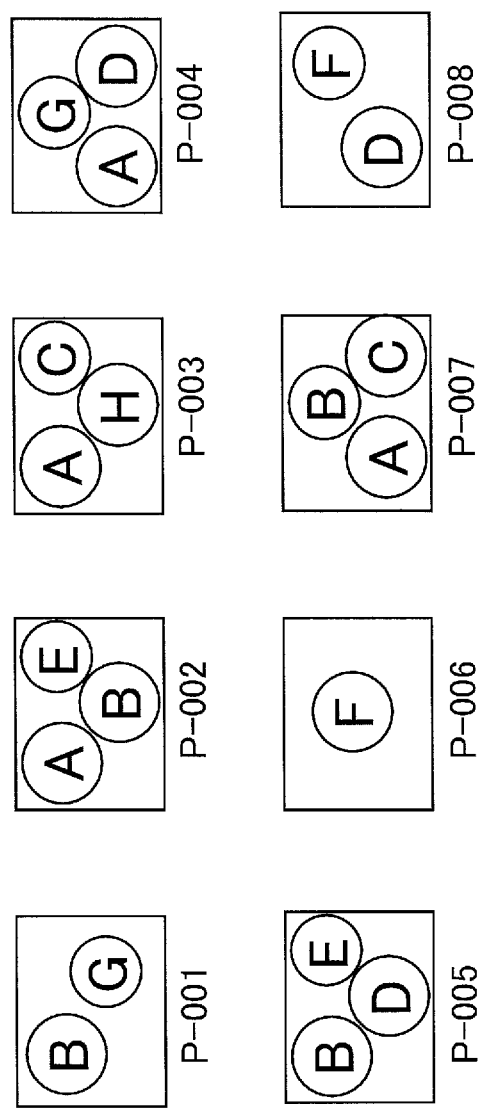
FIG. 15 is a diagram showing an example of contents included during an evaluation time period "V1" shown in FIG. 14.

FIG. 15 is a diagram showing an example of a content included in the evaluation time period "V1" shown in FIG. 14. In this example, a still image is an example of a content. In the example of FIG. 15, the user "B" and the user "G" appear as subject persons in the content "P-001".

This embodiment is described by taking a still image as an example of a content to be inputted. The type of a content is not limited to the above. For instance, any content may be used, as far as it is possible to discriminate between the generation date and time of a content such as a moving image, blog information or twitter information on the SNS; and person information (e.g. information relating to a subject person included in a content, an information sender, or a creator of a content) relating to a content.

FIG. 16 is a diagram showing an example of a definition on a one-sided pair and a mutual pair as shared users in the first embodiment of the invention. The one-sided pair means a pair based on the idea that the relationship of a certain user (in this example, a first user) with another user (in this example, a second user), and the relationship of the second user with the first user are different from each other.

The example of FIG. 16 shows a case, in which the shared users are the user "A", the user "B", and the user "C". In this example, there are six kinds of one-sided pairs: a pair constituted of the user "A" and the user "B", in which the user "A" has a certain relationship with the user "B", a pair constituted of the user "A" and the user "B", in which the user "B" has a certain relationship with the user "A", a pair constituted of the user "B" and the user "C", in which the user "B" has a certain relationship with the user "C", a pair constituted of the user "B" and the user "C", in which the user "C" has a certain relationship with the user "B", a pair constituted of the user "C" and the user "A", in which the user "C" has a certain relationship with the user "A", and a pair constituted of the user "C" and the user "A", in which the user "A" has a certain relationship with the user "C".

On the other hand, the mutual pair means a pair based on the idea that the relationship of a certain user (in this example, a first user) with another user (in this example, a second user), and the relationship of the second user with the first user are regarded to be the same as each other. The example of FIG. 16 shows a case, in which the shared users are the user "A", the user "B", and the user "C". In this example, there are three kinds of mutual pairs: a mutual pair constituted of the user "A" and the user "B", a mutual pair constituted of the user "B" and the user "C", and a mutual pair constituted of the user "C" and the user "A".

In the following, there is described an example, in which the shared users sharing a content inputted to the content processing device 100 are the user "A", the user "B", and the user "C".

Figure 17:
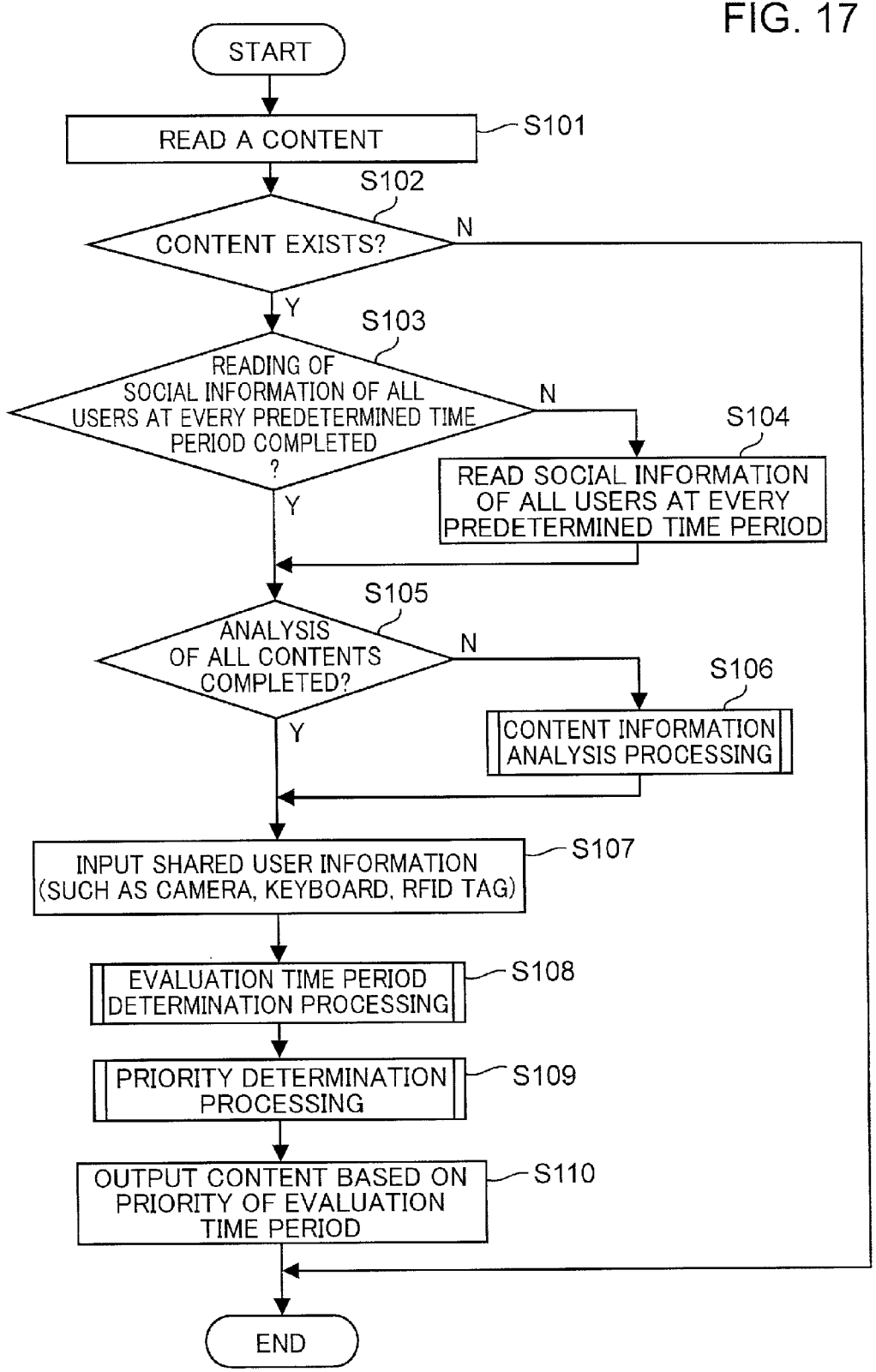
FIG. 17 is a flowchart of a content processing to be performed by the content processing device according to the first embodiment of the invention.

FIG. 17 is a flowchart of a content processing to be performed by the content processing device 100 according to the first embodiment of the invention.

The input unit 101 transfers in advance, to the content accumulation unit 102, a content i.e. a still image inputted to the content processing device 100, and the content is accumulated in the content accumulation unit 102. In this example, the input unit 101 acquires a content from an external storage medium by connecting the external storage medium storing contents to the content processing device 100.

Then, the input unit 101 receives an input operation from a user, and reads the content accumulated in the content accumulation unit 102 (Step S101). An example of the input operation is an operation of pressing a button to start reading an image.

Then, the input unit 101 checks whether there is at least one or more contents (Step S102). In the case where the input unit 101 confirms that there is no content, in other words, in the case where the input unit 101 confirms that no content is accumulated in the content accumulation unit 102 (N in Step S102), the input unit 101 finishes the content processing. On the other hand, in the case where the input unit 101 confirms that there is at least one or more contents (Y in Step S102), the input unit 101 checks whether reading of social information of all the users accumulated at every predetermined time period has been completed by the social information history accumulation unit 107 (Step S103). In the case where reading of social information of all the users accumulated at every predetermined time period has not been completed (N in Step S103), the input unit 101 reads the social information of all the users from the social information history accumulation unit 107 (Step S104).

It should be noted that the social information is calculated in advance based on the acquired lifelog information in acquiring the lifelog information at every predetermined time period by the social information managing unit 106, and is accumulated in the social information history accumulation unit 107.

On the other hand, in the case where reading of social information of all the users has been completed (Y in Step S103), the input unit 101 checks whether analysis by the content information analysis unit 103 regarding all the contents accumulated by the content accumulation unit 102 has been completed (Step S105). In the case where analysis of all the contents has not been completed (N in Step S105), the content information analysis unit 103 performs a content information analysis processing (Step S106). The details on the content information analysis processing will be described later referring to FIG. 18.

On the other hand, in the case where analysis of all the contents has been completed (Y in Step S105), the input unit 101 receives input of shared user information (Step S107). The shared user information managing unit 105 generates a shared user information table (see FIG. 6) from the shared user information received by the input unit 101, and manages the generated shared user information table.

Then, the priority determination unit 108 performs an evaluation time period determination processing (Step S108). The details on the evaluation time period determination processing will be described later referring to FIG. 19.

Then, the priority determination unit 108 performs a priority determination processing (Step S109). The details on the priority determination processing will be described later referring to FIGS. 20 and 21.

Then, the output control unit 109 outputs contents included during each of the evaluation time periods in the descending order of the priorities of the evaluation time periods (Step S110), and finishes the content processing.

In the following, the social information read in Step S103 in FIG. 17 is described referring to FIG. 2 and FIG. 7. The social information is calculated based on lifelog information of a user on the SNS. The lifelog information of a user on the SNS is managed as the lifelog information table shown in FIG. 2 by the social information managing unit 106. For instance, an operation history and registration information of a user on the SNS are accumulated in the lifelog information table. Specifically, examples of the operation history include a history on browsing a webpage of a communication user, inputting a comment on the webpage of the communication user, and transmitting a message to the communication user. Examples of the registration information include information on communities/applications registered on the SNS by the owner user and the communication user, schedule information registered on a calendar, and disclosure range information on a content such as a photograph, a moving image, and a blog.

User relationship information indicating the relationship between users, which is included in the social information, is extracted from a friend list registered by the user on the SNS, for instance. In this example, the friend list means a list indicating information relating to persons who have a friend relationship with the user. For instance, in the case where the user "A" requests to be friends with the user "B", and the request is accepted by the user "B", the user "B" is added to the friend list of the user "A", and the user "A" is added to the friend list of the user "B". The friend list does not rely on a content, and is the information reflecting the relationships between the users in the real world. The same idea is also applied to the aforementioned user relationship information.

Further, a degree of intimacy between users in the social information is calculated from the lifelog information managed by the lifelong information table.

The timing of calculating a degree of intimacy may be a timing of accumulating social information as a history by the social information history accumulation unit 107, or may be a predetermined timing (e.g. every day).

Further, the lifelog information table shown in FIG. 2 includes, as management indexes of lifelog information, "NUMBER OF TIMES", "ACCUMULATED TIME", "LAPSE OF TIME FROM PREVIOUS TIME", "QUANTITY OF INFORMATION", "NUMBER OF AFFIRMATIVE EXPRESSIONS", and "NUMBER OF NEGATIVE EXPRESSIONS" of each log information (e.g. "PAGE BROWSING" and "COMMENT INPUT ON PAGE"). Since each of the terms has been described in the foregoing, repeated description thereof is omitted herein.

In the following, a method for calculating a degree of intimacy between users with use of these management indexes is described. Regarding "NUMBER OF TIMES" in the fourth column in FIG. 2, information is managed in "PAGE BROWSING", "COMMENT INPUT ON PAGE", and "MESSAGE TRANSMISSION". In this example, there is used a computational algorithm such that the larger the "NUMBER OF TIMES" is, the higher the degree of intimacy of the user "A" with the user "B" is.

This is based on the idea that the owner user feels more friendly to a person who is the administrator of a webpage the owner user browses more, to a person who is the administrator of a webpage on which the owner user inputs a comment more frequently, and to a person to whom the owner user sends more messages. In this example, there is used a computational algorithm such that the degree of intimacy is added by "0.01" each time the "NUMBER OF TIMES" is incremented by "1".

In this example, there is used a computational algorithm such that the degree of intimacy is uniformly added in all the log information. The method for adding a degree of intimacy is not limited to the above. For instance, the degree of intimacy to be added may vary according to the degree of importance of log information.

Specifically, the following computational algorithm may be used. The degree of intimacy is added by "0.001" each time the number of times of "PAGE BROWSING" is incremented by "1". Further, the degree of intimacy is added by "0.01" each time the number of times of "COMMENT INPUT ON PAGE" is incremented by "1". Further, the degree of intimacy is added by "0.1" each time the number of times of "MESSAGE TRANSMISSION" is incremented by "1".

Regarding "ACCUMULATED TIME" in the fifth column of FIG. 2, information is managed by "PAGE BROWSING". In this example, there is used a computational algorithm such that the larger the numerical value is, the higher the degree of intimacy of the user "A" with the user "B" is.

This is based on the idea that the owner user feels more friendly to a person who is the administrator of a webpage the owner user browses for a longer period of time.

In this example, there is used a computational algorithm such that the degree of intimacy is added by "0.001" each time the accumulated time is incremented by "1 MINUTE".

Regarding "LAPSE OF TIME FROM PREVIOUS TIME" in the sixth column of FIG. 2, information is managed in all the log information. In this example, there is used a computational algorithm such that the larger the numerical value is, the lower the degree of intimacy of the user "A" with the user "B" is.

This is based on the idea that the owner user feels less friendly to a person to whom the owner user sends another message after a longer time has passed since the owner user sent a message to the person.

Specifically, there is used a computational algorithm such that the degree of intimacy is subtracted by "0.001" each time "LAPSE OF TIME AFTER PREVIOUS TIME" is incremented by "1 MINUTE".

In this example, the method for calculating a degree of intimacy is described by a method for subtracting a degree of intimacy by a predetermined value each time "LAPSE OF TIME AFTER PREVIOUS TIME" increases. The method for calculating a degree of intimacy is not limited to the above. For instance, it is possible to use a computational algorithm such that a predetermined value (e.g. "0.001") is added, as far as "LAPSE OF TIME FROM PREVIOUS TIME" is not larger than a predetermined threshold value (e.g. one hour or less).

Regarding "QUANTITY OF INFORMATION" in the seventh column in FIG. 2, information is managed in all the log information except for "PAGE BROWSING". In this example, there is used a computational algorithm such that the larger the numerical value is, the higher the degree of intimacy of the user "A" with the user "B" is.

This is based on the idea that the owner user feels more friendly to a person to whom the user discloses a larger number of contents.

Specifically, regarding "NUMBER OF PUBLIC CONTENTS", there is used a computational algorithm such that the degree of intimacy is added by "0.001" each time the quantity of information is incremented by "1 PIECE".

Regarding "NUMBER OF PUBLIC CONTENTS", there is used a computational algorithm such that the degree of intimacy is added by "0.001" each time "QUANTITY OF INFORMATION" is incremented by "1". The method is not limited to the above. For instance, it is possible to use a computational algorithm such that the degree of intimacy to be added is changed according to log information. For instance, regarding "NUMBER OF SIMILAR REGISTERED SCHEDULES", it is possible to use a computational algorithm such that the degree of intimacy is added by "0.01" each time "QUANTITY OF INFORMATION" is incremented by "1", and the degree of intimacy is added by "0.0001" each time "QUANTITY OF INFORMATION" is incremented by "1 MINUTE".

Regarding "NUMBER OF AFFIRMATIVE EXPRESSIONS" in the eighth column in FIG. 2, information is managed in "COMMENT INPUT ON PAGE", "MESSAGE TRANSMISSION", and "NUMBER OF SIMILAR REGISTERED SCHEDULES". In this example, there is used a computational algorithm such that the larger the numerical value is, the higher the degree of intimacy of the user "A" with the user "B" is.

This is based on the idea that the owner user feels more friendly to a person having a webpage to be managed by the person, on which a larger number of affirmative expressions is included in the user's comment to the person.

Specifically, there is used a computational algorithm such that the degree of intimacy is added by "0.001" each time the number of affirmative expressions is incremented by "1".

Regarding "NUMBER OF NEGATIVE EXPRESSIONS" in the ninth column in FIG. 2, information is managed in "COMMENT INPUT ON PAGE", "MESSAGE TRANSMISSION", and "NUMBER OF SIMILAR REGISTERED SCHEDULES". In this example, there is used a computational algorithm such that the larger the numerical value is, the lower the degree of intimacy of the user "A" with the user "B" is.

This is based on the idea that the owner user feels less friendly to a person having a webpage to be managed by the person, on which a larger number of negative expressions is included in the user's comment to the person.

Specifically, there is used a computational algorithm such that the degree of intimacy is subtracted by "0.001" each time "NUMBER OF NEGATIVE EXPRESSIONS" is incremented by "1".

In this example, a degree of intimacy is calculated from lifelog information managed in the lifelog information table shown in FIG. 2. The method for calculating a degree of intimacy is not limited to the above. For instance, it is possible to additionally use a method of setting a predetermined value according to the attribute of a friend registered by the user on the SNS for calculating a degree of intimacy.

For instance, let us explain a case, in which the attribute of a friend registered by the user "A" is managed by the friend list information table shown in FIG. 7 on the SNS. In this example, there is used a computational algorithm such that as the attribute of a friend described in the friend list name indicates a closer relationship, the higher the degree of intimacy of the owner user with the user registered in the friend list by the user himself or herself is.

This is based on the idea that the owner user feels more friendly to a person whose attribute name registered as the attribute of the person by the user indicates a closer relationship with the user.

For instance, in the case where the degree of intimacy decreases in the order from "LOVER", "FAMILY MEMBER", "BEST FRIEND", "CLOSE FRIEND", and "FRIEND" in "FRIEND LIST NAME", it is possible to use the following method for setting a degree of intimacy.

In the example of FIG. 7, a user whose friend list name is "LOVER" is the user "D". Accordingly, the degree of intimacy of the user "A" with the user "D" is set to e.g. "1.0". Further, a user whose friend list name is "FAMILY MEMBER" is the user "F". Accordingly, the degree of intimacy of the user "A" with the user "F" is set to e.g. "0.8". In the case where a user whose friend list name is "BEST FRIEND", the degree of intimacy of the user "A" with the user who is a best friend of the user "A" is set to e.g. "0.6". Users whose friend list name is "GOOD FRIEND" are the user "B" and the user "C". Accordingly, the degree of intimacy of the user "A" with the user "B" and with the user "C" is set to e.g. "0.4". Further, a user whose friend list name is "FRIEND" is the user "E". Accordingly, the degree of intimacy of the user "A" with the user "E" is set to e.g. "0.2".

In this example, the attributes of friends described in the friend list name are "LOVER", "FAMILY MEMBER", "BEST FRIEND", "CLOSE FRIEND", and "FRIEND". However, the attributes of friends are not limited to the above.

In the following, the content information analysis processing to be performed by the content information analysis unit 103 in Step S106 is described referring to FIG. 18.

Firstly, the content information analysis unit 103 extracts a content name and a content generation date and time, which are meta-information of a content to be processed, with use of EXIF (Exchangeable Image File Format) information recorded in the content, for instance; and registers the extracted content name and content generation date and time in the content information table while associating with each other (see FIG. 13) (Step S201).

Then, the content information analysis unit 103 checks whether the analysis processing in Step S201 has been completed for all the contents (Step S202). In the case where the analysis processing in Step S201 has not been completed for all the contents (N in Step S202), the content information analysis unit 103 sets a content whose analysis processing has not been completed, as a content to be analyzed (Step S203), and the content information analysis unit 103 returns the processing to Step S201.

On the other hand, in the case where the analysis processing in Step S201 has been completed for all the contents (Y in Step S202), the content information analysis processing is finished.

Figure 19:
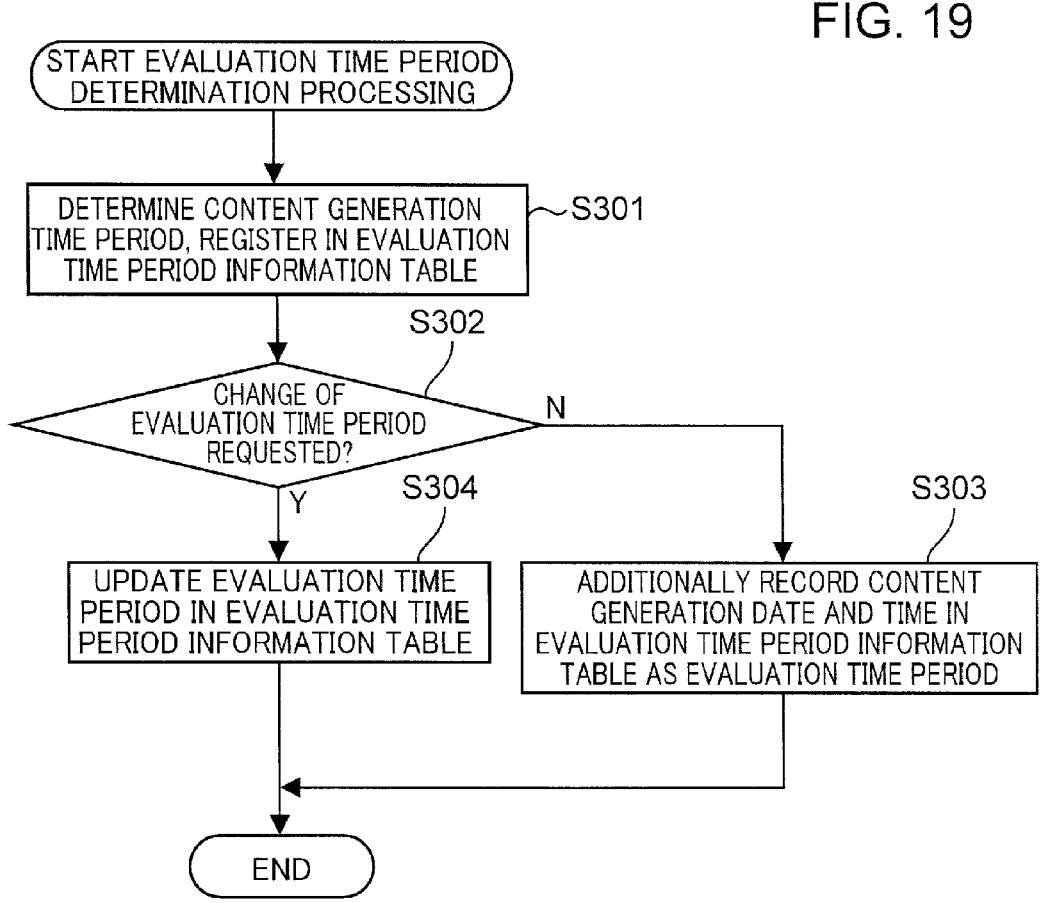
FIG. 19 is a flowchart of an evaluation time period determination processing to be performed in the first embodiment of the invention.

In the following, the evaluation time period determination processing to be performed by the priority determination unit 108 in Step S108 is described referring to FIG. 19.

Firstly, the priority determination unit 108 determines a content generation time period from the information described in "ACCUMULATION DATE AND TIME" in the social information accumulated information table (see FIG. 5), and from the information described in "CONTENT GENERATION DATE AND TIME" in the content information table (see FIG. 13); and registers the determined content generation time period in the evaluation time period information table (see FIG. 14) (Step S301).

In the example of FIG. 5, social information is accumulated every month, for instance, at the time 2011/4/1 0:00 and then at the time 2011/5/1 0:00. Further, in the example of FIG. 13, the content "P-001" was generated on 2011/4/2. In this case, at least one or more contents are included during a time period from 2011/4/1 to 2011/4/30, which includes the date and time when the content "P-001" was generated. Accordingly, the above time period is set as a content generation time period. Further, let us assume that a content generated on 2011/5/20 was inputted. In this case, a time period from 2011/5/1 to 2011/5/31, which includes the date and time when the content was generated, is also set as a content generation time period.

Then, the priority determination unit 108 checks whether the user requested to change an evaluation time period (Step S302). In this example, the change request is a request to change the evaluation time period set according to the content generation time period shown in FIG. 14 to a time period desired by the user. For instance, the user may set the time period from 2011/4/1 to 2011/5/31, which is a time period equal to the sum of the content generation time periods corresponding to "V1" and "V2" shown in FIG. 14, as the evaluation time period "V1". In this example, the change request may be received by the input unit 101 by displaying a "CHANGE REQUEST" button on a screen and by allowing the user to press the button.

In the case where there is no change request from the user with respect to the evaluation time period (N in Step S302), the aforementioned content generation time period is set as an evaluation time period, and the aforementioned content generation time period is additionally recorded in the evaluation time period information table (Step S303).

In the example of FIG. 14, the content generation time period is a time period from 2011/4/1 to 2011/4/30 or a time period from 2011/5/1 to 2011/5/31. In the case where there is no change request from the user with respect to the evaluation time period, the content generation time period is set as the evaluation time period as it is. In other words, the evaluation time period "V1" is set to be the time period from 2011/4/1 to 2011/4/30, and the evaluation time period "V2" is set to be the time period from 2011/5/1 to 2011/5/30.

On the other hand, in the case where there is a change request from the user with respect to the evaluation time period (Y in Step S302), the evaluation time period in the evaluation time period information table is updated (Step S304), and the evaluation time period determination processing is finished. For instance, the user can designate a time period from 2011/4/1 to 2011/5/31 as an evaluation time period.

In the following, the priority determination processing to be performed by the priority determination unit 108 in Step S109 is described referring to FIGS. 20A and 20B.

Firstly, the priority determination unit 108 selects, as social information to be used in the priority determination processing, social information at a predetermined accumulation date and time (e.g. the social information "S1" accumulated at the time 2011/4/1 0:00), which is managed by the social information history accumulation unit 107.

Then, the priority determination unit 108 checks whether two or more shared users are registered in the shared user information table (see FIG. 6) (Step S402).

In the case where two or more shared users are not registered in the shared user information table (N in Step S402), the priority determination unit 108 determines a shared user as the first user, and determines a user whose degree of intimacy with the first user is set in the social information selected in Step S401 as the second user (Step S403).

For instance, let us assume that the social information selected in Step S401 is "S1", and the shared user is the user "A". In this case, the first user is the user "A". Further, the second users are the user "B", the user "C", the user "D", the user "E", and the user "F", whose degrees of intimacy with the user "A" are set in the social information table of the user "A" in the social information "S1" shown in FIG. 10.

On the other hand, in the case where two or more shared users are registered in the shared user information table (Y in Step S402), a predetermined shared user (e.g. the user "A") is determined as the first user, and a shared user (e.g. the user "B") other than the first user is determined as the second user (Step S404).

In this example, in the case where two or more shared users are not registered in the shared user information table, in other words, in the case where the number of shared users is one, the shared user is determined as the first user, and a user whose degree of intimacy with the first user is set in the social information is determined as the second user. The method for determining the second user in the case where the number of shared users is one is not limited to the above.

For instance, the shared user information managing unit 105 may set a user inputted by the shared user in the input unit 101, as the second user. Alternatively, the shared user information managing unit 105 may select a user whose degree of intimacy with the shared user is highest in the social information at a time nearest to the content browsing time by the shared user, and may set the selected user as the second user. In this way, any method may be used as the method for selecting the second user, as far as it is possible to select the second shared user, even in the case where the number of shared users is one.

According to the above configuration, even in the case where two or more shared users do not exist in the shared user information table, in other words, even in the case where the number of shared users is one, the second shared user is selected without fail. Accordingly, even in the case where the number of shared users is one, it is possible to perform the priority determination processing in Step S109, and substantially the same effect as described in the case where there are two or more shared users can be obtained.

Subsequently, the priority determination unit 108 performs an intimacy degree extraction processing between the first user and the second user (Step S405). The details on the intimacy degree extraction processing will be described later referring to FIG. 21.

Then, the priority determination unit 108 checks whether extraction of an intimacy degree between shared users in all the social information at every accumulation date and time has been completed (Step S406). In the case where the extraction has not been completed (N in Step S406), the priority determination unit 108 sets social information in which extraction of an intimacy degree between shared users has not been completed, as the social information to be used in the priority determination processing (Step S407), and the priority determination unit 108 returns the processing to Step S402.

On the other hand, in the case where the extraction has been completed (Y in Step S406), the priority determination unit 108 extracts a predetermined evaluation time period (e.g. the evaluation time period "V1") (such as a time period from 2011/4/1 to 2011/4/30) from the evaluation time period information table under management, as a target evaluation time period (Step S408).

Then, the priority determination unit 108 calculates an evaluation value of the target evaluation time period from the degree of intimacy between shared users in the target evaluation time period (Step S409).

This embodiment is made based on the idea that shared users should have a good impression about a content, remembering the time when they were close, in the case where the shared users browse the content generated during a time period when they were close. Accordingly, an evaluation value is calculated, with use of a computational algorithm such that the closer the relationship between shared users during an evaluation time period is, the higher the evaluation value of the evaluation time period is.

The following is a practical example of a calculation processing of an evaluation value of the evaluation time period "V1". The degree of intimacy between shared users during the evaluation time period "V1" is calculated from an average of the degree of intimacy between shared users in the social information "S1", and the degree of intimacy between shared users in the social information "S2". As shown in FIG. 14, the evaluation time period "V1" is a time period from 2011/4/1 to 2011/4/30, and as shown in FIG. 5, the social information accumulated at times around the evaluation time period "V1" corresponds to the social information "S1" accumulated at the time 2011/4/1, and the social information "S2" accumulated at the time 2011/5/1. Accordingly, information obtained by averaging the social information "S1" and the social information "S2" is used as the social information during the evaluation time period "V1" in order to use information at the middle time of the evaluation time period "V1".

It is possible to calculate the degree of intimacy of the shared user "A" with the shared user "B" during the evaluation time period "V1" as follows with use of the values of the degrees of intimacy shown in FIG. 12.

(Degree of intimacy of user "A" with user "B" during evaluation time period "V1")=((degree of intimacy of user "A" with user "B" in social information "S1")+(degree of intimacy of user "A" with user "B" in social information "S2"))/2=(0.6+0.9)/2=0.75

In this example, the average value of the degrees of intimacy in social information at times around an evaluation time period is calculated as a degree of intimacy between shared users during the evaluation time period. The method is not limited to the above. It is possible to calculate a degree of intimacy between shared users during an evaluation time period, with use of other computational approach such as multiplication or subtraction.

Further as described above, as an evaluation value of an evaluation time period, there is used a computational algorithm such that the closer the relationship between shared users during an evaluation time period is, the higher the evaluation value of the evaluation time period is. Accordingly, a value obtained by summing up the degrees of intimacy between shared users during an evaluation time period is used as the evaluation value of the evaluation time period. In this example, it is possible to use the sum of the degrees of intimacy between the one-sided pairs shown in FIG. 16, as the sum of the degrees of intimacy between shared users.

For instance, it is possible to calculate an evaluation value of the evaluation time period "V1" as follows with use of the degrees of intimacy shown in FIG. 12.

(Evaluation value of evaluation time period "V1")= (degree of intimacy of user "A" with user "B" during evaluation time period "V1")+(degree of intimacy of user "B" with user "A" during evaluation time period "V1")+(degree of intimacy of user "B" with user "C" during evaluation time period "V1")+(degree of intimacy of user "C" with user "B" during evaluation time period "V1")+(degree of intimacy of user "C" with user "A" during evaluation time period "V1")+(degree of intimacy of user "A" with user "C" during evaluation time period "V1")= (0.75)+(0.95)+(1.8)+(0.2)+(1.05)+(0.55)=5.3

In this example, the sum of the degrees of intimacy between shared users during an evaluation time period is calculated as the evaluation value of the evaluation time period. The method is not limited to the above. For instance, it is possible to calculate an evaluation value of an evaluation time period with use of other approach such as multiplication or subtraction, as far as there is used a computational algorithm such that the closer the relationship between shared users during an evaluation time period is, the higher the evaluation value of the evaluation time period is.

Then, the priority determination unit 108 checks whether evaluation value calculation has been completed for all the evaluation time periods (Step S410). In the case where evaluation value calculation has not been completed for all the evaluation time periods (N in Step S410), the priority determination unit 108 sets an evaluation time period of which evaluation value calculation has not been completed, as a target evaluation time period (Step S411), and the priority determination unit 108 returns the processing to Step S409.

On the other hand, in the case where evaluation value calculation of an evaluation time period has been completed for all the evaluation time periods (Y in Step S410), the priority determination unit 108 determines that the higher the evaluation value of the evaluation time period is, the higher the priority of the evaluation time period is (Step S412), and the priority determination unit 108 finishes the priority determination processing.

The foregoing is a flow of the priority determination processing to be performed by the priority determination unit 108 in Step S109. After the priority determination processing has been performed as described above, the output control unit 109 outputs the contents included in the evaluation time periods in the descending order of the priorities of the evaluation time periods determined in the priority determination processing (Step S110 in FIG. 17).

In this example, the contents are outputted in the descending order of the priorities of the evaluation time periods including the contents. The method is not limited to the above. For instance, it is possible to use an output method, in which a content (e.g. bottom ten contents) included during an evaluation time period whose priority is lower than a predetermined rank is removed from the contents to be outputted. Alternatively, it is possible to use an output method, in which an output time of a content is increased in the descending order of the priorities of the evaluation time periods including the contents. Alternatively, it is possible to use an output method, in which a predetermined dramatic effect (e.g. enlarging the face image) is applied to a content (e.g. top ten contents) to be included during an evaluation time period whose priority is higher than a predetermined rank.

Figure 21:
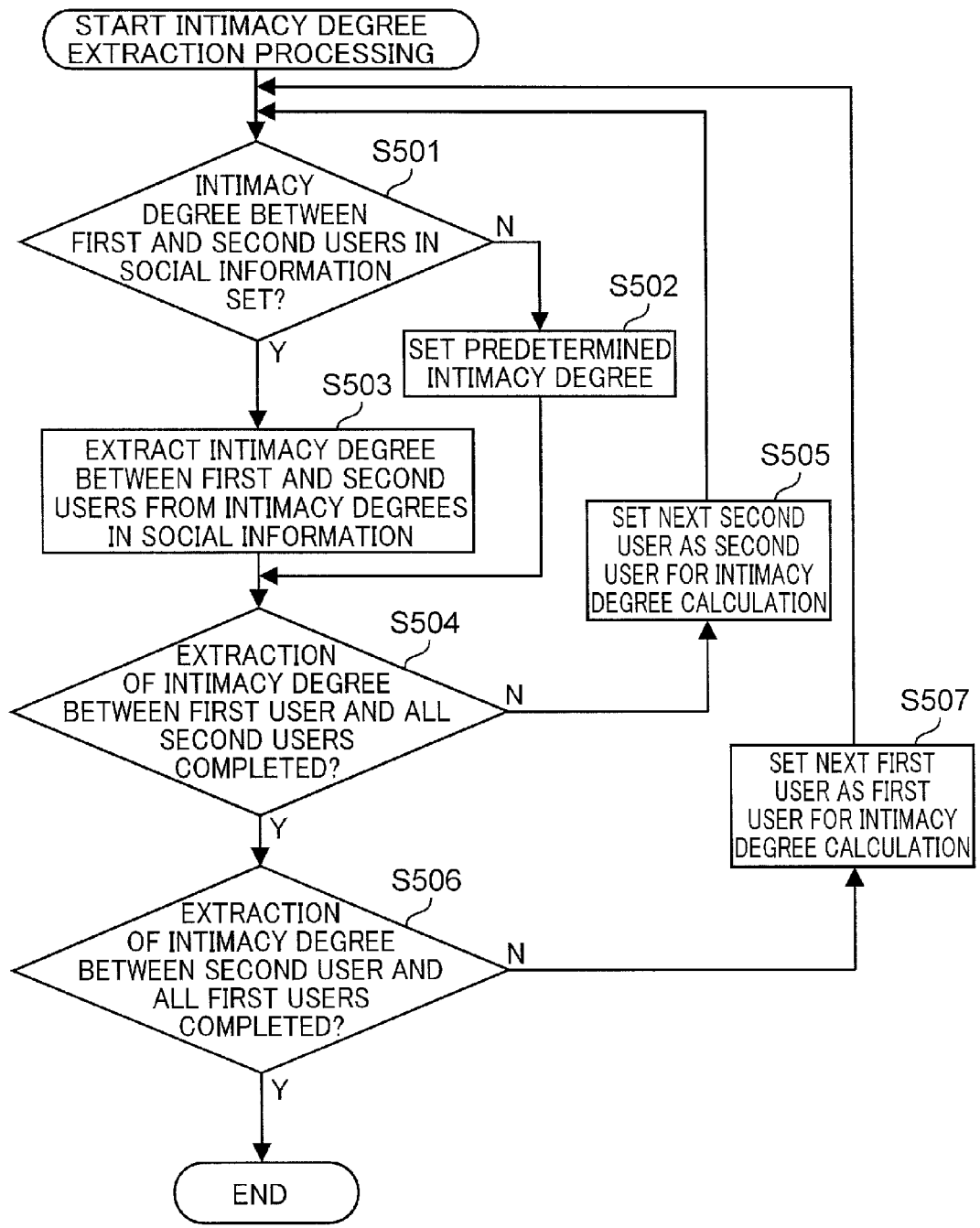
FIG. 21 is a flowchart showing a flow of an intimacy degree extraction processing to be performed in the first embodiment of the invention.

In the following, the intimacy degree extraction processing in Step S405 is described referring to FIG. 21.

Firstly, the priority determination unit 108 checks whether a degree of intimacy between the first user and the second user is set in the social information selected in Step S401 (Step S501). Specifically, the priority determination unit 108 determines whether a degree of intimacy between the first user and the second user is set in the social information table of each of the shared users shown in FIG. 10 and FIG. 11.

For instance, let us assume that the social information is the social information "S1" in FIG. 10, the first user is the user "A", and the second user is the user "B". In the social information "S1" in FIG. 10, a degree of intimacy "0.6" (in the case where the user "A" is I, and the user "B" is YOU), and a degree of intimacy "0.9" (in the case where the user "B" is I, and the user "A" is YOU) are described as factors representing the relationship between the user "A" and the user "B". Accordingly, it is determined that a degree of intimacy between the user "A" and the user "B" is set in the social information "S1".

On the other hand, let us assume that the social information is the social information "S1" in FIG. 10, the first user is the user "A", and the second user is the user "G". In the social information "S1", no degree of intimacy is described as a factor representing the relationship between the user "A" and the user "G". Accordingly, it is determined that a degree of intimacy between the user "A" and the user "G" is not set in the social information "S1".

In the case where a degree of intimacy between the first user and the second user is not set in the social information (N in Step S501), the priority determination unit 108 sets a predetermined value (e.g. "0.0") as a degree of intimacy (Step S502).

On the other hand, in the case where a degree of intimacy between the first user and the second user is set in the social information (Y in Step S501), the priority determination unit 108 extracts a degree of intimacy between the first user and the second user from the social information (Step S503).

Then, the priority determination unit 108 checks whether extraction of a degree of intimacy between the first user and all the second users has been completed for a content to be processed (Step S504). In the case where extraction of a degree of intimacy between the first user and all the second users has not been completed for a content to be processed (N in Step S504), the priority determination unit 108 sets a second user for which an intimacy degree calculation processing has not been completed, as the second user with which a degree of intimacy of the first user is to be calculated (Step S505), and the priority determination unit 108 returns the processing to Step S501.

On the other hand, in the case where extraction of a degree of intimacy between the first user and all the second users has been completed for a content to be processed (Y in Step S504), the priority determination unit 108 checks whether extraction of a degree of intimacy between the second user and all the first users has been completed for a content to be processed (Step S506).

In the case where extraction of a degree of intimacy between the second user and all the first users has not been completed (N in Step S506), the priority determination unit 108 sets a first user for which an intimacy degree calculation processing has not been completed, as the first user with which a degree of intimacy of the second user is to be calculated (Step S507), and the priority determination unit 108 returns the processing to Step S501. On the other hand, in the case where extraction of a degree of intimacy between the second user and all the first users has been completed (Y in Step S506), the priority determination unit 108 finishes the intimacy degree extraction processing.

Figure 38:
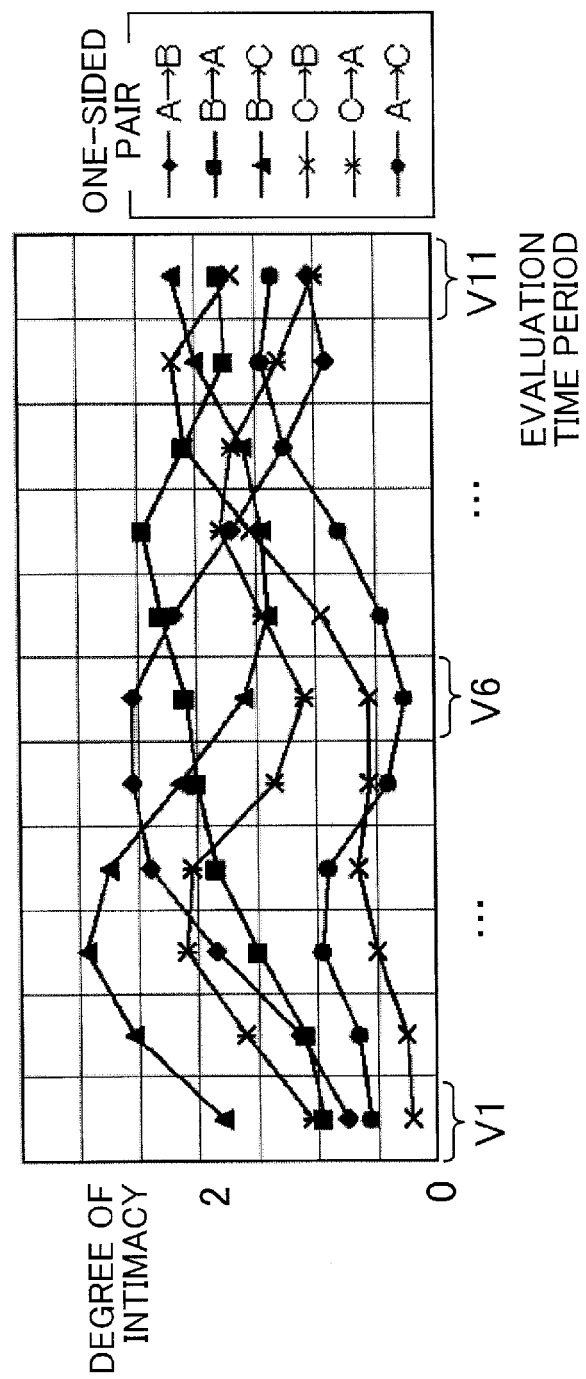
FIG. 38 is a graph showing degrees of intimacy between one-sided pairs as shared users during each of the evaluation time periods "V1" to "V11"

In the following, a practical example of an intimacy degree during each of the evaluation time periods in the thus configured content processing device 100 is described referring to FIG. 38. FIG. 38 is a graph showing degrees of intimacy between one-sided pairs as shared users during each of the evaluation time period "V1" to the evaluation time period "V11". Referring to FIG. 38, the vertical axis indicates a degree of intimacy, and the horizontal axis indicates an evaluation time period. Further, in FIG. 38, the degrees of intimacy are calculated based on the degrees of intimacy shown in FIG. 12.

In the example of FIG. 38, the sums of the degrees of intimacy between one-sided pairs as shared users during each of the evaluation time periods are "5.3", "7.3", "9.85", "10.6", "9.0", "8.15", "8.75", "9.75", "10.0", "9.6", and "9.1" in the order from "V1".

Accordingly, using the sums of the degrees of intimacy as evaluation values of the respective evaluation time periods yields the following evaluation time periods in the descending order of the evaluation values: "V4">"V9">"V3">"V8">"V10">"V11">"V5">"V7">"V6">"V2">"V1". Accordingly, the priority of a content generated during the evaluation time period "V4" is determined to be highest, and the priority of a content generated during the evaluation time period "V1" is determined to be lowest. The output of contents is controlled according to the priorities determined at the respective evaluation time periods.

According to the above configuration, a degree of intimacy between shared users during each of the evaluation time periods is calculated based on lifelog information, a priority of each of the evaluation time periods is determined from the degree of intimacy between shared users during each of the evaluation time periods, and the output of contents is controlled according to the determined priorities.

In other words, in this configuration, a time period when the relationship between shared users is close is determined from social information, and output of a content generated during a time period when the shared users were close is prioritized. Accordingly, it is possible to control the output of contents, taking into consideration of a degree of intimacy between shared users, which may vary as time goes by.

Further, not a degree of intimacy that is presumed from the contents of a content, but closeness between shared users is evaluated with use of the degrees of intimacy set in the social information. Accordingly, this is advantageous in accurately determining a time period when the shared users are close to each other.

Figure 20A:
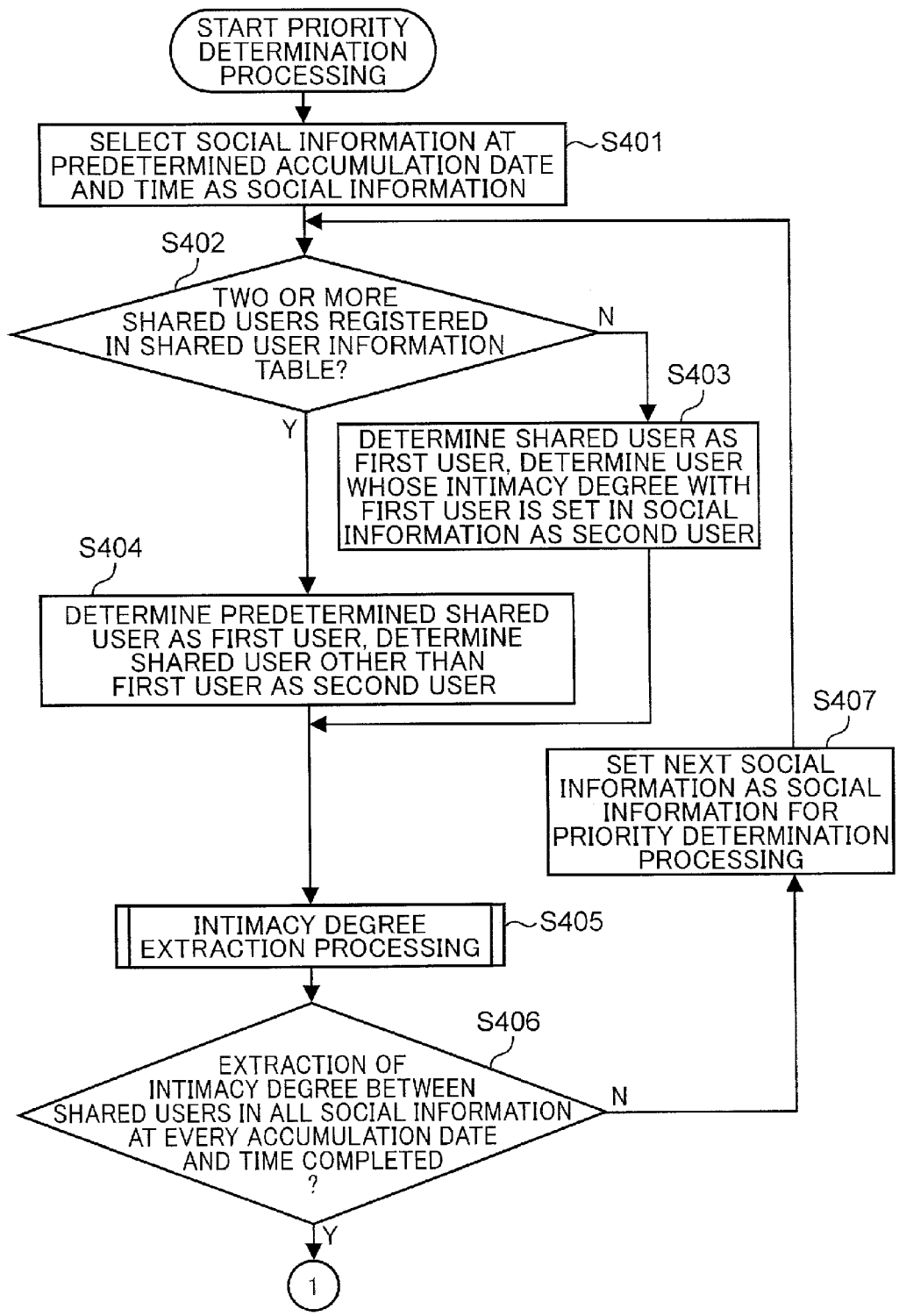
FIGS. 20A and 20B are a flowchart of a priority determination processing to be performed in the first embodiment of the invention.
Figure 20B:
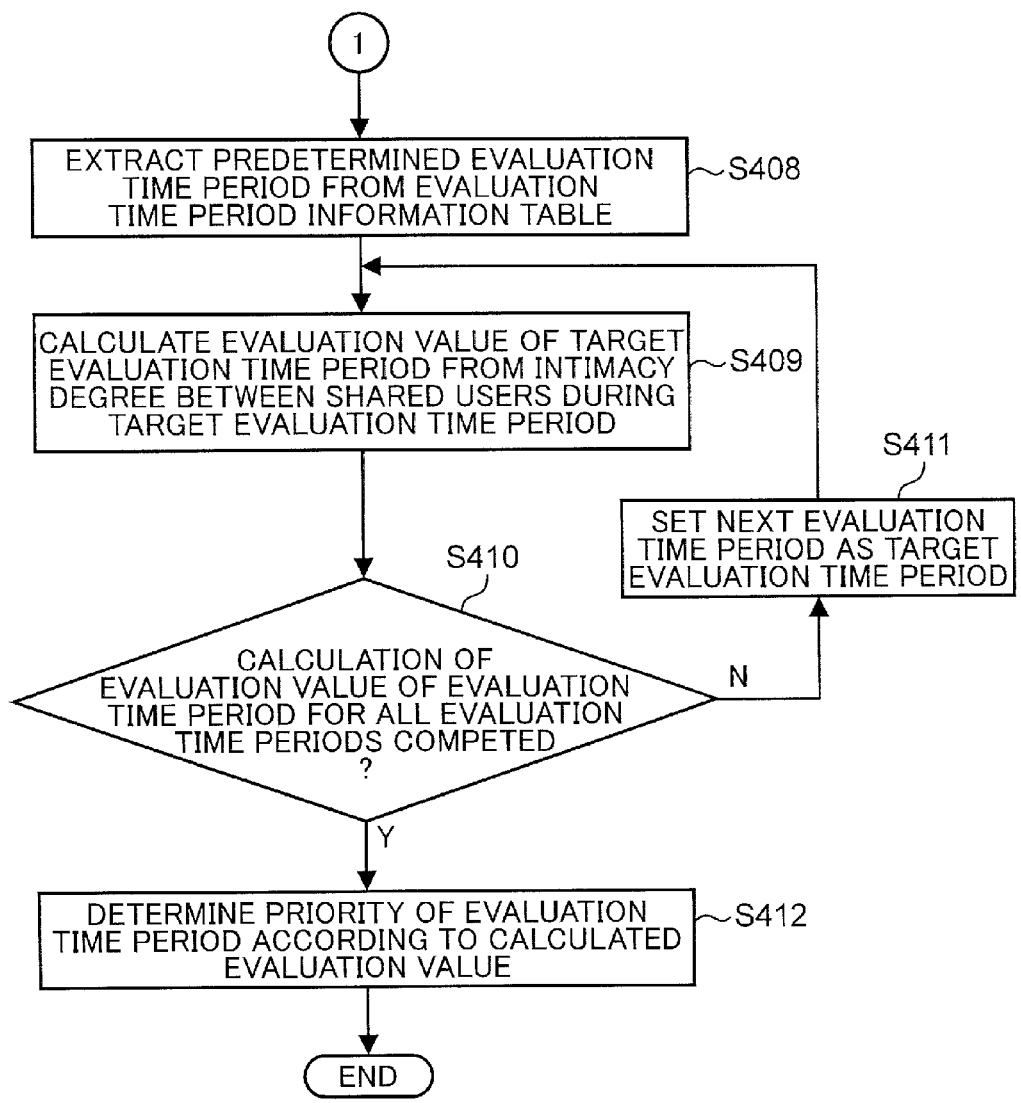

A sum of the degrees of intimacy between shared users during an evaluation time period is used as the evaluation value of the evaluation time period in Step S409 in FIGS. 20A and 20B. The method is not limited to the above. For instance, it is possible to calculate an evaluation value of an evaluation time period from a variation of the degree of intimacy between shared users.

In the modification of the first embodiment, a variation of the degree of intimacy between shared users during the evaluation time period "V1" is calculated from the degree of intimacy between shared users in the social information "S1", and from the degree of intimacy between shared users in the social information "S2". In this example, in calculating a variation, determination may be made, taking into consideration not only a magnitude of a variation of the degree of intimacy between shared users during an evaluation time period, but also discrimination as to whether the gradient of the variation is plus (the degree of intimacy increases) or minus (the degree of intimacy decreases) in order to extend the evaluation value range.

In view of the above, a value obtained by subtracting, from the degree of intimacy between shared users in the social information "S2" accumulated at an end time of the evaluation time period "V1", the degree of intimacy between shared users in the social information "S1" accumulated at a start time of the evaluation time period "V1", as a variation of the degree of intimacy between shared users during the evaluation time period "V1".

Specifically, it is possible to calculate a variation of the degree of intimacy of the shared user "A" with the shared user "B" during the evaluation time period "V1" as follows with use of the degrees of intimacy shown in FIG. 12.

(Variation of degree of intimacy of user "A" with
user "B" during evaluation time period "V1")=
(degree of intimacy of user "A" with user "B"
in social information "S2")−(degree of intimacy
of user "A" with user "B" in social information
"S1")=(0.9)−(0.6)=0.3

In the following, a practical example of a degree of intimacy during each of the evaluation time periods in the content processing device 100 as the modification of the first embodiment is described referring to FIG. 39.

Figure 39:
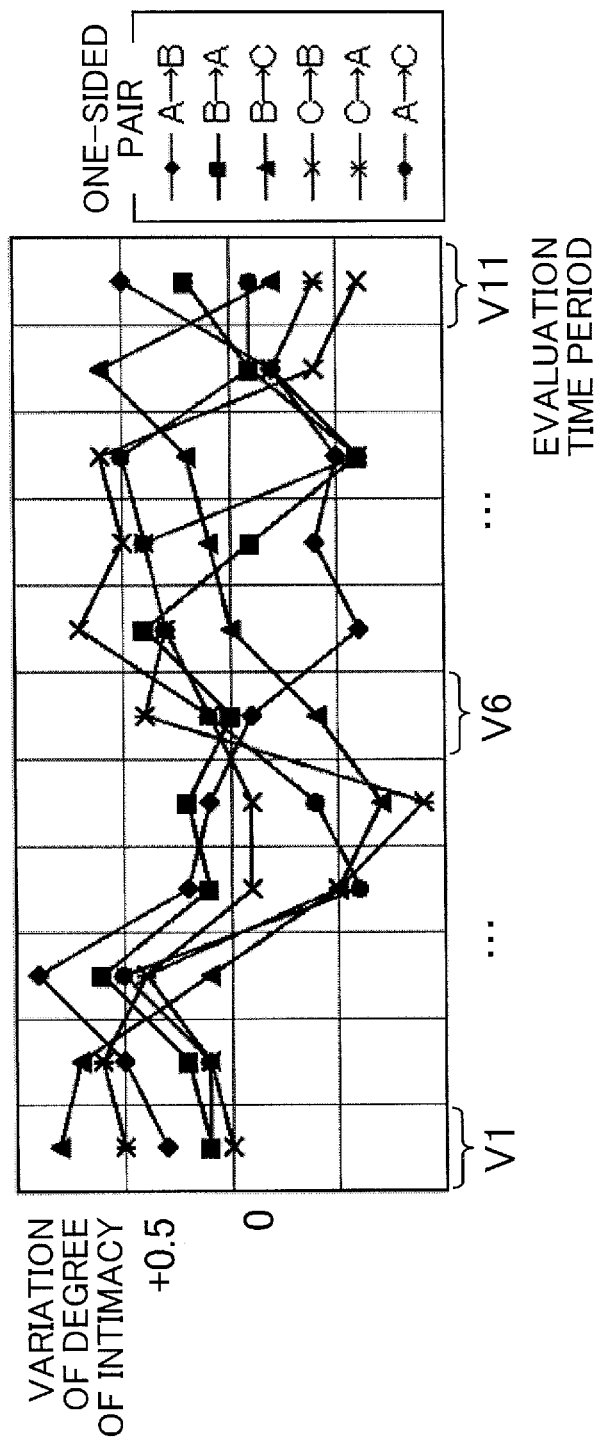
FIG. 39 is a graph showing variations of the degrees of intimacy between one-sided pairs as shared users during each of the evaluation time periods "V1" to "V11" in the first embodiment of the invention.

FIG. 39 is a graph showing variations of the degrees of intimacy between one-sided pairs as shared users during each of the evaluation time periods "V1" to "V11" in the first embodiment of the invention. Referring to FIG. 39, the vertical axis denotes a variation of the degree of intimacy, and the horizontal axis denotes an evaluation time period. Further, in FIG. 39, the degrees of intimacy are calculated based on the degrees of intimacy shown in FIG. 12.

In the example of FIG. 39, the sums of variations of the degrees of intimacy between all the one-sided pairs as shared users during each of the evaluation time periods are "1.8", "2.2", "2.9", "−1.4", "−1.8", "0.1", "1.1", "0.9", "−0.4", "−0.4", and "−0.6" in the order from "V1".

Accordingly, using the variations of the degrees of intimacy as evaluation values of the respective evaluation time periods yields the evaluation time periods: "V3">"V2">"V1">"V7">"V8">"V6">"V9"="V10"> "V11">"V4">"V5" in the descending order of the evaluation values. Accordingly, for instance, the priority of a content generated during the evaluation time period "V3" is determined to be highest, and the priority of a content generated during the evaluation time period "V5" is determined to be lowest. The output of contents is controlled according to the priorities determined at the respective evaluation time periods.

In this example, only the variations of the degrees of intimacy are used as evaluation values. Alternatively, it is possible to calculate an evaluation value with use of the number of one-sided pairs in which the degree of intimacy increases or the number of one-sided pairs in which the degree of intimacy decreases, in addition to the variations of the degrees of intimacy.

In the following, there is described an example, in which an evaluation value is calculated with use of the number of one-sided pairs in which the degree of intimacy increases. In the example of FIG. 39, the number of one-sided pairs in which the degree of intimacy increases is "6", "6", "6", "2", "2", "4", "5", "4", "3", "1", and "2" in the order from "V1".

In this example, the evaluation value of an evaluation time period including a large number of one-sided pairs whose degree of intimacy has increased is calculated to be high, based on the idea that an evaluation time period, during which the degree of intimacy between a larger number of one-sided pairs as shared users has increased, is regarded as a more important time period. Further, in the case where the number of one-sided pairs whose degree of intimacy has increased is the same as each other, the evaluation value of an evaluation time period, during which the sum of variations of the degrees of intimacy between one-sided pairs is large, is calculated to be high.

In the example of FIG. 39, the evaluation values of the respective evaluation time periods are: "V3">"V2">"V1">"V7">"V8">"V6">"V9">"V11"> "V4">"V5">"V10". Accordingly, the priorities are determined to lower in this order, and output of the contents is controlled accordingly.

In this example, firstly, the evaluation value of an evaluation time period including a larger number of one-sided pairs whose degree of intimacy has increased is calculated to be high, and secondly, the evaluation value of an evaluation time period during which the sum of variations of the degrees of intimacy between one-sided pairs is large is calculated to be high. The method is not limited to the above. For instance, it is possible to use a method, in which, firstly, the evaluation value of an evaluation time period during which the sum of variations of the degrees of intimacy between one-sided pairs is large is calculated to be high, and secondly, the evaluation value of an evaluation time period including a larger number of one-sided pairs whose degree of intimacy has increased is calculated to be high.

According to the above configuration, the priorities of the evaluation time periods are determined from variations of the degrees of intimacy. Accordingly, it is possible to raise the priority of a content generated during a time period when the shared users got close to each other so quickly, and to lower the priority of a content generated during a time period when the shared users did not get along well with each other so quickly.

In the modification of the first embodiment, a variation of the degree of intimacy is calculated by subtracting, from the degree of intimacy between shared users in the social information at an end time of an evaluation time period, the degree of intimacy between shared users in the social information at a start time of the evaluation time period. The method is not limited to the above. For instance, it is possible to use a method, in which an absolute value of a difference between the degrees of intimacy between shared users in social information at times around an evaluation time period is used as a variation of the degree of intimacy.

The aforementioned content processing device 100 is provided with the social information managing unit 106, as a first configuration. Alternatively, a second configuration may be applied, as shown in FIG. 22.

Figure 22:
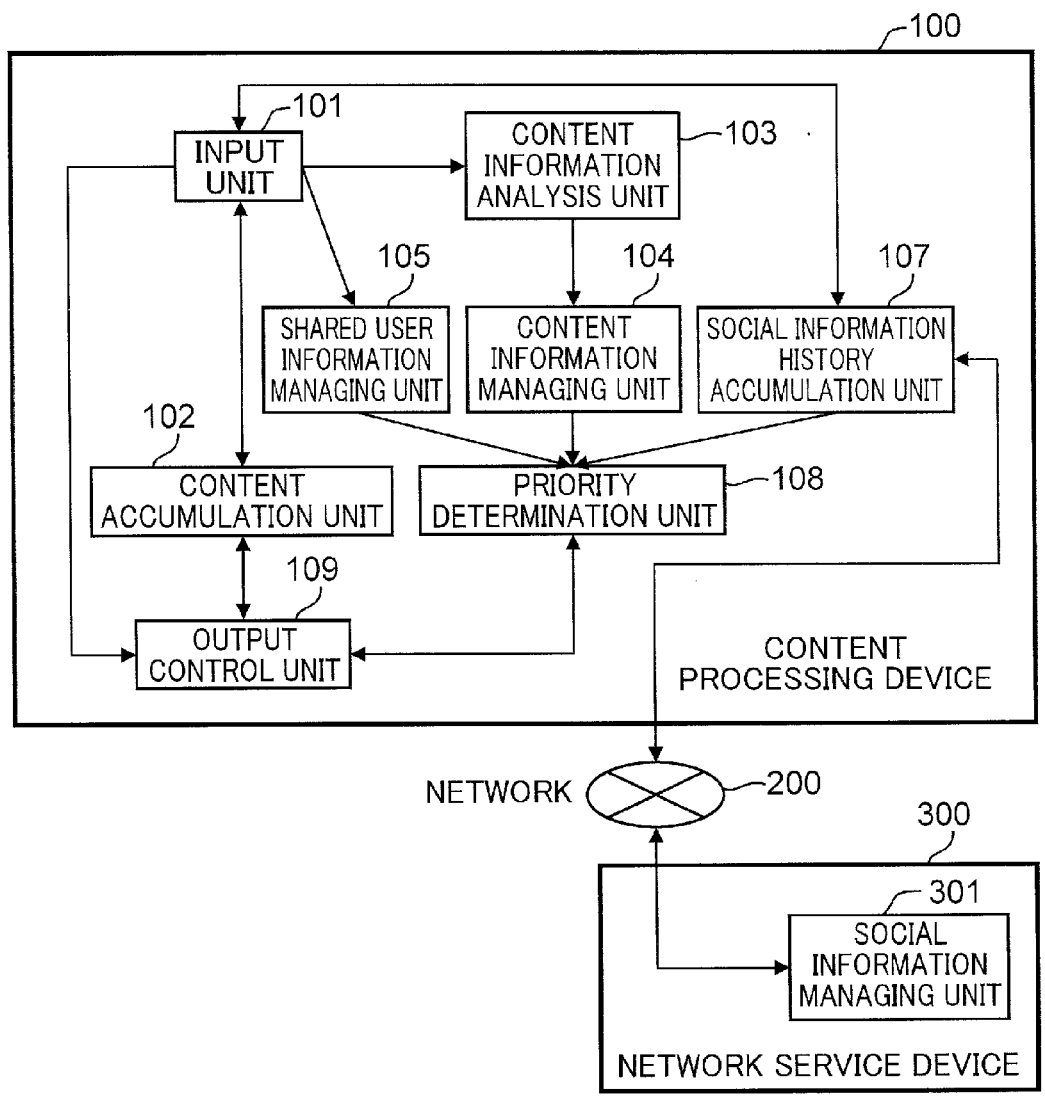
FIG. 22 is a block diagram showing a second configuration of the content processing device according to the first embodiment of the invention.

FIG. 22 is a block diagram showing the second configuration of the content processing device 100 according to the first embodiment of the invention. In the content processing device 100 as the second configuration, a social information managing unit 301 is provided in a network service device 300. A social information history accumulation unit 107 in the content processing device 100, and the social information managing unit 301 in the network service device 300 are connected to each other via a network 200.

In the above configuration, the social information history accumulation unit 107 may acquire lifelog information managed by the social information managing unit 301 at every predetermined time period via the network 200, may calculate social information at every predetermined time period based on the acquired lifelog information, and may accumulate the calculated social information. By performing the above operation, the social information history accumulation unit 107 can calculate user relationship information and degrees of intimacy, based on lifelog information managed in a plurality of network service devices 300, for instance.

Second Embodiment

Figure 23:
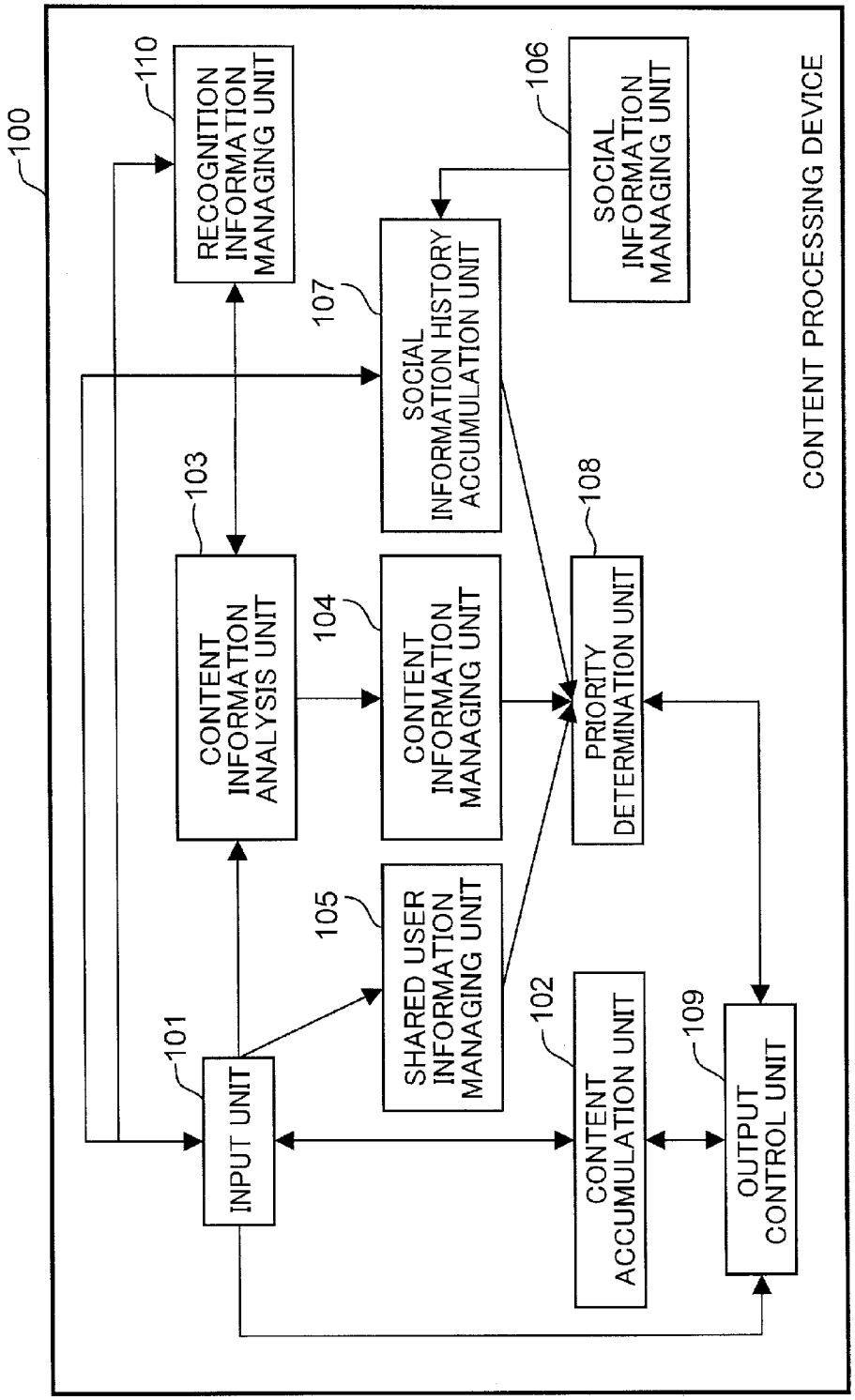
FIG. 23 is a block diagram showing a configuration of a content processing device according to a second embodiment of the invention.

FIG. 23 is a block diagram showing a configuration of a content processing device 100 according to the second embodiment of the invention. Referring to FIG. 23, constituent elements substantially identical or equivalent to those shown in FIG. 1 are indicated by the same reference numerals, and description thereof is omitted herein.

Referring to FIG. 23, the content processing device 100 is provided with a recognition information managing unit 110, in addition to the constituent elements shown in FIG. 1.

The content processing device 100 according to the second embodiment may be any device, as far as the device is capable of inserting an external storage medium storing contents such as still images or moving images. Examples of the content processing device 100 may include a personal computer, a video recorder, a digital still camera capable of photographing still images or moving images, a digital video camera, and a mobile terminal.

The recognition information managing unit 110 manages recognition information (e.g. the amount of characteristic of a face or the amount of characteristic of a general object) for recognizing a subject included in a content. In this example, the recognition information is generated by the content information analysis unit 103.

The content information analysis unit 103 analyzes a content acquired from the input unit 101, and extracts information (subject information) relating to a subject included in the content. An example of the subject information may be information (e.g. the user name) for specifying a person, in the case where the subject included in the content is the person.

In this embodiment, the content information analysis section 103 analyzes a content, with use of the recognition information managed by the recognition information managing unit 110. An example of the recognition information may be information, in which the characteristic amount of the user's face and the user name are associated with each other, in the case where the subject is a user. Further, in the case where the subject is a general object, it is possible to use information in which the characteristic amount of the general object and the object name are associated with each other, as the recognition information.

Further, the content information analysis unit 103 analyzes meta-information (e.g. a content name or a content generation date and time) of a content.

The priority determination unit 108 calculates a degree of intimacy between a mutual pair as shared users, based on the degrees of intimacy of both of the mutual pair constituting the shared users during an evaluation time period. The priority determination unit 108 calculates a degree of intimacy between a mutual pair as the shared users, and determines the priority of each of the contents generated during an evaluation time period in such a manner that the priority of a content including a larger number of shared users whose degree of intimacy between a mutual pair is high is set to be high.

As well as the first embodiment, the mutual pair is a pair based on the idea that the relationship of a certain user (in this example, a first user) with another user (in this example, a second user), and the relationship of the second user with the first user are regarded to be the same as each other.

Further, the priority determination unit 108 extracts a non-shared user, who is a user other than a shared user, out of the users whose degrees of intimacy are set in the social information. The priority determination unit 108 determines the priority of each of the contents generated during an evaluation time period in such a manner that the priority of a content including the non-shared user as a subject, and in which the degree of intimacy between the shared user and the non-shared user is high is set to be high.

The output control unit 109 outputs the contents according to a determination result on the priorities of the evaluation time periods and according to a determination result on the priorities of the contents during each of the evaluation time periods, which are obtained by the priority determination unit 108.

In the following, an operation to be performed by the content processing device 100 having the above configuration is described referring to FIGS. 24 to 37.

FIG. 24 is a diagram showing an example of a content information table in the second embodiment of the invention. The content information table is a table generated by the content information analysis unit 103 and managed by the content information managing unit 104.

The content information table is provided with the columns "CONTENT NAME", "GENERATION DATE AND TIME", and "SUBJECT PERSON NAME". "CONTENT NAME" is the name of each of the contents inputted to the input unit 101. "GENERATION DATE AND TIME" is a generation date and time of each of the contents inputted to the input unit 101. "SUBJECT PERSON NAME" indicates the name of a subject included in a content. The content name and the content generation date and time can be extracted from meta-information of each of the contents. The subject person name can be obtained by analyzing the content by the content information analysis unit 103.

For instance, the content "P-001" is generated at the time 2011/4/2 14:33, and the user "B" and the user "G" are included as subject persons.

FIG. 30 is a diagram showing an example of a non-shared user information table for individual shared users in the social information "S1" and in the social information "S2" in the second embodiment of the invention. The non-shared user information table for individual shared users is a table generated and managed by the priority determination unit 108.

The non-shared user information table for individual shared users shown in FIG. 30 holds information (non-shared user information) relating to non-shared users, who are the users other than the shared users, out of the users whose degrees of intimacy are set in each of the social information "S1" and the social information "S2". In this example, examples of the non-shared user information include "NON-SHARED USER NAME" and "INTIMACY DEGREE BETWEEN SHARED USER AND NON-SHARED USER".

In the example of FIG. 30, in the social information "S1", the non-shared users whose degrees of intimacy with the shared user "A" are set are the user "D", the user "E", and the user "F". Further, in the social information "S1", the degrees of intimacy between the shared user "A"; and the user "D", the user "E", and the user "F" are respectively "0.9", "2.0", and "0.5".

FIG. 31 is a diagram showing an example of a non-shared user information table for individual shared users during the evaluation time period "V1" in the second embodiment of the invention. The non-shared user information table shown in FIG. 31 is a table generated and managed by the priority determination unit 108.

The non-shared user information table for individual shared users shown in FIG. 30 holds information corresponding to the sum of the non-shared user information for individual shared users in the social information "S1" accumulated at a start time of the evaluation time period "V1", and the non-shared user information for individual shared users in the social information "S2" accumulated at an end time of the evaluation time period "V1".

For instance, the non-shared user information of the shared user "B" during the evaluation time period "V1" is information corresponding to the sum of the non-shared user information of the shared user "B" extracted from the social information "S1", and the non-shared user information of the shared user "B" extracted from the social information "S2".

In the example of FIG. 30, in the social information "S1", the non-shared users of the shared user "B" are the user "D" and the user "G". Further, the degrees of intimacy between the shared user "B"; and the user "D" and the user "G" are respectively "1.8" and "1.5". Likewise, in the social information "S2", the non-shared users of the shared user "B" are the user "D", the user "E", and the user "G". Further, the degrees of intimacy between the shared user "B"; and the user "D", the user "E", and the user "G" are respectively "3.2", "0.8", and "0.5".

During the evaluation time period "V1", the non-shared users of the shared user "B" in the social information "S1" are the user "D" and the user "G"; and the non-shared users of the shared user "B" in the social information "S2" are the user "D", the user "E", and the user "G". Accordingly, during the evaluation time period "V1", the non-shared users of the shared user "B" are the user "D", the user "E", and the user "G".

Further, in the example of FIG. 31, an addition average value of the degrees of intimacy between shared users and non-shared users in each of the social information is used as the degree of intimacy between shared users and non-shared users during each of the evaluation time periods. Accordingly, in the example of FIG. 31, the degrees of intimacy between the shared user "B"; and the user "D", the user "E", and the user "G" are respectively "2.5(=(1.8+3.2)/2", "0.4 (=(0+0.8)/2", and "1.0(=(1.5+0.5)/2".

FIG. 32 is a diagram showing an example of a non-shared user information table for all the shared users during the evaluation time period "V1" in the second embodiment of the invention. The non-shared user information table for all the shared users shown in FIG. 32 is a table generated and managed by the priority determination unit 108.

The non-shared user information table for all the shared users shown in FIG. 32 is a table created by summing up the non-shared user information table for individual shared users shown in FIG. 31 with respect to each of the non-shared users and by rearranging the sum. Further, in the non-shared user information table for all the shared users shown in FIG. 32, a column "NUMBER OF SHARED USERS IN WHICH INTIMACY DEGREE IS SET", which indicates the number of shared users in which the degree of intimacy is set with respect to each of the non-shared users, is newly added.

In the example of FIG. 31, during the evaluation time period "V1", the non-shared users for all the shared users are the user "D", the user "E", the user "F", the user "G", and the user "H". Accordingly, in the example of FIG. 32, the user "D", the user "E", the user "F", the user "G", and the user "H" are described in the column "NON-SHARED USER NAME".

Further, referring to FIG. 31, for instance, the non-shared user "D" has a degree of intimacy with the shared user "A", the shared user "B", and the shared user "C". Accordingly, in FIG. 32, a value "3" is described in the column "NUMBER OF SHARED USERS IN WHICH INTIMACY DEGREE IS SET" with respect to the user "D".

Further, in the example of FIG. 31, the degrees of intimacy between the non-shared user "D"; and the shared user "A", the shared user "B", and the shared user "C" are respectively "1.4", "2.5", and "1.3". Accordingly, in FIG. 32, a value "5.2(=1.4+2.5+1.3)", which is the sum of these degrees of intimacy, is described in the column "INTIMACY DEGREE BETWEEN SHARED USER AND NON-SHARED USER" with respect to the non-shared user FIG. 33 is a diagram showing an example of a non-shared subject person table during the evaluation time period "V1" in the second embodiment of the invention. The non-shared subject person table during the evaluation time period "V1" is a table generated and managed by the priority determination unit 108.

The non-shared subject person table shown in FIG. 33 is a table obtained by rearranging the non-shared user information table for all the shared users shown in FIG. 32, by specifying the non-shared users described in the non-shared user information table for all the shared users shown in FIG. 32, out of the subject persons in each of the contents generated during the evaluation time period "V1" shown in FIG. 24.

Specifically, firstly, contents included in the evaluation time period "V1" and subject persons included in each of the contents are extracted from the content information table shown in FIG. 24. For instance, in the example of FIG. 24, "A", "D", and "G" are described in the column "SUBJECT PERSON NAME" of the content "P-004". Accordingly, the user "A", the user "D", and the user "G" are extracted as subject persons included in the content "P-004".

The user "D" and the user "G are registered as non-shared users, out of the extracted users "A", "D", and G" in FIG. 32. Accordingly, the user "D" and the user "G" are extracted as non-shared subject persons in the content "P-004". Then, the extracted user "D" and user "G" are registered in the column "NON-SHARED SUBJECT PERSON NAME" of the content "P-004" in FIG. 33.

Further, in FIG. 33, the sum of the degrees of intimacy with the non-shared users described in the column "INTIMACY DEGREE BETWEEN SHARED USER AND NON-SHARED USER" shown in FIG. 32 is registered in the column "INTIMACY DEGREE BETWEEN SHARED USER AND NON-SHARED SUBJECT PERSON". Further, in FIG. 33, the sum of the degrees of intimacy with the non-shared users described in the column "NUMBER OF SHARED USERS IN WHICH INTIMACY DEGREE IS SET" shown in FIG. 32 is registered in the column "NUMBER OF SHARED USERS IN WHICH INTIMACY DEGREE IS SET".

For instance, in FIG. 32, values "5.2" and "1.8" are respectively registered in the column "INTIMACY DEGREE BETWEEN SHARED USER AND NON-SHARED USER" of the user "D" and the user G", who are the non-shared users. Further, in FIG. 33, a value "7.0", which is the sum of "5.2" and "1.8", is registered in the column "INTIMACY DEGREE BETWEEN SHARED USER AND NON-SHARED SUBJECT PERSON" in the content "P-004".

Further, in FIG. 32, values "3" and "2" are respectively registered in the column "NUMBER OF SHARED USERS IN WHICH INTIMACY DEGREE IS SET" of the user "D" and the user "G", who are the non-shared users. Accordingly, in FIG. 33, a value "5", which is the sum of the value "3" and the value "2", is registered in the column "NUMBER OF SHARED USERS IN WHICH INTIMACY DEGREE IS SET" of the content "P-004".

In the following, a content processing to be performed by the content processing device 100 according to the second embodiment is described referring to FIGS. 25 to 37. In the following description, as well as the first embodiment, the shared users are the user "A", the user "B", and the user "C".

Figure 25:
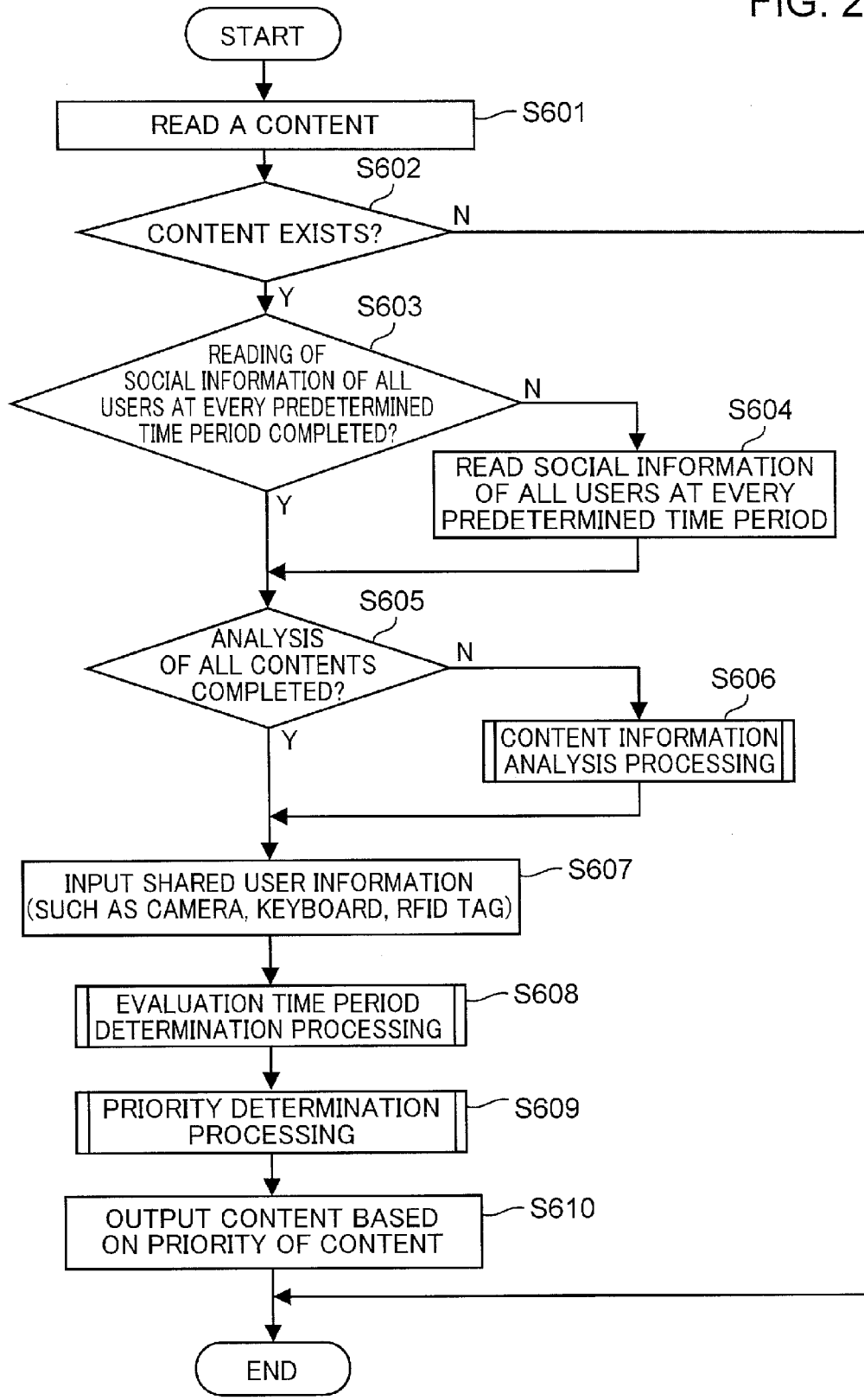
FIG. 25 is a flowchart of a content processing to be performed in the second embodiment of the invention.

Firstly, a flow of a content processing to be performed in the second embodiment of the invention is described referring to FIG. 25.

Since Steps S601 to S605 are substantially the same as Steps S101 to S105 shown in FIG. 17, description thereof is omitted herein. Subsequently, in the case where analysis of all the contents has not been completed (N in Step S605), the content information analysis unit 103 performs a content information analysis processing (Step S606). The details on the content information analysis processing will be described later referring to FIGS. 26 and 27. On the other hand, in the case where analysis of all the contents has been completed (Y in Step S605), the content information analysis unit 103 proceeds the processing to Step S607.

Since Steps S607 to S608 are substantially the same as Steps S107 to S108 shown in FIG. 17, description thereof is omitted herein. Subsequently, the priority determination unit 108 performs a priority determination processing (Step S609). The details on the priority determination processing will be described later referring to FIGS. 28 and 29.

Then, the output control unit 109 outputs the contents included during each of the evaluation time periods in the descending order of the priorities of the contents (Step S610), and the output control unit 109 finishes the content processing.

Figure 26:
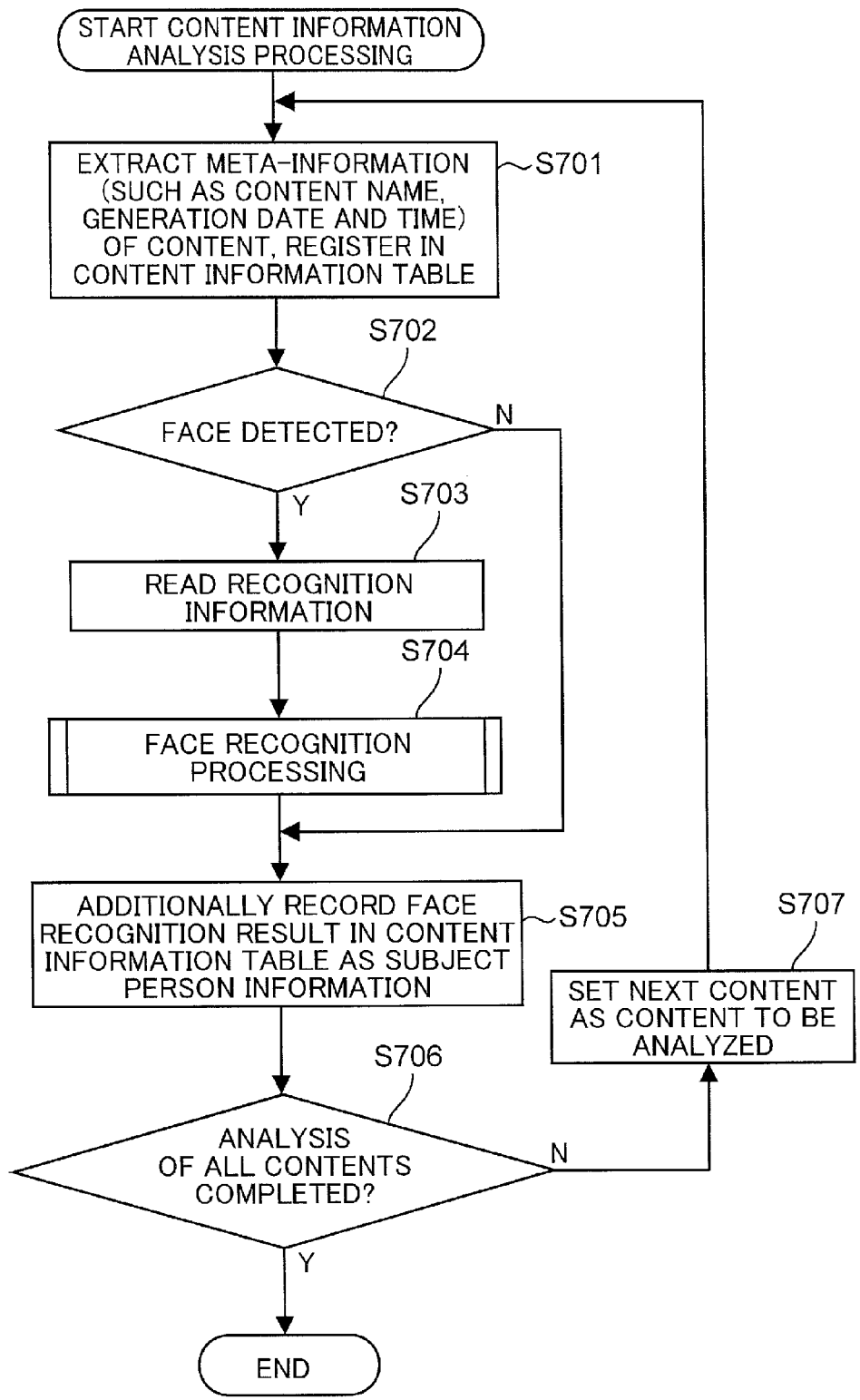
FIG. 26 is a flowchart of a content information analysis processing to be performed in the second embodiment of the invention.

In the following, a flow of the content information analysis processing in Step S606 is described referring to FIG. 26. Since Step S701 is substantially the same as Step S201 in FIG. 18, description thereof is omitted herein. Then, the content information analysis unit 103 checks whether a face is detected from the content to be analyzed (Step S702).

As a face detecting method, it is possible to use a method called as boosting, in which the presence or absence of a face is determined with use of luminance information (Y signal) of an image, (see e.g. Japanese Unexamined Patent Publication No. Hei 8-329031). Further, it is also possible to use a method, in which detection of a characteristic point of a face such as the eyes or the nose with use of a band-separation filter, and detection of a pattern of an area including the face characteristic point are combined (see e.g. Japanese Patent No. 3,279,913).

In the case where a face is not detected from the content to be analyzed (N in Step S702), the output control unit 109 proceeds the processing to Step S705. On the other hand, in the case where a face is detected from the content to be analyzed (Y in Step S702), the content information analysis unit 103 reads the recognition information managed by the recognition information managing unit 110 (Step S703), and performs a face recognition processing (Step S704). The details on the face recognition processing will be described later referring to FIG. 27.

Then, the content information analysis unit 103 additionally records, in the content information table shown in FIG. 24, the person name of the face recognized out of the face recognition result obtained by the face recognition processing, as subject person information in the content to be processed (Step S705). In Step S703, in the case where a face is not detected from the content to be analyzed, for instance, the term "null" is used as the subject person information in the content to be processed, and is additionally recorded in the content information table. It should be noted that information other than "null" may be additionally recorded in the content information table, as far as the information indicates that there is no subject person.

In this example, the person name of the face recognized is registered in the content information table. The method is not limited to the above. The number, the sizes, the positions, and the expressions of the recognized faces, and the poses of the subject persons based on an analysis result on the bone structures of the subject persons may be registered in the content information table.

Figure 18:
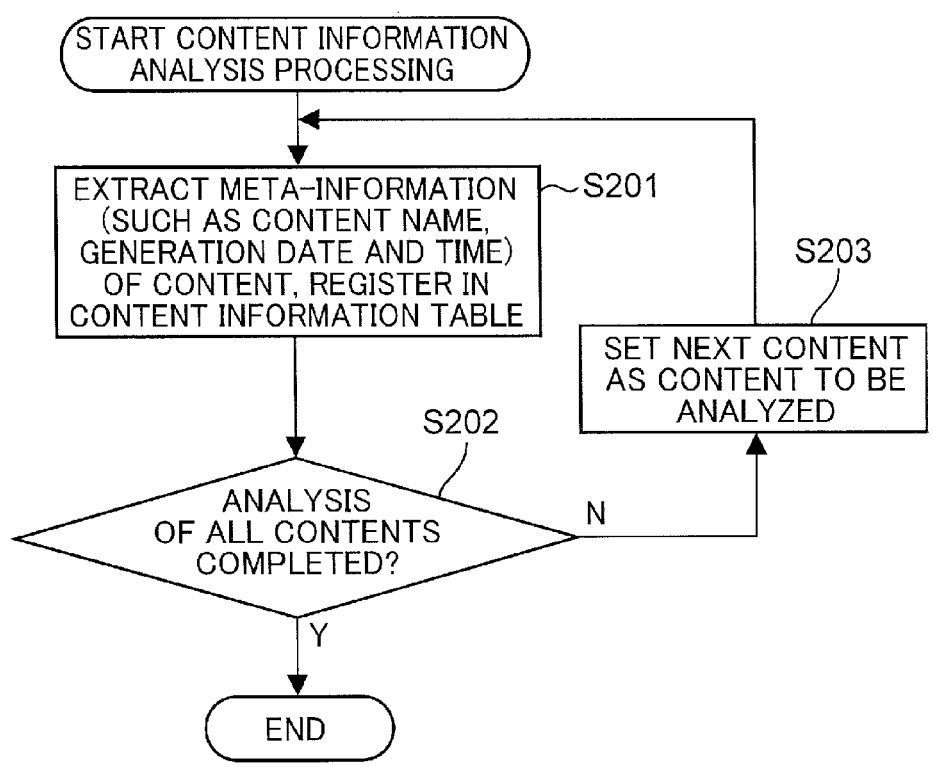
FIG. 18 is a flowchart of a content information analysis processing to be performed in the first embodiment of the invention.

Since Steps S706 to S707 are substantially the same as Steps S202 and S203 in FIG. 18, description thereof is omitted herein.

Figure 27:
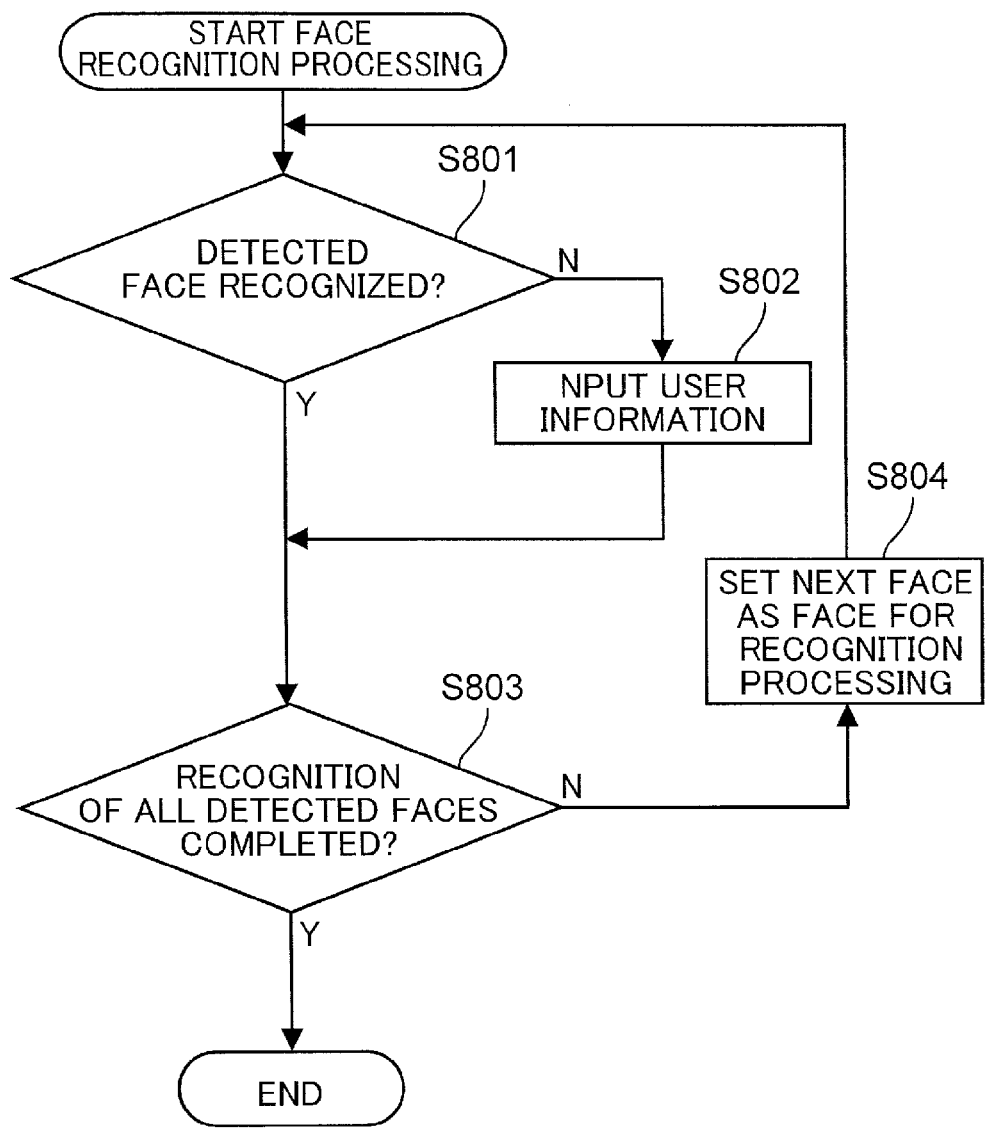
FIG. 27 is a flowchart of a face recognition processing to be performed in the second embodiment of the invention.

In the following, the face recognition processing in Step S704 is described referring to FIG. 27. Firstly, the content information analysis unit 103 checks whether the face detected in Step S702 is recognized, with use of the recognition information read in Step S703 (Step S801).

The following method may be used as a face recognition method. Firstly, the recognition information managing unit 110 manages in advance recognition information, in which a characteristic amount of the user's face (e.g. a relative position and a size of the eyes, the nose, and the mouth; and a feature vector representing the shape of the eyes, the nose, and the mouth) and the user name are associated with each other.

In this example, recognition information is generated when the content information analysis unit 103 newly detects a user's face from a content, and is transferred to the recognition information managing unit 110.

Then, the content information analysis unit 103 compares between the characteristic amounts of all the users' faces managed by the recognition information managing unit 110, and the face detected from the content to be processed. Then, the content information analysis unit 103 calculates a degree of similarity between the characteristic amounts. In the case where the calculated similarity degree is equal to or larger than a predetermined threshold value, the content information analysis unit 103 recognizes that the face detected from the content to be processed is one of the users' faces managed by the recognition information managing unit 110.

In the case where the face detected in Step S702 is not recognized by the content information analysis unit 103 (N in Step S801), the input unit 101 receives input of the user information (e.g. the user name) about the user's face detected in Step S702 (Step S802). It should be noted that the inputted user information is associated with the characteristic amount of the user's face detected in Step S702, and is managed as recognition information.

By performing the above operation, the recognition information managing unit 110 can manage the characteristic amount of the user's face in association with the user name, and can specify the user name of the subject from the characteristic amount of the subject's face included in the content.

On the other hand, in the case where the face detected in Step S702 is recognized by the content information analysis unit 103 (Y in Step S801), the content information analysis unit 103 checks whether recognition of all the faces detected in Step S702 has been completed (Step S803). In the case where recognition of all the detected faces has not been completed (N in Step S803), the content information analysis unit 103 sets a face for which recognition processing has not been completed, as the face for which recognition processing is to be performed (Step S804), and the content information analysis unit 103 returns the processing to Step S801. On the other hand, in the case where recognition of all the faces detected in Step S702 has been completed (Y in Step S803), the content information analysis unit 103 finishes the face recognition processing.

Figure 28:
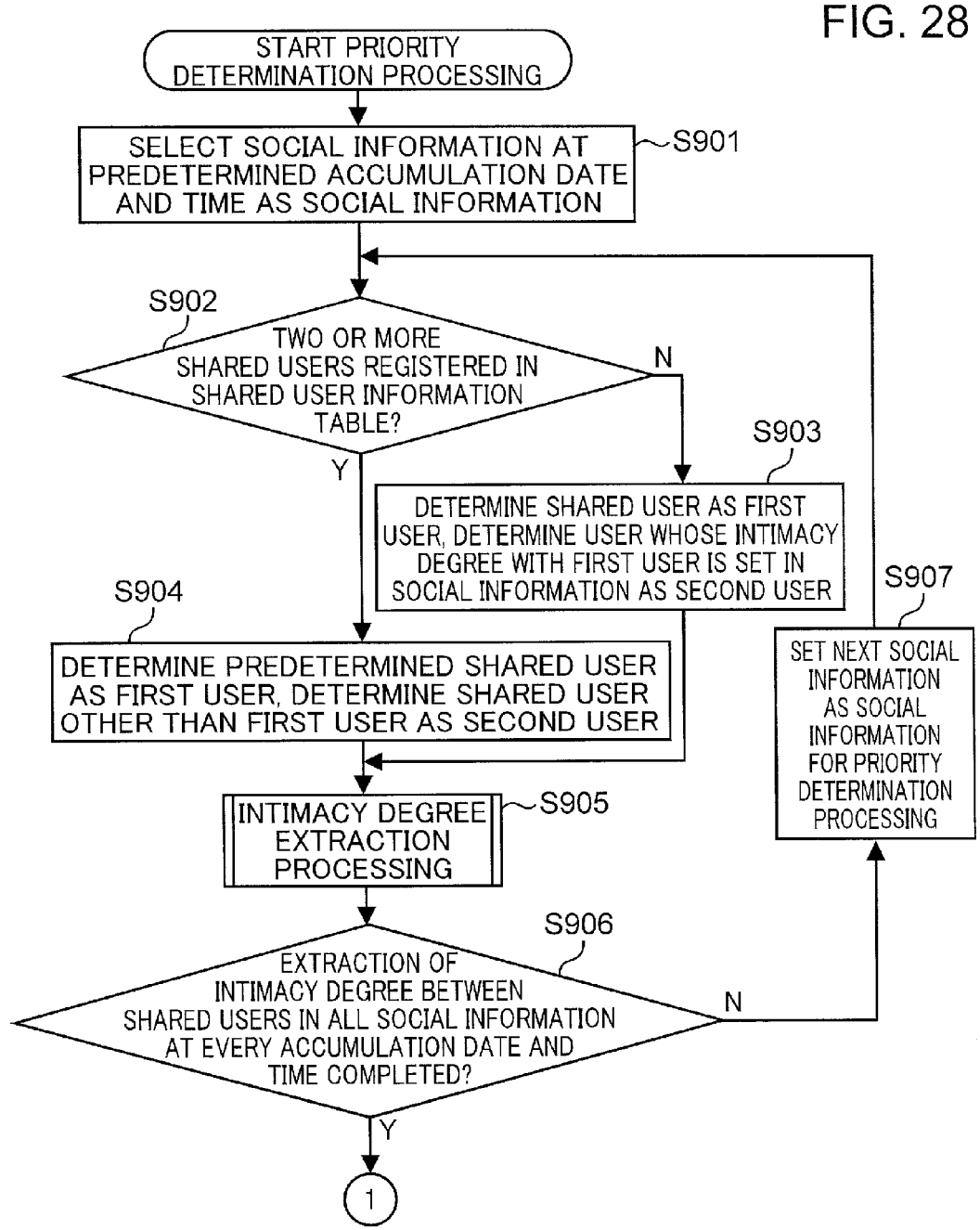
FIG. 28 is a first-half of a flowchart of a first priority determination processing to be performed in the second embodiment of the invention.

In the following, the priority determination processing to be performed by the priority determination unit 108 in Step S609 is described referring to FIG. 28 and FIG. 29.

Since Steps S901 to S909 are substantially the same as Steps S401 to S409 in FIGS. 20A and 20B, description thereof is omitted herein. Subsequently, the priority determination unit 108 calculates an evaluation value of a content during an evaluation time period from the degrees of intimacy between mutual pairs as shared users during a target evaluation time period, and from subject person information to be included in a content, which is described in the column "SUBJECT PERSON NAME" of the content information table shown in FIG. 24 (Step S910).

In this example, as the mutual pairs constituted of the user "A", the user "B", and the user "C" as shared users, there are three kinds of mutual pairs: a mutual pair constituted of the user "A" and the user "B", a mutual pair constituted of the user "B" and the user "C", and a mutual pair constituted of the user "C" and the user "A", as shown in FIG. 16.

In this embodiment, evaluation values of contents are calculated with use of a computational algorithm such that the evaluation value of a content photographed during a time period when the relationship between a mutual pair as shared users was close, and including the mutual pair is calculated to be high. This is based on the idea that a shared user pair should have a good impression about a content photographed during a time period when the relationship between the shared user pair was close, in the case where the shared user pair browse the content including the shared user pair, remembering the event they enjoyed during the time period when they were close.

In the following, as a practical example, there is described a calculation processing of an evaluation value of a content included during the evaluation time period "V1". Since the evaluation value of an evaluation time period regarding the evaluation time period "V1" has already been described in Step S409 in FIGS. 20A and 20B, description thereof is omitted herein.

Firstly, a degree of intimacy between a mutual pair is calculated by adding the degrees of intimacy of both of the mutual pair. This is based on the idea that it is necessary to include the degrees of intimacy of both of a pair in order to calculate the degree of intimacy between the pair.

In view of the above, the degrees of intimacy between all the mutual pairs as shared users during the evaluation time period "V1" (namely, between the mutual pair constituted of the user "A" and the user "B", between the mutual pair constituted of the user "B" and the user "C", and between the mutual pair constituted of the user "C" and the user "A") are calculated as follows with use of the degrees of intimacy shown in FIG. 12.

(Degree of intimacy between mutual pair constituted of user "A" and user "B" during evaluation time period "V1")=(degree of intimacy of user "A" with user "B" during evaluation time period "V1")+(degree of intimacy of user "B" with user "A" during evaluation time period "V1")= ((degree of intimacy of user "A" with user "B" in social information "S1")+(degree of intimacy of user "A" with user "B" in social information "S2")/2+((degree of intimacy of user "B" with user "A" in social information "S1")+(degree of intimacy of user "B" with user "A" in social information "S2")/2=((0.6+0.9)/2)+((0.9+1.0)/2) =(0.75+0.95)=1.7

According to a calculation method substantially the same as described above, the degree of intimacy between a mutual pair constituted of the user "B" and the user "C" during the evaluation time period "V1", and the degree of intimacy between a mutual pair constituted of the user "C" and the user "A" during the evaluation time period "V1" are calculated as follows with use of the degrees of intimacy shown in FIG. 12.

(Degree of intimacy between mutual pair constituted of user "B" and user "C" during evaluation time period "V1")=2.0

(Degree of intimacy between mutual pair constituted of user "C" and user "A" during evaluation time period "V1")=1.6

In this example, a degree of intimacy between a mutual pair as shared users is calculated by adding the degrees of intimacy of both of a shared user pair during an evaluation time period. The method is not limited to the above. For instance, a higher value of the degree of intimacy or a lower value of the degree of intimacy out of the degrees of intimacy of both of a pair may be used as the degree of intimacy between a mutual pair. Alternatively, an average value of the degrees of intimacy of both of a pair may be used as the degree of intimacy between a mutual pair.

Further, subject persons included in a content included during the evaluation time period "V1" are described in the column "SUBJECT PERSON NAME" of the content information table under management, as shown in FIG. 24.

An evaluation value of each of the contents included during a certain evaluation time period is calculated from a degree of intimacy between a mutual pair as shared users during the evaluation time period, and from a subject person included in each of the contents during the evaluation time period. In this example, there is used a computational algorithm such that the evaluation value of a content including, as subject persons, a larger number of shared users, in which the degree of intimacy between a mutual pair is high, is calculated to be high.

In the following, there is described a practical example of a method for calculating an evaluation value of a content during the evaluation time period "V1".

Firstly, the values of the degrees of intimacy between mutual pairs as shared users during the evaluation time period "V1" are such that: the degree of intimacy between a mutual pair constituted of the user "A" and the user "B" is "1.7", the degree of intimacy between a mutual pair constituted of the user "B" and the user "C" is "2.00", and the degree of intimacy between a mutual pair constituted of the user "C" and the user "A" is "1.6". Accordingly, the largeness/smallness relationship of the evaluation values between mutual pairs is such that: the evaluation value regarding the degree of intimacy between a mutual pair constituted of the user "B" and the user "C">the evaluation value regarding the degree of intimacy between a mutual pair constituted of the user "A" and the user "B">the evaluation value regarding the degree of intimacy between a mutual pair constituted of the user "C" and the user "A".

Accordingly, in the example of FIG. 24, the content having a highest evaluation value is the content "P-007" including a mutual pair constituted of the user "B" and the user "C". A content having a second highest evaluation value is the content "P-002" including a mutual pair constituted of the user "A" and the user "B". A content having a third highest evaluation value is the content "P-003" including a mutual pair constituted of the user "C" and the user "A".

The foregoing are the contents including both of each mutual pair as shared users during the evaluation time period "V1". Regarding the contents thereafter, the evaluation value of a content including either one of a mutual pair as shared users, whose degree of intimacy is higher than that of the other of the mutual pair during the evaluation time period "V1", is set to be high. This is based on a computational algorithm such that the evaluation value of a content including a larger number of pairs, as subjects, in which the degree of intimacy between a shared user pair is high during an evaluation time period, is set to be high.

Accordingly, contents having a next highest evaluation value following the content "P-003" are the content "P-001" and the content "P-005" including the user "B", out of the user "B" and the user "C", whose degree of intimacy between a mutual pair is highest.

A content having a next highest evaluation value following the content "P-001" and the content "P-005" is the content "P-004" including the user "A", out of the user "A" and the user "B", whose degree of intimacy between a mutual pair is second highest. The evaluation values of the content "P-006" and the content "P-008" are smallest, because the content "P-006" and the content "P-008" do not include shared users as subject persons.

To summarize the foregoing, the largeness/smallness relationship of the evaluation values of the contents during the evaluation time period "V1" is as follows: the content "P-007">the content "P002">the content "P003">the content "P001"=the content "P005">the content "P-004">the content "P-006"=the content "P-008". It is possible to use any value, as far as the evaluation value of a content satisfies the aforementioned largeness/smallness relationship.

In this example, the evaluation value of a content including a larger number of mutual pairs, in which the degree of intimacy between a mutual pair as shared users is high during an evaluation time period, is set to be high. The method is not limited to the above. For instance, the evaluation value of a content including a mutual pair, in which the degree of intimacy between a mutual pair as shared users is lower than a predetermined threshold value (e.g. lower than 0.5) is set to be low, as the content includes a larger number of mutual pairs, in which the degree of intimacy between a mutual pair is low; and the evaluation value of a content including a mutual pair, in which the degree of intimacy between a mutual pair as shared users is not lower than a predetermined threshold value (e.g. not lower than 0.5) is set to be high, as the content includes a larger number of mutual pairs, in which the degree of intimacy between a mutual pair is high.

Then, the priority determination unit 108 checks whether calculation of an evaluation value of an evaluation time period and an evaluation value of a content has been completed for all the evaluation time periods (Step S911). In the case where calculation of an evaluation value of an evaluation time period and an evaluation value of a content has not been completed for all the evaluation time periods (N in Step S911), the priority determination unit 108 sets an evaluation time period of which evaluation value calculation has not been completed, as the evaluation time period of which evaluation value is to be calculated (Step S912), and the priority determination unit 108 returns the processing to Step S909.

On the other hand, in the case where calculation of an evaluation value of an evaluation time period and an evaluation value of a content has been completed for all the evaluation time periods (Y in Step S911), the priority determination unit 108 determines that the priority of a content having a high evaluation value is high out of the contents included during an evaluation time period having a high evaluation value (Step S913), and the priority determination unit 108 finishes the priority determination processing.

In this example, a method for outputting the contents in the descending order of the priorities of the contents is used as a method for outputting the contents. The method is not limited to the above. For instance, it is possible to remove a content (e.g. bottom ten contents) whose priority is lower than a predetermined rank from the contents to be outputted. Alternatively, it is possible to use an output method, in which the output time of a content is increased, as the priority of the content is raised. Alternatively, it is possible to use an output method, in which a predetermined dramatic effect (e.g. enlarging the face image) is applied to a content (e.g. top ten contents) whose priority is higher than a predetermined rank.

In the following, a practical example of a degree of intimacy during each of the evaluation time periods in the content processing device 100 is described referring to FIG. 40.

Figure 40:
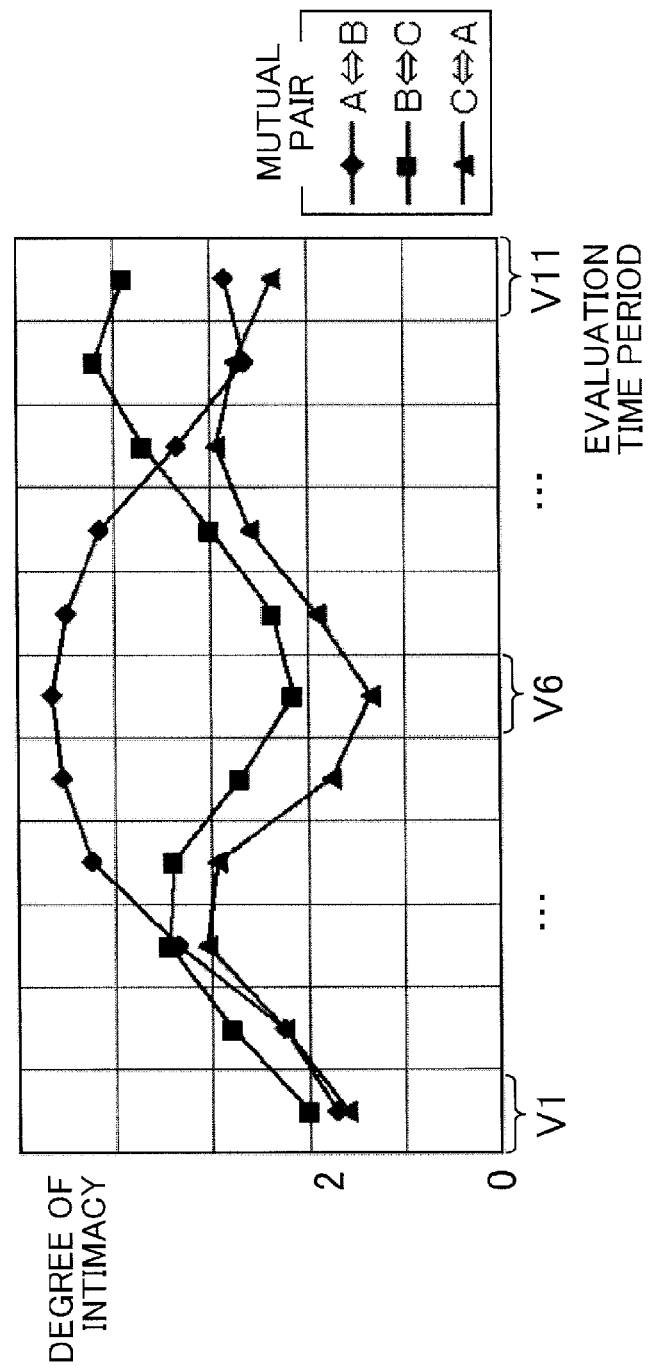
FIG. 40 is a graph showing degrees of intimacy between mutual pairs as shared users during each of the evaluation time periods "V1" to "V11"

FIG. 40 is a graph showing degrees of intimacy between mutual pairs as shared users during each of the evaluation time periods "V1" to "V11". Referring to FIG. 40, the vertical axis indicates a degree of intimacy, and the horizontal axis indicates an evaluation time period. Further, in FIG. 40, the degrees of intimacy are calculated based on the degrees of intimacy shown in FIG. 12.

In this embodiment, the evaluation value of a content including a larger number of mutual pairs, as subject persons, in which the degree of intimacy between a mutual pair as shared users is high during each of the evaluation time periods, is set to be high. As described above, the evaluation values of the contents created during the evaluation time period "V1" are as follows in the descending order of the evaluation values of the contents: the content including a mutual pair constituted of the user "B" and the user "C">the content including a mutual pair constituted of the user "A" and the user "B">the content including a mutual pair constituted of the user "C" and the user "A".

Further, in the example of FIG. 40, during the evaluation time period "V6", the mutual pairs whose degree of intimacy is high are a mutual pair constituted of the user "A" and the user "B", a mutual pair constituted of the user "B" and the user "C", and a mutual pair constituted of the user "C" and the user "A" in this order. Accordingly, the contents whose evaluation value is high during the evaluation time period "V6" are as follows in this order: the content including a mutual pair constituted of the user "A" and the user "B">the content including a mutual pair constituted of the user "B" and the user "C">the content including a mutual pair constituted of the user "C" and the user "A".

According to the above configuration, subjects included in the contents are analyzed, the analysis result is added to the priority determination about the evaluation time periods, and determination is made as to the priorities of the contents including, as the subjects, shared users, in which the degree of intimacy between a mutual pair as shared users is high. Accordingly, for instance, it is possible to prioritize output of a content including a shared user pair who are particularly close to each other, and to lower the priority of a content including a shared user pair who are remote from each other, out of the contents generated during a time period when the shared users were close to each other.

In Step S910 in the second embodiment of the invention, the evaluation value of a content including a larger number of pairs, as subject persons, in which the degree of intimacy between a mutual pair as shared users is high during an evaluation time period, is calculated to be high. The evaluation value calculation method is not limited to the above. For instance, it is possible to use an evaluation value calculation method, in which the evaluation value of a content including a larger number of pairs, as subject persons, whose variation of the degree of intimacy between a mutual pair as shared users is large during an evaluation time period, is calculated to be high.

In the modification of the second embodiment, a variation of the degree of intimacy between a mutual pair as shared users during the evaluation time period "V1" is calculated from the degree of intimacy between a mutual pair as shared users in the social information "S1" and from the degree of intimacy between a mutual pair as shared users in the social information "S2" during the evaluation time period. In this example, in calculating a variation, determination may be made, taking into consideration not only a magnitude of a variation of the degree of intimacy between a mutual pair as shared users, but also discrimination as to whether the gradient of the variation is plus (the degree of intimacy increases) or minus (the degree of intimacy decreases) during an evaluation time period in order to extend the evaluation value range.

Accordingly, a value obtained by subtracting, from the degree of intimacy between a mutual pair as shared users in the social information "S2" accumulated at an end time of the evaluation time period "V1", the degree of intimacy between a mutual pair as shared users in the social information "S1" accumulated at a start time of the evaluation time period "V1" is set as the degree of intimacy between a mutual pair as shared users during the evaluation time period "V1". Further, as described above, a summation value of the degrees of intimacy of both of a pair is calculated as the degree of intimacy between a mutual pair, based on the idea that it is necessary to include the degrees of intimacy of both of a pair to calculate the degree of intimacy between a mutual pair.

Specifically, a variation of the degree of intimacy between a mutual pair constituted of the shared user "A" and the shared user "B" during the evaluation time period "V1" is calculated as follows with use of the degrees of intimacy shown in FIG. 12.

(Variation of degree of intimacy between mutual pair constituted of user "A" and user "B" during evaluation time period "V1")=(variation of degree of intimacy of user "A" with user "B" during evaluation time period "V1")+(variation of degree of intimacy of user "B" with user "A" during evaluation time period "V1")=(degree of intimacy of user "A" with user "B" in social information "S2")−(degree of intimacy of user "A" with user "B" in social information "S1")+(degree of intimacy of user "B" with user "A" in social information "S2")−(degree of intimacy of user "B" with user "A" in social information "S1")=(0.9)−(0.6)+(1.0)−(0.9)=0.4

Figure 41:
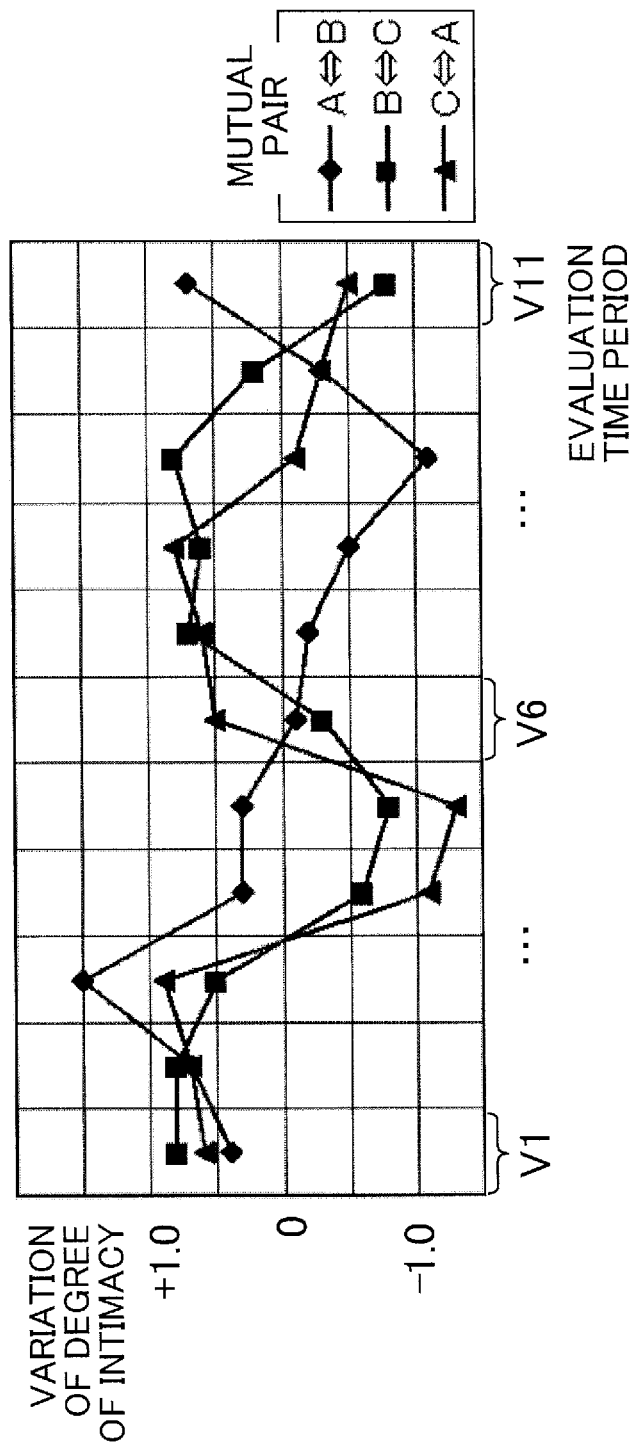
FIG. 41 is a graph showing variations of the degrees of intimacy between mutual pairs as shared users during each of the evaluation time periods "V1" to "V11" in the second embodiment of the invention.

A practical example on evaluation of the priorities of the contents by the content processing device 100 as the modification of the second embodiment is described referring to FIG. 41.

FIG. 41 is a graph showing variations of the degrees of intimacy between mutual pairs as shared users during each of the evaluation time periods "V1" to V11". Referring to FIG. 41, the vertical axis indicates a variation of the degree of intimacy, and the horizontal axis indicates an evaluation time period. Further, in FIG. 41, the degrees of intimacy are calculated based on the degrees of intimacy shown in FIG. 12.

In this embodiment, the evaluation value of a content including a larger number of pairs, as subject persons, whose variation of the degree of intimacy between a mutual pair as shared users is large during each of the evaluation time periods, is calculated to be high. In the example of FIG. 41, during the evaluation time period "V1", the mutual pairs whose variation of the degree of intimacy is high are, in this order, a mutual pair constituted of the user "B" and the user "C", a mutual pair constituted of the user "C" and the user "A", and a mutual pair constituted of the user "A" and the user "B". Accordingly, during the evaluation time period "V1", the contents having a high evaluation value are, in this order, the content including a mutual pair constituted of the user "B" and the user "C">the content including a mutual pair constituted of the user "C" and the user "A">the content including a mutual pair constituted of the user "A" and the user "B".

Further, as well as the evaluation time period "V1", in the example of FIG. 41, during the evaluation time period "V6", the mutual pairs having a large variation of the degree of intimacy are, in this order, a mutual pair constituted of the user "C" and the user "A", a mutual pair constituted of the user "A" and the user "B", and a mutual pair constituted of the user "B" and the user "C". Accordingly, during the evaluation time period "V6", the contents having a high evaluation value are, in this order, the content including a mutual pair constituted of the user "C" and the user "A">the content including a mutual pair constituted of the user "A" and the user "B">the content including a mutual pair constituted of the user "B" and the user "C".

According to the above configuration, the priority of a content including a mutual pair as subjects is determined from a variation of the degree of intimacy between a mutual pair as shared users, in addition to the priority determination during an evaluation time period. Accordingly, for instance, it is possible to prioritize output of a content including a shared user pair who are particularly close to each other, and to lower the priority of a content including a shared user pair who are remote from each other, out of the contents generated during a time period when the shared users were close to each other.

In this example, a calculation method of subtracting, from the degree of intimacy between shared users in the social information at an end time of an evaluation time period, the degree of intimacy between shared users in the social information at a start time of the evaluation time period is used, as a method for calculating a variation of the degree of intimacy between shared users during an evaluation time period. The calculation method is not limited to the above. For instance, it is possible to use a method, in which an absolute value of a difference between the degrees of intimacy between shared users in social information at times around an evaluation time period is used as a variation of the degree of intimacy.

In the modification of the second embodiment, there is used a calculation method, in which an additional value of the degrees of intimacy of both of a shared user pair during an evaluation time period is used as the degree of intimacy between a mutual pair as shared users. The calculation method is not limited to the above. For instance, it is possible to use a calculation method, in which a higher value of the degree of intimacy or a lower value of the degree of intimacy out of the degrees of intimacy of both of a pair is used as the degree of intimacy between a mutual pair, or it is possible to use a calculation method, in which an average value of the degrees of intimacy of both of a pair is used as the degree of intimacy between a mutual pair.

In the second embodiment, the priority determination processing in Step S609 includes, in addition to the priority determination during an evaluation time period, calculating a degree of intimacy between a mutual pair as shared users with respect to each of the pairs, and determining the priority of a content including a larger number of shared users, as subjects, in which the degree of intimacy between a mutual pair is high to be high. The priority determination processing is not limited to the above. As a priority determination processing, for instance, it is possible to extract a non-shared user as a user other than a shared user, out of the users whose degrees of intimacy with the shared user are set in the social information, and to determine the priority of each of the contents generated during an evaluation time period in such a manner that the priority of a content, whose degree of intimacy between a shared user and a non-shared user is high, is increased. The second priority determination processing as described above is described in detail in the following.

Figure 34:
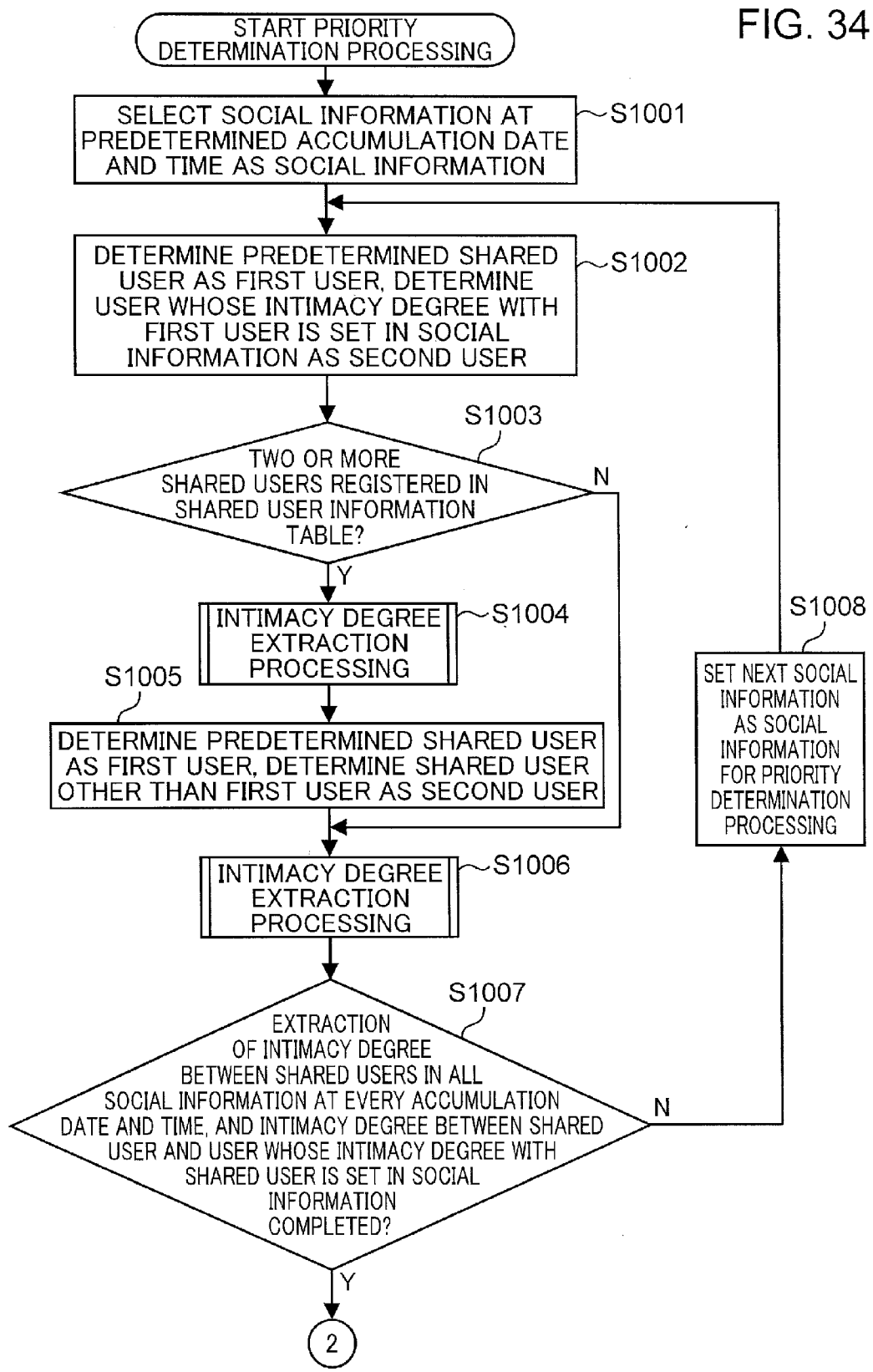
FIG. 34 is a first-half of a flowchart of a second priority determination processing in Step S609 in the second embodiment of the invention.
Figure 35:
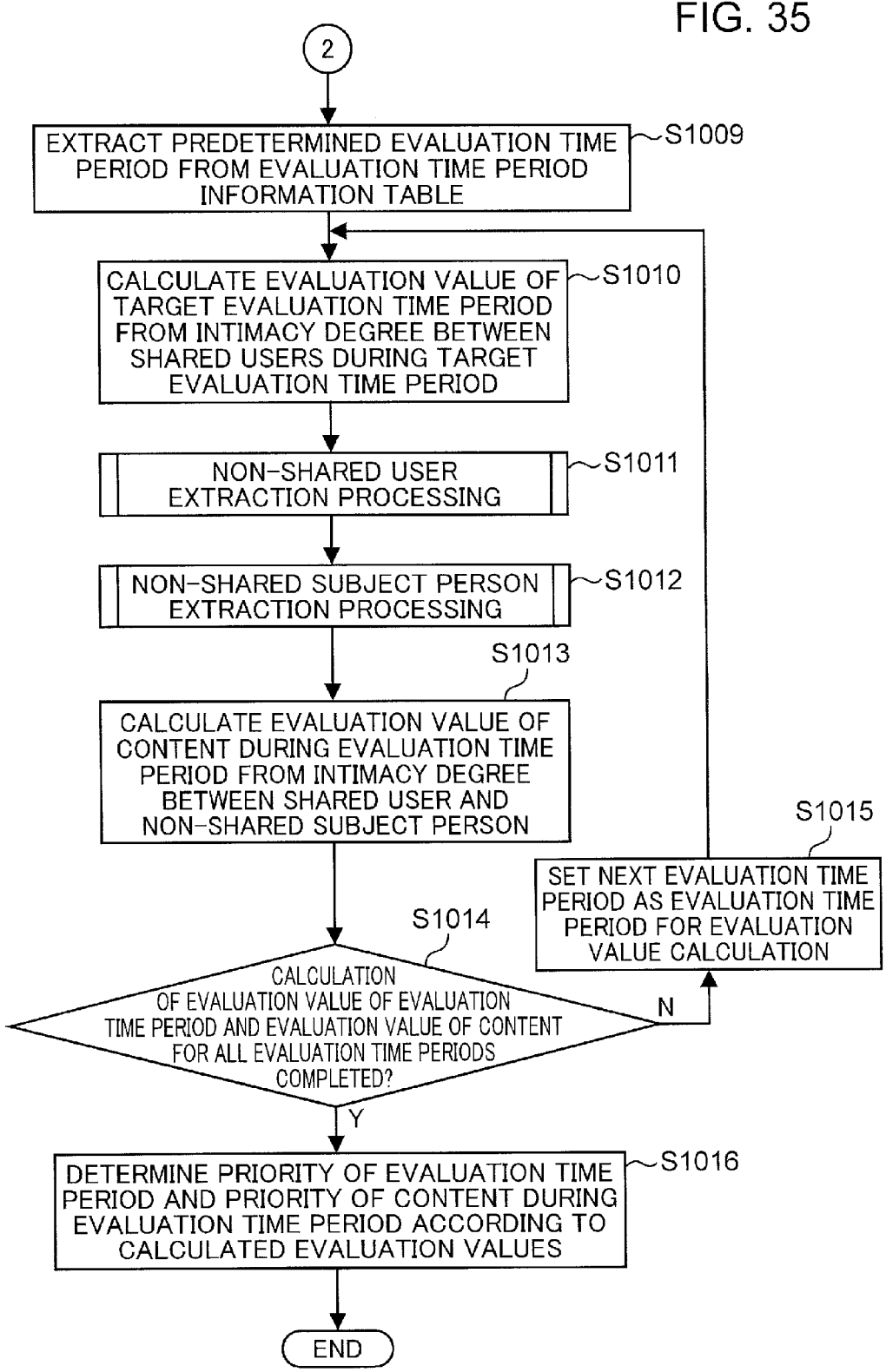
FIG. 35 is a second-half of the flowchart of FIG. 34.

FIG. 34 and FIG. 35 are a flowchart of the second priority determination processing in Step S609.

Since the processing of Step S1001 is substantially the same as the processing of Step S401 in FIGS. 20A and 20B, description thereof is omitted herein.

Subsequently, the priority determination unit 108 determines a predetermined shared user as the first user, and determines a user whose degree of intimacy with the first user is set in the social information selected in Step S1001, as the second user (Step S1002).

For instance, in the case where the social information "S1" is selected, and the shared user "A" is determined as the first user in Step S1001, as shown in FIG. 10, the second users are the user "B", the user "C", the user "D", the user "E", and the user "F".

The processing of Step S1003 is substantially the same as the processing of Step S402 shown in FIGS. 20A and 20B, the processings of Step S1004 and Step S1006 are substantially the same as the processing of Step S405 shown in FIGS. 20A and 20B, and the processing of Step S1005 is substantially the same as the processing of Step S404 shown in FIGS. 20A and 20B. Accordingly, description of these processings is omitted herein.

Then, the priority determination unit 108 checks whether extraction of a degree of intimacy between shared users in all the social information at every accumulation date and time, and a degree of intimacy between a shared user and a user whose degree of intimacy with the shared user is set in the social information has been completed (Step S1007).

In the case where the intimacy degree extraction has not been completed (N in Step S1007), the priority determination unit 108 proceeds the processing to Step S1008. On the other hand, in the case where the intimacy degree extraction has been completed (Y in Step S1007), the priority determination unit 108 proceeds the processing to Step S1009.

Since the processings of Step S1008 to Step S1010 are substantially the same as the processings of Step S407 to Step S409 shown in FIGS. 20A and 20B, description thereof is omitted herein.

Then, the priority determination unit 108 performs a non-shared user extraction processing of extracting a non-shared user (Step S1011). The details on the non-shared user extraction processing will be described later referring to FIG. 36.

Then, the priority determination unit 108 performs a processing of extracting a non-shared subject person, who is a non-shared user included in a content as a subject during a target evaluation time period (Step S1012). The details on the non-shared subject person extraction processing will be described later referring to FIG. 37.

Then, the priority determination unit 108 calculates an evaluation value of a content during an evaluation time period from a degree of intimacy between a shared user and a non-shared subject person (Step S1013).

Figure 29:
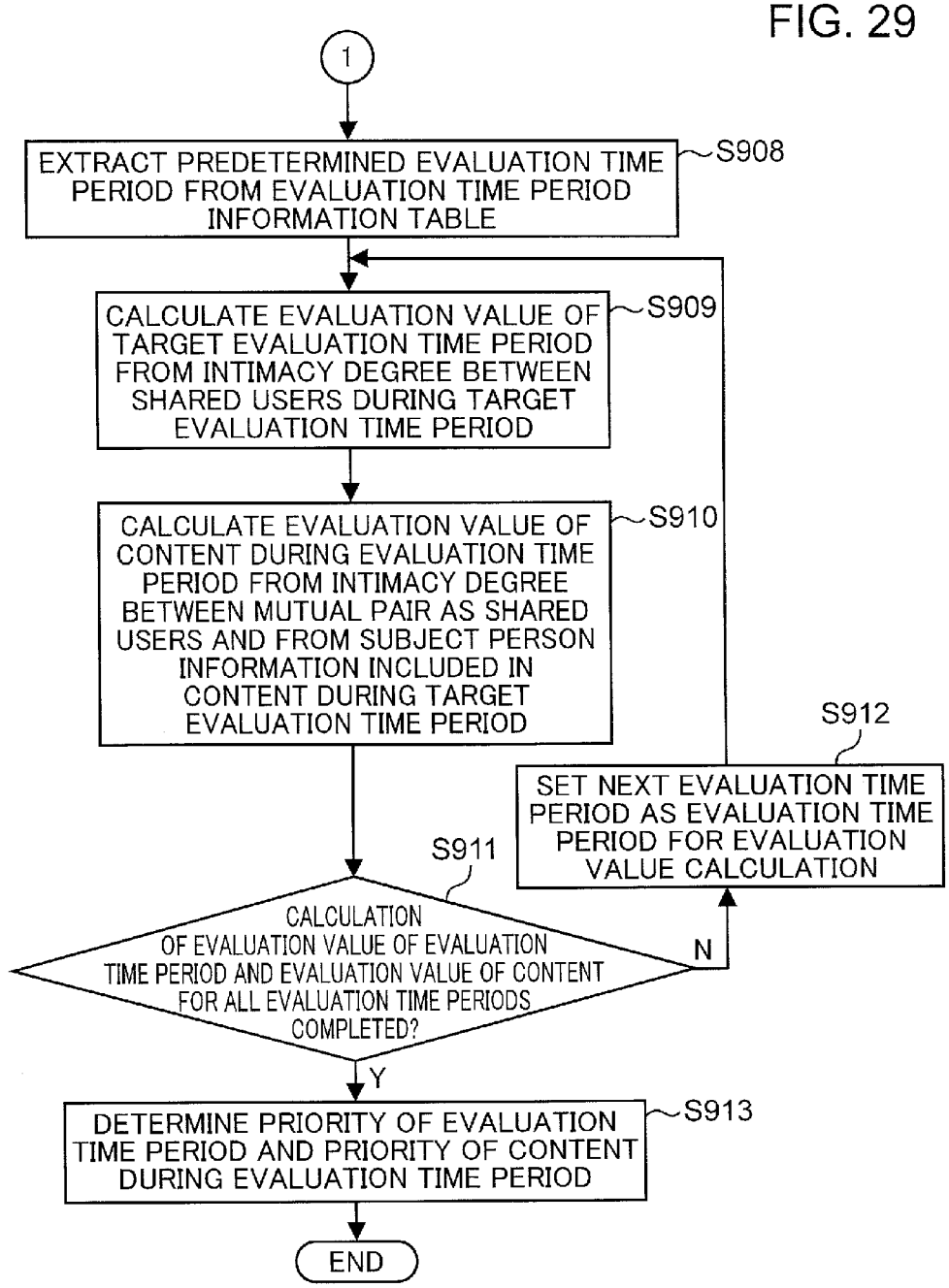
FIG. 29 is a second-half of the flowchart of FIG. 28.

Since the processings of Step S1014 to Step S1016 are substantially the same as the processings of Step S911 to Step S913 shown in FIG. 29, description thereof is omitted herein.

Figure 36:
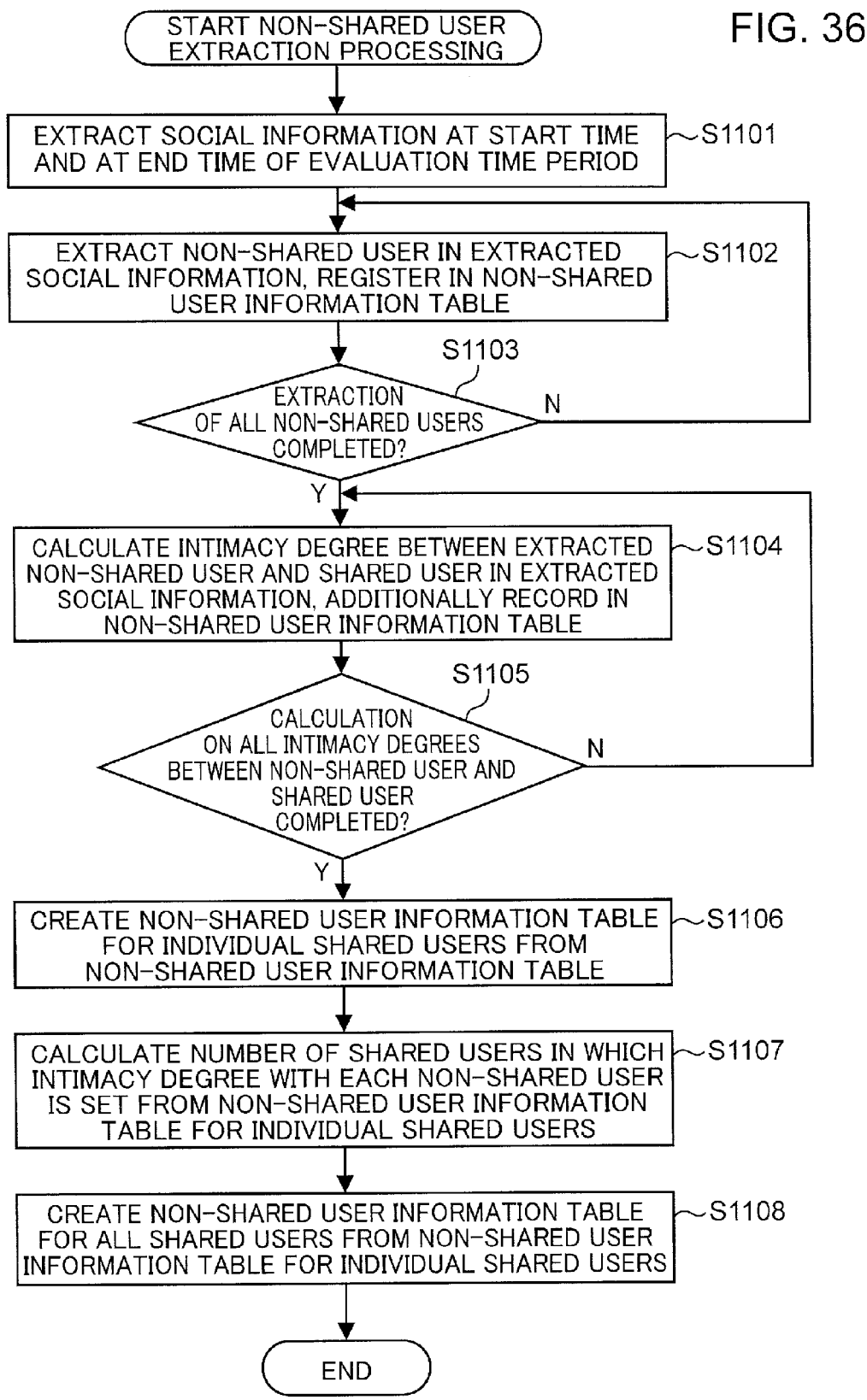
FIG. 36 is a flowchart showing a non-shared user extraction processing to be performed in the second embodiment of the invention.

In the following, the non-shared user extraction processing in Step S1011 is described referring to FIG. 36. In this example, let us assume that the evaluation time period is "V1", and the shared users are the user "A", the user "B", and the user "C".

Firstly, social information at a start time and at an end time of an evaluation time period is extracted (Step S1101). Specifically, the social information "S1" as the social information at a start time of the evaluation time period "V1", and the social information "S2" as the social information at an end time of the evaluation time period "V1" are extracted from the social information accumulated information table shown in FIG. 5 and from the evaluation time period information table shown in FIG. 14.

Then, a non-shared user is extracted from the extracted social information, and is registered in the non-shared user information table for individual shared users shown in FIG. 30 (Step S1102).

For instance, in the social information "S1" shown in FIG. 10, the user "D", the user "E", and the user "F" are extracted as non-shared users for the shared user "A", and are registered in the non-shared user information table for individual shared users shown in FIG. 30, as the non-shared users for the shared user "A".

Then, the priority determination unit 108 checks whether extraction of all the non-shared users has been completed (Step S1103). In the case where extraction of all the non-shared users has not been completed (N in Step S1103), the priority determination unit 108 returns the processing to Step S1102. On the other hand, in the case where extraction of all the non-shared users has been completed (Y in Step S1103), the priority determination unit 108 calculates a degree of intimacy between the shared user and each of the extracted non-shared users in the extracted social information, and additionally records the calculated degrees of intimacy in the non-shared user information table (Step S1104).

In this example, a method for calculating a degree of intimacy between a mutual pair by adding the degrees of intimacy of both of a pair, which is an example of the simplest calculation methods, is used as a method for calculating a degree of intimacy between a non-shared user and a shared user.

For instance, in the social information "S1" shown in FIG. 10, the degree of intimacy of the shared user "A" with the user "D", who is a non-shared user for the shared user "A", is "0.4". Further, assuming that the degree of intimacy of the non-shared user "D" with the shared user "A" is "0.5", the degree of intimacy between the shared user "A" and the non-shared user "D" in the social information "S1" is calculated to be "0.9" by adding the degrees of intimacy of both of the pair, and the calculated degree of intimacy is additionally recorded in the non-shared user information table for individual shared users shown in FIG. 30.

In this example, a degree of intimacy between a mutual pair is calculated as the degree of intimacy between a non-shared user and a shared user during an evaluation time period. The calculation method is not limited to the above. For instance, it is possible to use a higher value of the degree of intimacy or a lower value of the degree of intimacy out of the degrees of intimacy of both of a pair, as the degree of intimacy between a non-shared user and a shared user, or it is possible to use an average value of the degrees of intimacy of both of a pair, as the degree of intimacy between a non-shared user and a shared user.

Then, the priority determination unit 108 checks whether calculation of all the degrees of intimacy between non-shared users and shared users has been completed (Step S1105). In the case where calculation of all the degrees of intimacy between non-shared users and shared users has not been completed (N in Step S1105), the priority determination unit 108 returns the processing to Step S1104. On the other hand, in the case where calculation of all the degrees of intimacy between non-shared users and shared users has been completed (Y in Step S1105), the priority determination unit 108 creates the non-shared user information table for individual shared users shown in FIG. 31 from the non-shared user information table for individual shared users shown in FIG. 30 (Step S1106).

For instance, FIG. 31 shows the non-shared user information table for individual shared users during the evaluation time period "V1". Accordingly, the user name of a non-shared user included in at least one of the social information "S1" accumulated at a start time of the evaluation time period "V1", and the social information "S2" accumulated at an end time of the evaluation time period "V1" is registered in the column "NON-SHARED USER NAME".

Further, an average value between the degree of intimacy between a shared user and a non-shared user in the social information "S1", and the degree of intimacy between a shared user and a non-shared user in the social information "S2" is registered in the column "INTIMACY DEGREE BETWEEN SHARED USER AND NON-SHARED USER". This is based on the idea that middle information of social information during an evaluation time period is used as various information during the evaluation time period.

In the example of FIG. 31, the user "D" is registered as a non-shared user for the shared user "B" during the evaluation time period "V1". This is because the user "D" is extracted as a non-shared user for the shared user "B" in each of the social information "S1" and the social information "S2".

In the example of FIG. 30, the non-shared users for the shared user "B" in the social information "S1" are the user "D" and the user "G", and the degrees of intimacy between the shared user and each of the non-shared users are respectively "1.8" and "1.5". Further, as well as in the social information "S1", the non-shared users for the shared user "B" are the user "D", the user "E", and the user "G", and the degrees of intimacy between the shared user and each of the non-shared users are respectively "3.2", "0.8", and "0.5".

Accordingly, the non-shared users for the shared user "B" during the evaluation time period "V1" are the user "D", the user "E", and the user "G", who are registered as non-shared users in at least one of the social information "S1" and the social information "S2".

Accordingly, in the example of FIG. 31, the user "D", the user "E", and the user "G" are registered as non-shared users for the shared user "B" during the evaluation time period "V1". Further, an average value of the degree of intimacy between the shared user "B" and the user "D, the degree of intimacy between the shared user "B" and the user "E", and the degree of intimacy between the shared user "B" and the user "G" in the social information "S1" and in the social information "S2" is registered as the degree of intimacy between the shared user "B" and the user "D", the degree of intimacy between the shared user "B" and the user "E", and the degree of intimacy between the shared user "B" and the user "G".

For instance, during the evaluation time period "V1", the degree of intimacy between the shared user "B" and the non-shared user "D" is a value "2.5", which is an average value between the value "1.8", which is the degree of intimacy between the shared user "B" and the non-shared user "D" in the social information "S1", and the value "3.2", which is the degree of intimacy between the shared user "B" and the non-shared user "D" in the social information "S2". Accordingly, in FIG. 31, the value "2.5" is registered as the degree of intimacy between the shared user "B" and the non-shared user "D".

It is possible to set a degree of intimacy between a shared user and a non-shared user who is not registered in both of the social information "S1" and the social information "S2", for instance, the user "E" who is a non-shared user for the shared user "B", to a predetermined value (e.g. "0"). Specifically, an average value between the degree of intimacy "0" between the shared user "B" and the non-shared user "E" in the social information "S1", and the degree of intimacy "0.8" between the shared user "B" and the non-shared user "E" in the social information "S2" is calculated to be "0.4".

In this example, a non-shared user who is registered in at least one of the social information at times around an evaluation time period is extracted as a non-shared user during the evaluation time period. The extraction method is not limited to the above. For instance, it is possible to use a method of extracting a non-shared user who is registered in both of the social information at times around an evaluation time period, as a non-shared user during the evaluation time period.

Further, an addition average value of the degrees of intimacy in the social information at times around an evaluation time period is used as the degree of intimacy between a shared user and anon-shared user during the evaluation time period. The calculation method is not limited to the above. For instance, it is possible to use a value obtained by multiplication or subtraction of the degrees of intimacy in the social information at times around an evaluation time period, as the degree of intimacy between a shared user and a non-shared user during the evaluation time period.

Referring back to FIG. 36, the priority determination unit 108 calculates the number of shared users whose degrees of intimacy with each of the non-shared users are set from the non-shared user information table for individual shared users (Step S1107).

For instance, regarding the non-shared user "D", the non-shared user "D" has a certain degree of intimacy with the shared user "A", the shared user "B", and the shared user "C" in the non-shared user information table for individual shared users during the evaluation time period "V1" shown in FIG. 31. Accordingly, the number of shared users whose degrees of intimacy with the non-shared user "D" are set is calculated to be "3".

Then, the priority determination unit 108 creates a non-shared user information table for all the shared users by summing up the non-shared user information table for individual shared users shown in FIG. 31 with respect to each of the non-shared users, and by rearranging the sum (Step S1108), and finishes the non-shared user extraction processing.

Specifically, firstly, a non-shared user for all the shared users during the evaluation time period "V1" is extracted from the non-shared user information table for individual shared users shown in FIG. 31, and the user name of the extracted non-shared user is registered in the column "NON-SHARED USER NAME" of the non-shared user information table for all the shared users shown in FIG. 32. In this example, the user "D", the user "E, the user "F", the user "G", and the user "H" are registered in the non-shared user information table for all the shared users during the evaluation time period "V1".

Then, the number of shared users calculated in Step S1107 is registered in the column "NUMBER OF SHARED USERS IN WHICH INTIMACY DEGREE IS SET" in FIG. 32. For instance, a value "3" is registered in the column "NUMBER OF SHARED USERS IN WHICH INTIMACY DEGREE IS SET" of the non-shared user "D".

Then, the values of the degrees of intimacy registered in the column "INTIMACY DEGREE BETWEEN SHARED USER AND NON-SHARED USER" are summed up with respect to each of the non-shared users in the non-shared user information table for individual shared users shown in FIG. 31, and the sums are registered in the column "INTIMACY DEGREE BETWEEN SHARED USER AND NON-SHARED USER" of the non-shared user information table for all the shared users shown in FIG. 32.

In the example of FIG. 31, regarding the non-shared user "D", the degree of intimacy between the non-shared user "D" and the shared user "A" is "1.4", the degree of intimacy between the non-shared user "D" and the shared user "B" is "2.5", and the degree of intimacy between the non-shared user "D and the shared user "C" is "1.3". Accordingly, a value "5.2", which is the sum of these values, is registered in the column "INTIMACY DEGREE BETWEEN SHARED USER AND NON-SHARED USER" of the non-shared user "D".

Figure 37:
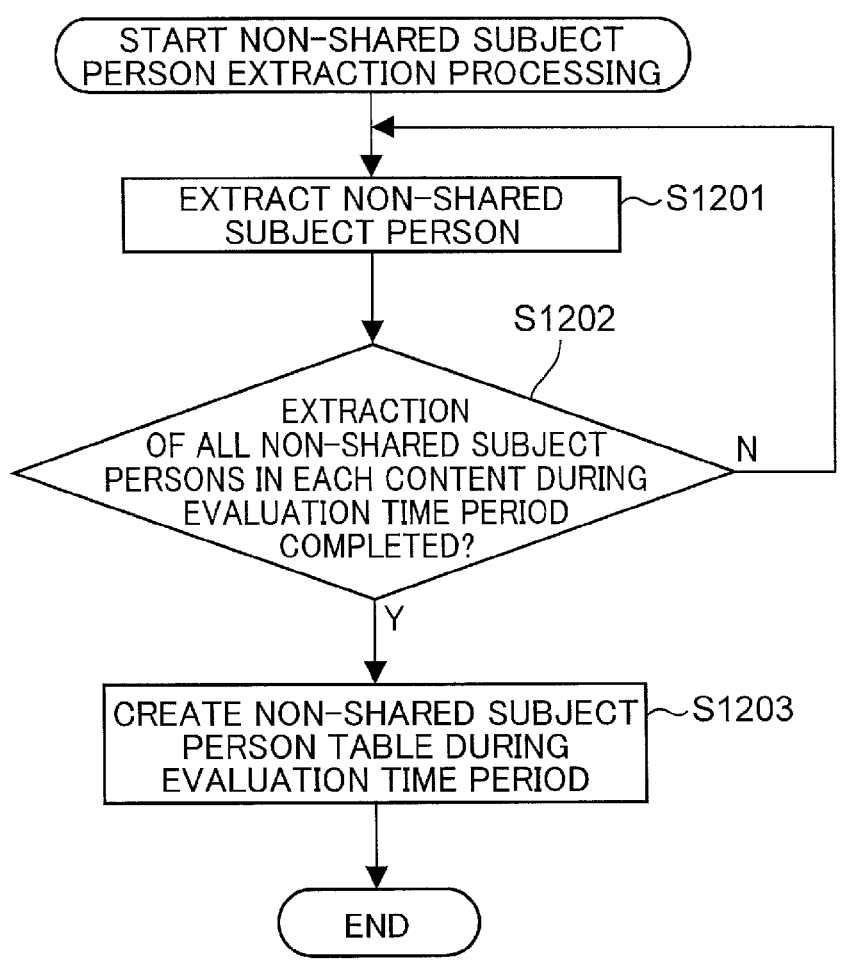
FIG. 37 is a flowchart of a non-shared subject person extraction processing to be performed in the second embodiment of the invention.

In the following, the non-shared subject person extraction processing in Step S1012 is described referring to FIG. 37.

Firstly, the priority determination unit 108 extracts a non-shared subject person, who is a non-shared user included, as a subject person, in a content during an evaluation time period, from the non-shared user information table for all the shared users and from the content information table (Step S1201).

Specifically, in the content information table during the evaluation time period "V1" shown in FIG. 24, for instance, the subject persons included in the content "P-004" are the user "A", the user "D", and the user "G". Further, in the non-shared user information table for all the shared users shown in FIG. 32, the non-shared users are the user "D", the user "E", the user "F", the user "G", and the user "H". Accordingly, the user "D" and the user "G" are extracted as non-shared subject persons, who are the non-shared users included as subject persons in the content "P-004".

Then, the priority determination unit 108 checks whether extraction of all the non-shared subject persons in each of the contents during the evaluation time period has been completed (Step S1202). In the case where the extraction has not been completed (N in Step S1202), the priority determination unit 108 returns the processing to Step S1201. On the other hand, in the case where the extraction has been completed (Y in Step S1202), the priority determination unit 108 creates a non-shared subject person table during the evaluation time period from the extracted non-shared subject persons in each of the contents, and from the non-shared user information table during the evaluation time period (Step S1203), and finishes the non-shared subject person extraction processing.

A practical example of the processing of Step S1203 is described in detail. Firstly, a content name and a subject person name are extracted from the content information table during the evaluation time period "V1" shown in FIG. 24, and the extracted information is respectively registered in the column "CONTENT NAME" and in the column "SUBJECT PERSON NAME" of the non-shared subject person table during the evaluation time period "V1" shown in FIG. 33. For instance, regarding the content "P-001", "P-001" is registered in the column "CONTENT NAME", and the user "B" and the user "G" are registered in the column "SUBJECT PERSON NAME".

Then, the non-shared subject persons extracted in Step S1201 are registered in the column "NON-SHARED SUBJECT PERSON NAME" of the non-shared subject person table during the evaluation time period "V1" shown in FIG. 33. For instance, regarding the content "P-004", the user "D" and the user "G" are registered in the column "NON-SHARED SUBJECT PERSON NAME" in FIG. 33. In the case where no non-shared subject person is extracted in Step S1201, the symbol "-" is registered as "NON-SHARED SUBJECT PERSON NAME".

Then, the priority determination unit 108 registers the number of shared users described in the column "NUMBER OF SHARED USERS IN WHICH INTIMACY DEGREE IS SET" shown in FIG. 32, in the column "NUMBER OF SHARED USERS IN WHICH INTIMACY DEGREE IS SET" shown in FIG. 33; sums up the degrees of intimacy described in the column "INTIMACY DEGREE BETWEEN SHARED USER AND NON-SHARED SUBJECT PERSON" shown in FIG. 32 with respect to each of the contents; and registers the sums in the column "INTIMACY DEGREE BETWEEN SHARED USER AND NON-SHARED SUBJECT PERSON" shown in FIG. 33.

For instance, in the non-shared subject person table during the evaluation time period "V1" shown in FIG. 33, the user "D" and the user "G" are registered for the content "P-004" in the column "NON-SHARED SUBJECT PERSON NAME". Further, in the non-shared user information table for all the shared users during the evaluation time period "V1" shown in FIG. 32, a value "3" and a value "5.2" are respectively registered for the user "D" in the column "NUMBER OF SHARED USERS IN WHICH INTIMACY DEGREE IS SET" and in the column "INTIMACY DEGREE BETWEEN SHARED USER AND NON-SHARED USER". Further, in FIG. 32, a value "2" and a value "1.8" are respectively registered for the user "G" in the column "NUMBER OF SHARED USERS IN WHICH INTIMACY DEGREE IS SET" and in the column "INTIMACY DEGREE BETWEEN SHARED USER AND NON-SHARED USER".

Accordingly, a value "5", which is the sum of the value "3" and the value "2", is registered in the column "NUMBER OF SHARED USERS IN WHICH INTIMACY DEGREE IS SET", and a value "7.0", which is the sum of the value "5.2" and the value "1.8", is registered in the column "INTIMACY DEGREE BETWEEN SHARED USER AND NON-SHARED SUBJECT PERSON" for the content "P-004" in FIG. 33.

In the case where no non-shared subject person is extracted in Step S1201, a value "0" is registered in the column "NUMBER OF SHARED USERS IN WHICH INTIMACY DEGREE IS SET" shown in FIG. 33, and a predetermined value (e.g. the value "0") is registered in the column "INTIMACY DEGREE BETWEEN SHARED USER AND NON-SHARED SUBJECT PERSON" shown in FIG. 33.

In Step S1013, an evaluation value of each of the contents included during an evaluation time period is calculated, with use of the non-shared subject person table (see FIG. 33) created by the processings of Step S1011 and Step S1012.

This is based on the idea that shared users should have a good impression about a content, remembering the friends who were close to the shared users, in the case where the shared users browse the content including a larger number of non-shared users who were close to the shared users, out of the contents photographed during a time period when the shared users were close to each other.

In view of the above, the evaluation values of the contents are calculated with use of a computational algorithm such that the evaluation value of a content including a larger number of users whose degrees of intimacy with a shared user are set in the social information, and having a higher degree of intimacy is calculated to be high. Specifically, in the non-shared subject person table during the evaluation time period "V1" (see FIG. 33), the evaluation value of a content including a larger number of shared users registered in the column "NUMBER OF SHARED USERS IN WHICH INTIMACY DEGREE IS SET", and having a higher degree of intimacy registered in the column "INTIMACY DEGREE BETWEEN SHARED USER AND NON-SHARED SUBJECT PERSON" is calculated to be high.

In the following, a practical example of a method for calculating an evaluation value of a content during the evaluation time period "V1" is described. Firstly, in the non-shared subject person table during the evaluation time period "V1" shown in FIG. 33, the largeness/smallness relationship of the number of shared users of each of the contents described in the column "NUMBER OF SHARED USERS IN WHICH INTIMACY DEGREE IS SET" is such that: "P-004"="P-005">"P-008">"P-001"="P-002">"P-003"="P-006">"P-007".

Further, regarding the contents (e.g. the content "P-004" and the content "P-005") whose largeness/smallness relationship is equal to each other, taking into consideration of the degrees of intimacy described in the column "INTIMACY DEGREE BETWEEN SHARED USER AND NON-SHARED SUBJECT PERSON" of the non-shared subject person table during the evaluation time period "V1" shown in FIG. 33, the largeness/smallness relationship of the degree of intimacy of each of the contents is such that: "P-005">"P-004">"P-008">"P-002">"P-001">"P-006">"P-003">"P-007".

Accordingly, the largeness/smallness relationship of the evaluation values of the contents during the evaluation time period "V1" is such that: the content "P-005">the content "P-004">the content "P-008">the content "P-002">the content "P-001">the content "P-006">the content "P-003">the content "P-007". It is possible to use any value, as far as the evaluation values of the contents satisfy the aforementioned largeness/smallness relationship.

In the non-shared subject person table shown in FIG. 33, the largeness/smallness relationship of the evaluation values of the contents is determined by the numbers of shared users registered in the column "NUMBER OF SHARED USERS IN WHICH INTIMACY DEGREE IS SET", and then, regarding the contents whose largess/smallness relationship is equal to each other, the largeness/smallness relationship of the evaluation values of the contents is determined by the degrees of intimacy registered in the column "INTIMACY DEGREE BETWEEN SHARED USER AND NON-SHARED SUBJECT PERSON". The determination method, however, is not limited to the above.

For instance, in the non-shared subject person table shown in FIG. 33, it is possible to determine the largeness/smallness relationship of the evaluation values of the contents by the degrees of intimacy described in the column "INTIMACY DEGREE BETWEEN SHARED USER AND NON-SHARED SUBJECT PERSON", and then, it is possible to determine the largeness/smallness relationship of the evaluation values of the contents by the numbers of shared users described in the column "NUMBER OF SHARED USERS IN WHICH INTIMACY DEGREE IS SET".

As described above, according to the content processing device 100 of this embodiment, a non-shared subject person as a non-shared user to be included as a subject is extracted in addition to the priority determination about the evaluation time periods, and the priority of a content is determined from the degree of intimacy between the non-shared subject person and a shared user. Accordingly, for instance, it is possible to prioritize output of a content including, as subjects, a larger number of persons who know a particularly larger number of shared users, and whose relationship with the shared users is closer, out of the contents generated during a time period when the shared users were close to each other.

In the first embodiment and in the second embodiment, the output control unit 109 outputs the contents in the descending order of the priorities of the evaluation time periods determined by the priority determination unit 108, and in the descending order of the priorities of the contents during the evaluation time period. The priority determination method is not limited to the above. For instance, the priority determination unit 108 may manage, as a content output history, shared user information for use in outputting the contents, a content priority determination method, and information relating to the content output order and the outputted contents; and may control the contents to be outputted based on the content output history, in addition to the processings of the first embodiment and the second embodiment.

In this example, the content priority determination method mainly indicates the aforementioned five types of determination methods described in the first embodiment and in the second embodiment. Specifically, the priority determination method M1 is "a method for determining the priority of an evaluation time period from a degree of intimacy between shared users calculated with use of social information at every evaluation time period". The priority determination method M2 is "a method for determining the priority of an evaluation time period from a variation of a degree of intimacy between shared users calculated with use of social information at every evaluation time period". The priority determination method M3 is "a method, in which the priority of a content including, as subjects, a larger number of shared users, in which the degree of intimacy between a mutual pair is high, is determined to be high, in addition to priority determination about evaluation time periods". The priority determination method M4 is "a method, in which the priority of a content including, as subjects, a larger number of shared users whose variation of a degree of intimacy between a mutual pair is high, is determined to be high, in addition to priority determination about evaluation time periods". The priority determination method M5 is "a method, in which the priority of a content including a larger number of non-shared users, in which the degree of intimacy between a shared user and a non-shared user is high, is determined to be high, in addition to priority determination about evaluation time periods".

For instance, let us assume that in outputting the contents by the output control unit 109, the shared user information indicates that the shared users are the user "A", the user "B", and the user "C", the content priority determination method is the priority determination method M5, and the outputted contents are the content "P-005", "P-004", "P-008", and "P-002". In this case, the output control unit 109 stores these information as a content output history.

In the case where the contents are outputted to the same shared users i.e. to the user "A", the user "B", and the user "C" next time, the output control unit 109 may change the priority determination method to a priority determination method (e.g. to the priority determination method M1) other than the priority determination method used in the previous time. Alternatively, in the case where the same priority determination method as used in the previous time is used, the output control unit 109 may output the contents from the content (e.g. the content "P-001") whose priority follows the priority of the content outputted in the previous time.

According to the above configuration, the output control unit 109 manages a content output history, in addition to the processing of outputting the contents in the descending order of the priorities determined by the priority determination unit 108, and controls the contents to be outputted, based on the content output history. Accordingly, in the case where contents are outputted to the same shared users, it is possible to change the content output order each time the contents are outputted, or it is possible to output the contents other than the contents outputted in the previous time.

The embodiments are merely examples embodying the invention. The invention is not limited to the foregoing embodiments, and may be modified in various ways as far as such modifications do not depart from the spirit and the scope of the invention hereinafter defined.

The aforementioned advantages are obtained for the following use cases, by using the content processing device 100 described in the foregoing embodiments.

For instance, there is a use case, in which the browser user and his or her friend browse a content, and look back at the past. In this case, it is possible to prioritize presentation of a memory content photographed during a time period when the browser user and the friend were close to each other, from the user information of the browser user, the user information of the friend who browses the content with the owner user, and a history of the social information about the browser user and the friend.

Further, in this case, for instance, let us assume that the browser user and the friend look at the camera built in the content processing device 100 during the time period when they browse the content, and take a photograph of their faces with use of the camera. Then, the browser user operates the content processing device 100 to acquire user information of the browser user and the friend by face authentication. By performing the above operation, the content processing device 100 can implement the aforementioned processing.

Further, as another use case, the browser user and his or her friend share a content with use of means such as posting the content to a network service or transmitting the content by an electronic mail. In this case, it is possible to prioritize selection, as a content to be shared, a memory content photographed during a time period when the browser user and the friend were close to each other, from the user information of the browser user, the user information of the friend with whom the content is to be shared, and a history of the social information about the browser user and the friend.

Further, in this case, for instance, at the time of sharing a content, the browser user may designate the icons of the browser user and the friend with whom the content is to be shared through the screen of an application built in the content processing device 100 or through the screen of an application capable of communicating data with the content processing device 100. By performing the above operation, the user information of the browser user and the friend is inputted to the content processing device 100, and the content processing device 100 can implement the aforementioned processing.

Further, as another use case, an album, a slideshow, or a movie to be shared with specific friends in a wedding ceremony, a birthday party, or a class reunion may be created. In this case, it is possible to prioritize selection of a content showing some users (the browser user and his or her specific friend(s), or specific friends themselves) who are particularly close to each other, out of the memory contents photographed during a time period when the browser user and the specific friends were close to each other, from the user information of the browser user and the specific friends, and a history of the social information about the browser user and the specific friends. The thus selected content is utilized for creating an album, a slideshow, or a movie.

Further, in the above case, in creating a slideshow, for instance, the browser user may designate the icons of the browser user and his or her specific friends with whom the slideshow is to be shared through the screen of an application built in the content processing device 100 or through the screen of an application capable of communicating data with the content processing device 100. By performing the above operation, user information of the browser user and the specific friends is inputted to the content processing device 100, and the content processing device 100 can implement the aforementioned processing.

As another use case, contents to be stored and contents to be deleted are selected, out of the contents stored in a recording medium such as a personal computer, a mobile terminal, or an external hard disk. In this case, it is possible to prioritize selection and storage of a content including users who are particularly close to each other, out of the memory contents photographed during a time period when the users including the browser user and his or her friend were close to each other, from the user information of the browser user, the user information of the friends whose degrees of intimacy are set in the latest social information of the browser user, and a history of the social information about the browser user and the friends.

On the other hand, it is also possible to select, as a content to be deleted, a content including users who are particularly remote from each other, out of the contents photographed during a time period when the users including the browser user and the friends were remote from each other.

In the above case, at the time of rearranging the contents, for instance, the browser user may select specific friends, out of the icons of the friends whose degrees of intimacy are set in the latest social information through the screen of an application built in the content processing device 100 or through the screen of an application capable of communicating data with the content processing device 100. By performing the above operation, the user information of the browser user and the specific friends is inputted to the content processing device 100, and the content processing device 100 can implement the aforementioned processing.

As another use case, the browser user may hold the contents by transferring the contents to a mobile terminal. In this case, the browser user is allowed to prioritize selection of a content including, as subjects, a larger number of persons who know a particularly larger number of users and having a higher degree of intimacy, out of the memory contents photographed during a time period when the users including the browser user and the friends were close to each other, from the user information of the browser user, the user information of the friends with whom the browser user is planning to play in the near future, and a history of the social information about the browser user and the friends; and is allowed to transfer the selected content to the mobile terminal.

In the above case, at the time of transferring the contents to the mobile terminal, the browser user may designate the icons of the browser user and the friends with whom the browser user is planning to play in the near future through the screen of an application built in the content processing device 100 or through the screen of an application capable of communicating data with the content processing device 100. By performing the above operation, user information of the browser user and the friends is inputted to the content processing device 100, and the content processing device 100 can implement the aforementioned processing.

The content processing device 100 described in the foregoing embodiments can be implemented as an audio visual equipment such as a BD recorder, a stationary terminal such as a personal computer and a server terminal, or as a mobile terminal such as a digital camera and a mobile phone, in each of which the function of the content processing device is provided.

Further, the content processing device 100 of the embodiments may be mounted in a server device for providing contents as a network service. In this case, upon receiving the contents from an audio visual equipment, a personal computer, or a digital camera storing the contents via a network, the content processing device 100 may perform the priority determination processing described in the foregoing embodiments with respect to the received contents, and may transmit the processing result to the audio visual equipment, the personal computer, or the digital camera via the network.

In the case where the content processing device 100 is mounted in a server device, the processing result of the priority determination processing may be managed in the server device, so that the users can utilize the processing result on the network service.

For instance, the following use method may be proposed. A server device extracts user information of a subject from the contents stored on a contents storage service on a network. Then, a user utilizing the service selects intended user information, out of the extracted user information. Upon receiving the input of the selected user information, the server device utilizes the user information as shared user information to be utilized in the priority determination processing, and performs the priority determination processing and the output control processing. Specifically, the server device selects a content whose priority is high between the shared users, out of the contents stored on the service, and transmits the selected content to an audio visual equipment, a personal computer, or a digital camera via the network.

Further, the aforementioned approach may be implemented by storing a program describing the sequence of the approach described in the foregoing embodiments in a memory, causing a CPU (Central Processing Unit) to read the program from the memory, and executing the program.

Further, a program describing the sequence of the aforementioned approach may be stored in a recording medium such as a DVD, and may be distributed. Further, a program describing the sequence of the aforementioned approach may be widely distributed via a transmission medium such as the Internet.

Figure 42:
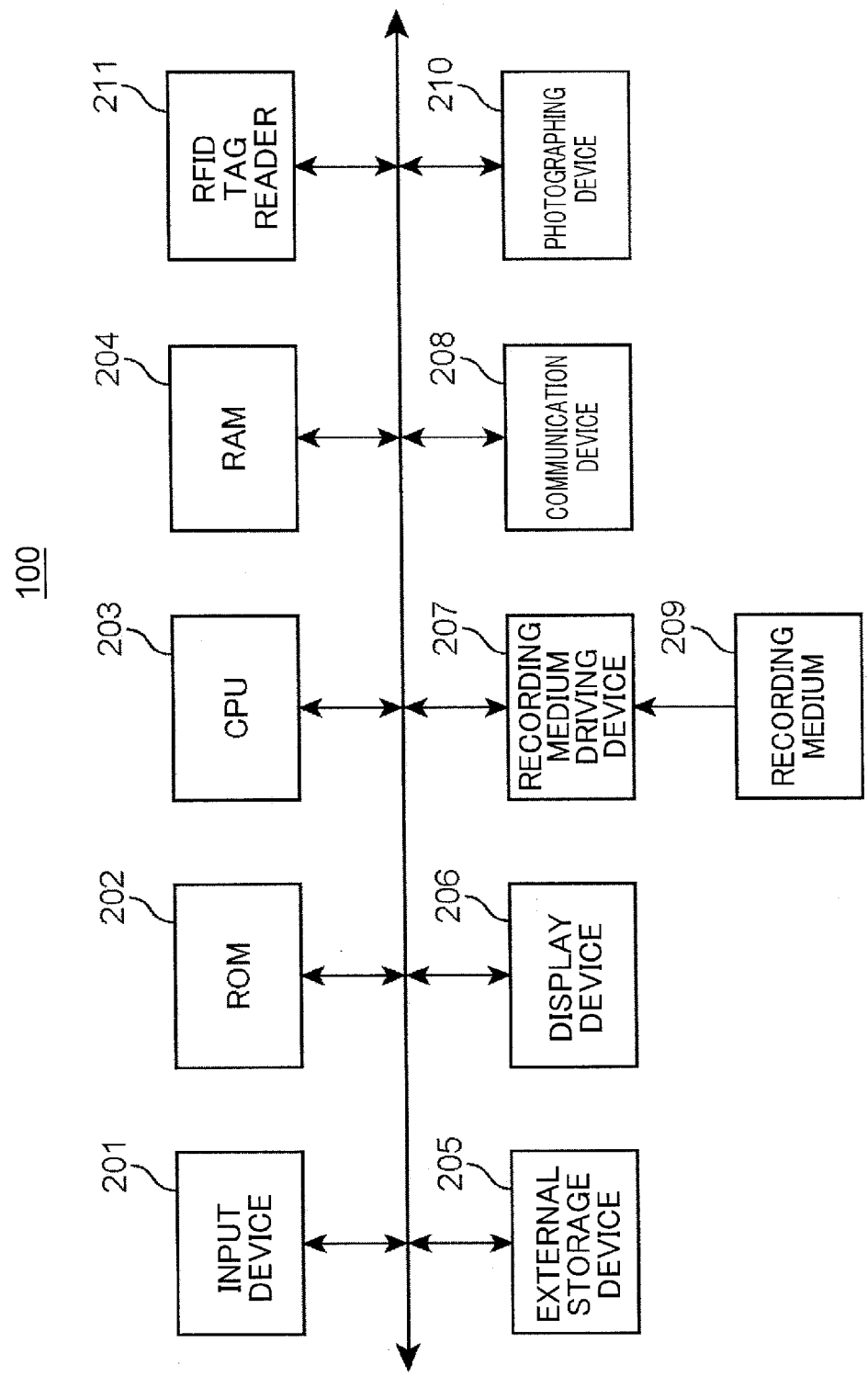
FIG. 42 is a block diagram showing a hardware configuration of the content processing device embodying the invention.

FIG. 42 is a block diagram showing a hardware configuration of the content processing device 100 embodying the invention. The content processing device 100 is constituted of a computer, for instance, and is provided with an input device 201, an ROM (Read Only Memory) 202, a CPU (Central Processing Unit) 203, an RAM (Random Access Memory) 204, an external storage device 205, a display device 206, a recording medium driving device 207, a communication device 208, a photographing device 210, and an RFID tag reader 211. Each of the functional blocks is connected to an internal bus. Various data is inputted or outputted via the bus, and various processings are executed under the control of the CPU 203.

The input device 201 is constituted of a keyboard and a mouse, and is used for allowing the user to input various data. A system program such as BIOS (Basic Input/Output System) is stored in the ROM 202. The external storage device 205 is constituted of a hard disk drive, and a predetermined OS (Operating System) and a content processing program are stored in the external storage device 205. The CPU 203 reads the OS and the content processing program from the external storage device 205, and controls the operation of each of the functional blocks. The RAM 204 is used as a working area for the CPU 203.

The display device 206 is constituted of a liquid crystal display or an organic EL display, for instance, and displays various images under the control of the CPU 203. The recording medium driving device 207 is constituted of a CD-ROM drive or a flexible disk drive.

The content processing program is stored in a computer-readable recording medium 209 such as a CD-ROM, and is provided to the user. The content processing program is installed in a computer when the user operates the recording medium driving device 207 to read the recording medium 209. Further, the content processing program may be installed in a computer by storing the program in a server on the Internet and by downloading the program from the server.

The communication device 208 is constituted of a communication device for connecting the content processing device 100 to the Internet. Data is transmitted and received to and from other device via the Internet under the control of the CPU 203.

The input unit 101 shown in FIG. 1, etc. is constituted of the input device 201, the photographing device 210, the RFID tag reader 211, and a program included in the content processing program for controlling these devices. Further, the content accumulation unit 102 shown in FIG. 1, etc. is constituted of the external storage device 205 and a program included in the content processing program for controlling the external storage device 205. Further, the content information managing unit 104, the shared user information managing unit 105, the social information managing unit 106, and the social information history accumulation unit 107 shown in FIG. 1, etc. are included in the content processing program, and are constituted of a program to be executed by the CPU 203, and of a storage device (the RAM 204 and the external storage device 205) for storing data to be managed by the program.

Further, the priority determination unit 108 and the output control unit 109 shown in FIG. 1, etc. are included in the content processing program, and are constituted of a program to be executed by the CPU 203.

Each of the functional blocks described in the foregoing embodiments may be implemented as an LSI (Large Scale Integration), which is an integrated circuit. In the above configuration, the content information analysis unit 103, the content information managing unit 104, the shared user information managing unit 105, the social information managing unit 106, the social information history accumulation unit 107, the priority determination unit 108, and the output control unit 109 shown in FIG. 1, etc. may be integrated. Each of the functional blocks may be individually configured into a one-chip device, or a part or all of the functional blocks may be configured into a one-chip device.

In this example, the integrated circuit is an LSI. The integrated circuit may also be called as an IC (Integrated Circuit), a system LSI, a super LSI or an ultra LSI, depending on the degree of integration. Further, the integrated circuit method is not limited to an LSI method. The integrated circuit may be implemented by a dedicated circuit or a general-purpose processor. Further, an FPGA (Field Programmable Gate Array) capable of programming after fabricating an LSI, or a reconfigurable processor capable of reconfiguring connection or setting of circuit cells within the LSI may also be used. Alternatively, each of these functional blocks may perform computation with use of a DPS (Digital Signal Processor) or a CPU (Central Processing Unit). Further, these processing steps can be processed by recording these processing steps in a recording medium as a program, and by executing the program.

Summary of Content Processing Device according to Embodiments

The following is a summary of the technical features of the content processing device according to the embodiments.

(1) A content processing device according to the embodiments is provided with an input unit which receives input of the content; a shared user information managing unit which manages shared user information relating to shared users, the shared users being at least one or more users who share the content received by the input unit; a content information managing unit which manages meta-information corresponding to the content; a social information managing unit which calculates, at every predetermined time period, social information that defines a relationship between the users and a degree of intimacy indicating a degree of closeness between the users in terms of a numerical value; a social information history accumulation unit which accumulates the social information as a history; and a priority determination unit which determines an evaluation time period out of the predetermined time periods based on the meta-information, calculates a degree of intimacy between the shared users during the evaluation time period based on the social information, and determines a priority of the evaluation time period according to the calculated degree of intimacy, the evaluation time period being a time period when a content was generated.

According to the above configuration, social information is accumulated at every predetermined time period as a history, and the priority of an evaluation time period is determined from the degree of intimacy between shared users calculated with use of the social information at every predetermined evaluation time period. Accordingly, it is possible to determine a time period when the shared users are close to each other, and to prioritize output of a content generated during the time period. As a result of the above configuration, it is possible to control output of the contents, taking into consideration of the degree of intimacy between the shared users, which may change as time goes by.

(2) The content processing device may be further provided with an output control unit which controls output of the content generated during the evaluation time period according to the priority determined by the priority determination unit.

According to the above configuration, it is possible to prioritize output of a content generated during an evaluation time period whose priority is high. Accordingly, it is possible to allow the shared users to prioritize browsing of the content generated during a time period when the shared users were close to each other. This makes the shared users feel excited when browsing the content.

(3) In the content processing device, the output control unit may present the content to the shared user according to the priority determined by the priority determination unit.

According to the above configuration, it is possible to prioritize presentation, to the shared users, of a content photographed during an evaluation time period whose priority is high, as a memory content photographed during a time period when the shared users were close to each other.

(4) In the content processing device, the output control unit may delete the content according to the priority determined by the priority determination unit.

According to the above configuration, for instance, it is possible to delete a content photographed during an evaluation time period whose priority is low, as a content photographed during a time period when the shared users were remote from each other.

(5) In the content processing device, the output control unit may transmit the content to a terminal device of the shared user according to the priority determined by the priority determination unit.

According to the above configuration, it is possible to prioritize transmission, to the shared users who are planning to meet in the near future in advance, of a content which has been photographed during an evaluation time period whose priority is high and which may be a common topic. As a result of the above configuration, it is possible to make the shared users feel excited when they meet, with use of the content transmitted in advance.

(6) In the content processing device, the social information managing unit may calculate the social information based on lifelog information managing an interaction history between the users.

According to the above configuration, the social information is calculated based on lifelog information managing an interaction history between the users. Accordingly, unlike a conventional configuration in which a degree of intimacy is calculated based on the contents of a content, the above configuration is advantageous in calculating a degree of intimacy that reflects the relationship between the shared users in the real world.

(7) In the content processing device, the priority determination unit may calculate the degree of intimacy between the shared users during the evaluation time period, and may determine that the priority of the evaluation time period is high, as the degree of intimacy increases.

According to the above configuration, the priority of an evaluation time period is determined to be high, as the degree of intimacy between the shared users during the evaluation time period increases. Accordingly, it is possible to prioritize output of a content generated during a time period when the shared users were close to each other.

(8) In the content processing device, the priority determination unit may calculate a variation of the degree of intimacy between the shared users during the evaluation time period, and may determine that the priority of the evaluation time period is high, as the variation increases.

According to the above configuration, a variation of the degree of intimacy between the shared users during the evaluation time period is calculated, and the priority of the evaluation time period is determined to be high, as the variation increases. Accordingly, for instance, it is possible to prioritize output of a content generated during a time period when the shared users got close to each other so quickly, and to lower the priority of a content generated during a time period when the shared users did not get along well with each other so quickly.

(9) The content processing device may be further provided with a recognition information managing unit which manages recognition information for use in recognizing a subject included in the content; and a content information analysis unit which analyzes the content based on the recognition information, and recognizes the subject included in the content, wherein the priority determination unit calculates a degree of intimacy between a mutual pair as the shared users, based on degrees of intimacy of both of the mutual pair constituting the shared users, in addition to the priority determination during the evaluation time period; and determines the priority of each of the contents generated during the evaluation time period in such a manner that the priority of a content including a larger number of the shared users whose degree of intimacy between the mutual pair is high is set to be high.

According to the above configuration, a subject included in the content is recognized. Further, a degree of intimacy between a mutual pair as the shared users is calculated, based on degrees of intimacy of both of the mutual pair constituting the shared users. Then, the priority of a content including, as subjects, a larger number of shared users, and in which the degree of intimacy between a mutual pair is high, is determined to be high. Accordingly, it is possible to prioritize output of a content including a shared user pair who are particularly close to each other, and to lower the priority of a content including a shared user pair who are remote from each other, out of the contents generated during a time period when the shared users were close to each other.

(10) In the content processing device, the priority determination unit may determine the priority of each of the contents generated during the evaluation time period in such a manner that the priority of a content whose variation of the degree of intimacy between the mutual pair is large is set to be high.

According to the above configuration, the priority of a content including, as subjects, a larger number of shared users, and in which a variation of the degree of intimacy between a mutual pair is large, is determined to be high, in addition to the priority determination of the evaluation time period. Accordingly, it is possible to prioritize output of a content including a shared user pair who are particularly close to each other, and to lower the priority of a content including a shared user pair who are remote from each other, out of the contents generated during a time period when the shared users were close to each other.

(11) In the content processing device, the priority determination unit may extract a non-shared user out of the users whose degrees of intimacy are set in the social information, and may determine the priority of each of the contents generated during the evaluation time period in such a manner that the priority of a content including a larger number of the non-shared users whose degrees of intimacy with the shared user are high is set to be high, the non-shared user being a user other than the shared users.

According to the above configuration, a non-shared user, who is a user other than the shared users, is extracted from the users whose degrees of intimacy are set in the social information. Then, the priority of a content including the non-shared user as a subject, and in which the degree of intimacy between a shared user and the non-shared user is high, is determined to be high. Accordingly, it is possible to prioritize output of a content particularly including, as subjects, a larger number of persons who know a larger number of shared users, and, in which the relationship with the shared users is closer, out of the contents generated during a time period when the shared users were close to each other.

Further, the content processing device according to the embodiments may be implemented by one or more integrated circuits.

Further, the content processing device according to the embodiments may be implemented as a program to be run on a computer. The program may be distributed via a recording medium such as a CD-ROM or via a transmission medium such as the Internet.

INDUSTRIAL APPLICABILITY

The content processing device is advantageously applied to a video recorder, a home server, a digital still camera, a digital video camera, a personal computer, an enterprise-oriented computer (workstation), a digital TV receiver loaded with a function of retrieving image contents, a settop box, a car navigation system, a projector, a mobile terminal, a music component system, a digital photo frame, or a remote controller terminal for device control.

The invention claimed is:

1. A content processing device for processing at least one or more contents, comprising:
   an input unit which receives input of the content, and designation of shared users, the shared users being at least one or more users who share the content;
   a shared user information managing unit which manages shared user information relating to the shared users;
   a content information managing unit which manages meta-information corresponding to the content;
   a social information managing unit which calculates, at every predetermined time period, social information that defines a relationship between the users and a degree of intimacy indicating a degree of closeness between the users in terms of a numerical value;
   a social information history accumulation unit which accumulates the social information at the every predetermined time period for calculating the social information; and
   a priority determination unit which determines an evaluation time period out of the predetermined time periods based on the meta-information, calculates a degree of intimacy between the shared users received by the input unit during the evaluation time period based on the social information, and determines a priority of the evaluation time period according to the calculated degree of intimacy, the evaluation time period being a time period when a content was generated, wherein
   the priority determination unit determines a priority of the content generated during the evaluation time period, based on a degree of intimacy between subjects included in the content generated during the evaluation time period.

2. The content processing device according to claim 1, further comprising:
   an output control unit which controls output of the content generated during the evaluation time period according to the priority determined by the priority determination unit.

3. The content processing device according to claim 2, wherein
   the output control unit presents the content to the shared user according to the priority determined by the priority determination unit.

4. The content processing device according to claim 2, wherein
   the output control unit deletes the content according to the priority determined by the priority determination unit.

5. The content processing device according to claim 2, wherein
   the output control unit transmits the content to a terminal device of the shared user according to the priority determined by the priority determination unit.

6. The content processing device according to 15, wherein
   the social information managing unit calculates the social information based on lifelog information managing an interaction history between the users.

7. The content processing device according to claim 1, wherein
the priority determination unit calculates the degree of intimacy between the shared users during the evaluation time period, and determines that the priority of the evaluation time period is high, as the degree of intimacy increases.

8. The content processing device according to claim 1, wherein
the priority determination unit calculates a variation of the degree of intimacy between the shared users during the evaluation time period, and determines that the priority of the evaluation time period is high, as the variation increases.

9. The content processing device according to claim 1, further comprising:
a recognition information managing unit which manages recognition information for use in recognizing a subject included in the content; and
a content information analysis unit which analyzes the content based on the recognition information, and recognizes the subject included in the content, wherein
the priority determination unit calculates a degree of intimacy between a mutual pair as the shared users, based on degrees of intimacy of both of the mutual pair constituting the shared users, regarding the subject included in the content recognized by the content information analysis unit; and determines the priority of each of the contents generated during the evaluation time period in such a manner that the priority of a content including a larger number of the shared users whose degree of intimacy between the mutual pair is high is set to be high.

10. The content processing device according to claim 9, wherein
the priority determination unit determines the priority of each of the contents generated during the evaluation time period in such a manner that the priority of a content whose variation of the degree of intimacy between the mutual pair is large is set to be high.

11. The content processing device according to claim 9, wherein
the priority determination unit extracts a non-shared user out of the users whose degrees of intimacy are set in the social information, from the subject included in the content recognized by the content information analysis unit, and determines the priority of each of the contents generated during the evaluation time period in such a manner that the priority of a content including a larger number of the non-shared users whose degrees of intimacy with the shared user are high is set to be high, the non-shared user being a user other than the shared users.

12. A content processing method for implementing a content processing device which processes at least one or more contents, the method comprising:
an input step of receiving input of the content, and designation of shared users, the shared users being at least one or more users who share the content;
a shared user information managing step of managing shared user information relating to the shared users;
a content information managing step of managing meta-information corresponding to the content;
a social information managing step of calculating, at every predetermined time period, social information that defines a relationship between the users and a degree of intimacy indicating a degree of closeness between the users in terms of a numerical value;
a social information history accumulation step of accumulating the social information at the every predetermined time period for calculating the social information; and
a priority determination step of determining an evaluation time period out of the predetermined time periods based on the meta-information, calculating a degree of intimacy between the shared users received in the input step during the evaluation time period based on the social information, and determining a priority of the evaluation time period according to the calculated degree of intimacy, the evaluation time period being a time period when a content was generated, wherein
in the priority determination step, a priority of the content generated during the evaluation time period is determined based on a degree of intimacy between subjects included in the content generated during the evaluation time period.

13. A computer-readable recording medium which stores a program which causes a computer to function as a content processing device for processing at least one or more contents, the program causing the computer to function as:
a shared user information managing unit which manages shared user information relating to shared users, the shared users being at least one or more users who share the content received by an input unit;
a content information managing unit which manages meta-information corresponding to the content;
a social information managing unit which calculates, at every predetermined time period, social information that defines a relationship between the users and a degree of intimacy indicating a degree of closeness between the users in terms of a numerical value;
a social information history accumulation unit which accumulates the social information at the every predetermined time period for calculating the social information; and
a priority determination unit which determines an evaluation time period out of the predetermined time periods based on the meta-information, calculates a degree of intimacy between the shared users received by the input unit during the evaluation time period based on the social information, and determines a priority of the evaluation time period according to the calculated degree of intimacy, the evaluation time period being a time period when a content was generated, wherein
the priority determination unit determines a priority of the content generated during the evaluation time period, based on a degree of intimacy between subjects included in the content generated during the evaluation time period.

14. An integrated circuit in a content processing device for processing at least one or more contents, comprising:
a shared user information managing unit which manages shared user information relating to shared users, the shared users being at least one or more users who share the content received by an input unit;
a content information managing unit which manages meta-information corresponding to the content;
a social information managing unit which calculates, at every predetermined time period, social information that defines a relationship between the users and a degree of intimacy indicating a degree of closeness between the users in terms of a numerical value;

a social information history accumulation unit which accumulates the social information at the every predetermined time period for calculating the social information; and a priority determination unit which determines an evaluation time period out of the predetermined time periods based on the meta-information, calculates a degree of intimacy between the shared users received by the input unit during the evaluation time period based on the social information, and determines a priority of the evaluation time period according to the calculated degree of intimacy, the evaluation time period being a time period when a content was generated, wherein the priority determination unit determines a priority of the content generated during the evaluation time period, based on a degree of intimacy between subjects included in the content generated during the evaluation time period.

\* \* \* \* \*